United States Patent
Park et al.

(10) Patent No.: US 11,518,666 B2
(45) Date of Patent: Dec. 6, 2022

(54) WATER EJECTING APPARATUS

(71) Applicant: LG Electronics Inc., Seoul (KR)

(72) Inventors: Jongho Park, Seoul (KR); Minho Kim, Seoul (KR); Heesang Yoon, Seoul (KR); Hoon Jang, Seoul (KR); Dongkoo Han, Seoul (KR); Hyeonggeun Kim, Seoul (KR); Keunho Roh, Seoul (KR); Younggwan Song, Seoul (KR)

(73) Assignee: LG Electronics Inc., Seoul (KR)

( * ) Notice: Subject to any disclaimer, the term of this patent is extended or adjusted under 35 U.S.C. 154(b) by 258 days.

(21) Appl. No.: 16/898,327

(22) Filed: Jun. 10, 2020

(65) Prior Publication Data

US 2021/0002117 A1 Jan. 7, 2021

(30) Foreign Application Priority Data

Jul. 3, 2019 (KR) .................. 10-2019-0080353

(51) Int. Cl.
- *B67D 1/00* (2006.01)
- *B67D 1/08* (2006.01)
- *F16H 19/04* (2006.01)

(52) U.S. Cl.
CPC ......... *B67D 1/0042* (2013.01); *B67D 1/0003* (2013.01); *B67D 1/0894* (2013.01); (Continued)

(58) Field of Classification Search
CPC .... B67D 1/124; B67D 1/0014; B67D 1/0081; B67D 1/1405; B67D 2001/1483; B67D 2210/0001; B67D 2210/00065
See application file for complete search history.

(56) References Cited

U.S. PATENT DOCUMENTS

| | | | | |
|---|---|---|---|---|
| 4,437,497 A | * | 3/1984 | Enander | G01F 23/2962 141/70 |
| 9,173,520 B2 | * | 11/2015 | Jungclaus | A47J 31/58 |

(Continued)

FOREIGN PATENT DOCUMENTS

| | | |
|---|---|---|
| CN | 1765270 | 5/2006 |
| CN | 202287831 | 7/2012 |

(Continued)

OTHER PUBLICATIONS

PCT International Search Report and Written Opinion in International Appln. No. PT/KR2020/005791, dated Aug. 12, 2020, 11 pages.

(Continued)

*Primary Examiner* — Timothy L Maust
(74) *Attorney, Agent, or Firm* — Fish & Richardson P.C.

(57) ABSTRACT

A water ejecting apparatus includes a case and a water ejection unit connected to the case. The water ejection unit includes a fixed cover connected to the case, having atop dead point and a bottom dead point, and including a lifting gear provided between the top dead point and the bottom dead point, a lifting cover movably coupled to the fixed cover, a lifting motor coupled to the lifting cover and a gear module interworking with the lifting motor and the lifting gear, a water ejection nozzle for ejecting water, a signal detecting unit that detects a frequency generation (FG) signal generated by the lifting motor during an operation of the lifting motor, and a controller configured to control the operation of the lifting motor upon determining that the lifting cover reaches the top dead point or the bottom dead point based on the FG signal.

10 Claims, 40 Drawing Sheets

(52) U.S. Cl.
CPC ... *F16H 19/04* (2013.01); *B67D 2210/00065* (2013.01); *C02F 2307/10* (2013.01)

(56) References Cited

U.S. PATENT DOCUMENTS

| | | | | |
|---|---|---|---|---|
| 9,301,640 | B2* | 4/2016 | Talon | A47J 31/407 |
| 9,352,950 | B2* | 5/2016 | Berger | B67D 1/0895 |
| 10,053,349 | B2* | 8/2018 | Yoon | B67D 1/0864 |
| 10,267,535 | B2* | 4/2019 | Jeon | H05B 1/0244 |
| 10,343,888 | B2* | 7/2019 | Jeon | B67D 1/1405 |
| 10,465,977 | B2* | 11/2019 | Lee | F25D 23/028 |
| 10,889,483 | B2* | 1/2021 | Jung | B67D 1/0014 |
| 10,941,031 | B2* | 3/2021 | Jung | B67D 1/0014 |
| 10,941,048 | B2* | 3/2021 | Moon | B67D 1/0859 |
| 11,186,475 | B2* | 11/2021 | Kim | B67D 1/0081 |
| 2011/0088568 | A1 | 4/2011 | Farrell et al. | |
| 2017/0153056 | A1 | 6/2017 | Kim et al. | |
| 2017/0231431 | A1 | 8/2017 | Maeng | |
| 2018/0194608 | A1 | 7/2018 | Jeon et al. | |

FOREIGN PATENT DOCUMENTS

| | | |
|---|---|---|
| JP | 2014223942 | 12/2014 |
| KR | 1020100054580 | 5/2010 |
| KR | 101381803 | 4/2014 |
| KR | 1020170063253 | 6/2017 |
| KR | 101818390 | 1/2018 |
| KR | 1020180088591 | 8/2018 |

OTHER PUBLICATIONS

Indian Office Action in Indian Appln. No. 202217004866, dated Apr. 21, 2022, 6 pages.

* cited by examiner (a)        (b)

[CHANGE MOTOR SPEED BY FG SIGNAL]

FIG. 45
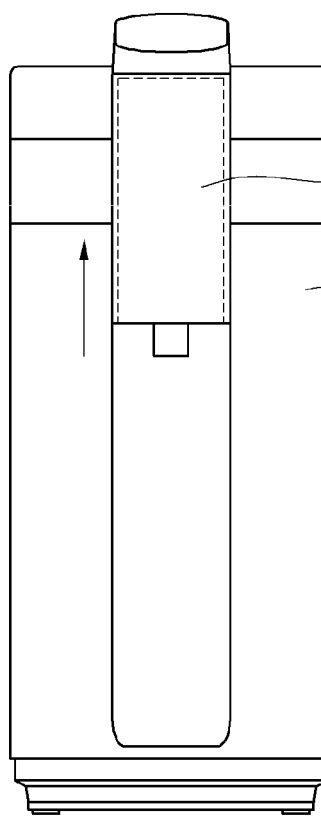
(a)
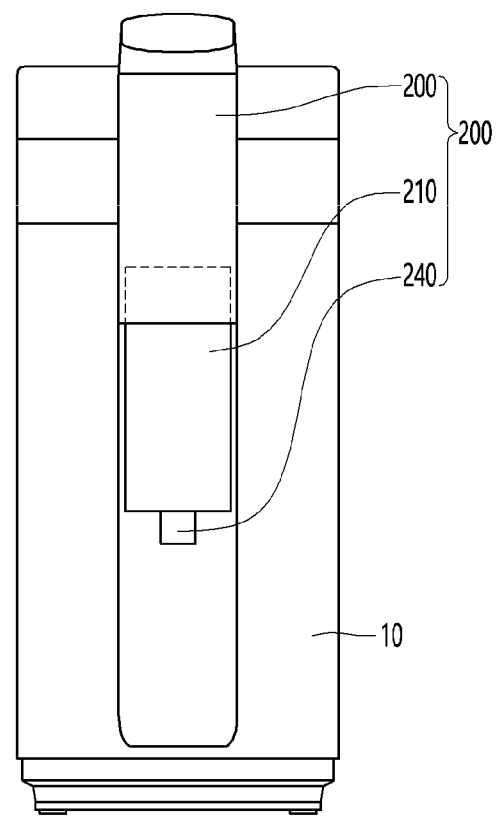
(b)

WATER EJECTING APPARATUS

CROSS-REFERENCE TO RELATED APPLICATION

This application claims a benefit under 35 U.S.C. § 119(a) of Korean Patent Application No. 10-2019-0080353 filed on Jul. 3, 2019, the disclosure of which is incorporated herein by reference in its entirety.

TECHNICAL FIELD

The present disclosure relates to a water ejecting apparatus applicable to a water purifier and a vending machine for drinking water.

BACKGROUND

In general, water purifiers are devices that filter water and supply purified water without impurities. The water purifiers are widely used in household appliances or industries. In particular, the water purifiers may be provided as household water purifiers to provide purified water to users for consumption.

The water purifier includes a water purifier body that mounts a filter and a water ejecting part that provides filtered water from the water purifier body. In general, the water ejecting part is fixedly disposed on a front surface of the water purifier body. A user may place a container under the water ejecting part so that the water ejecting part can dispense water into the container. The fixed position of the water ejecting part limits the placement of a container for dispensing water from the water ejecting part, thereby leaving inconvenience in using the water purifier.

Some water purifiers include a water ejecting part that is provided on one side of a main body. The water ejecting part is coupled to the main body when rotated at a predetermined angle from the main body. In particular, the water ejecting part is separated from the main body by the user, rotated by a set angle, and coupled again with the main body. This way, a user may change the position of the water ejecting part relative to the main body. However, the user needs to disassemble and reassemble the water ejecting part in these water purifiers, thereby causing user inconvenience. In addition, components may be lost and damaged during the disassembling and reassembling. Further, since the water ejecting part connects with a water ejection pipe for discharging purified water, water leakage may result from the disassembling and reassembling. Moreover, since the water ejecting part is rotated and fixed only at a predetermined angle, the position of the water ejecting part is limited. In particular, the water ejecting part may only move in a horizontal direction, and cannot move in a vertical direction. Therefore, it does not meet the needs of the user to place a container in various locations for water dispensing.

Home appliances have been developed to be used with various containers for high water temperature. Although consumers' demands on hot water temperatures and convenience of water ejection from water purifier products have increased and recognized as important factors in product selection, the products in the market have not met such expectation.

Various technologies have been developed and applied to improve ease of use of the water purifiers. However, such technologies have not satisfied consumers' demands. For example, there remain several problems, such as the risk of hot water in the water purifiers, and the contamination of a water ejection nozzle resulting from water splashes. In particular, some water purifiers provide a water ejection nozzle for dispensing purified water, hot water, or cold water from such a height that water splashes when the dispensed water drops and comes into contact with a cup below the water election nozzle.

In addition, some water purifiers may have a risk of burns resulting from splashes of hot water being dispensed. Further, the surroundings of the water purifiers may be contaminated when water splashes. In addition, some water purifiers provide a limited position of the water ejecting part.

Accordingly, it is necessary to develop a water purifier that provides a hygienic environment to consumers, while improving the convenience of the water purifier.

In some water purifiers, when a driving motor and a driving gear rotate, a cock moving gear rotates, a detachable gear part ascends, and a cock part coupled to the detachable gear part ascends to adjust a height. In addition, such water purifiers include a rotation limiting unit provided on the cock body so that the detachable gear rotates only within a certain range. Further, the rotation limiting unit includes a support spring, a fixed hook, and a rotation limiting recess, and the fixed hook is fitted into the rotation limiting recess so that the fixed hook and the detachable gear rotate only within a certain range. While these water purifiers may permit a water ejection nozzle to operate up and down, it is impossible to detect the presence of a container placed under the water ejection nozzle and a height of the container. Also, the water purifiers do not provide techniques for automatically elevating the water ejection nozzle or techniques for detecting the height of the water receiving container placed below the water ejection nozzle, lowering the water ejection nozzle to the corresponding height of the container, and subsequently ejecting water.

In addition, some water purifiers do not provide a space that is sufficient for deformation of a water ejection pipe according to vertical movement of the water ejection nozzle in a small interior of a water ejection unit of the water purifier.

Further, some water purifiers can dispense water when a user manually position a water ejection nozzle at a predetermined height, thereby complicating the water ejecting process.

In addition, some water purifiers include two water ejection nozzles, each of which is operated based on the rotational directions of a motor (CW: left, CCW: right). It is thus difficult to detect a height of a cup. Further, after one of the water ejection nozzles is fixed, it is difficult to immediately handle water ejection from the other water ejection nozzle.

SUMMARY

An aspect of the present disclosure relates to a water ejecting apparatus in which a water ejection nozzle for ejecting water is automatically moved up and down according to driving of a lifting motor.

Another aspect of the present disclosure relates to a water ejecting apparatus which is provided to be rotatable and movable not only in a vertical direction but also in a horizontal direction, thereby increasing user convenience.

Another aspect of the present disclosure relates to a water ejecting apparatus that includes a water ejecting part which can be automatically lifted and manually rotated in a horizontal direction.

Another aspect of the present disclosure relates to a water ejecting apparatus that permits various pipes for water ejection to easily arrange in a water ejection unit, and reduces or minimizes movement of pipes disposed in a case, when the water ejection unit performs rotation and elevating operation, so that deformation of the pipes are reduced or minimized.

Another aspect of the present disclosure relates to a water ejecting apparatus that is capable of more sensitively detecting height and width of various containers placed below a water ejection nozzle.

Another aspect of the present disclosure relates to a water ejecting apparatus that is capable of detecting a height of a light-weight container (e.g., a paper cup and a disposable cup) that is placed below a water ejection nozzle, by minimizing a load that is applied against the container when the water ejecting apparatus contacts with the container to measure the height of the container.

Another aspect of the present disclosure relates to a water ejecting apparatus that is capable of detecting a height of a water receiving container having any size disposed between a water ejection nozzle and a front surface of a case.

Another aspect of the present disclosure relates to a water ejecting apparatus that is capable of adjusting a reaction speed of a touch bar for detecting a water receiving container.

Another aspect of the present disclosure relates to a water ejecting apparatus that provides parts having increased or improved strength for ascending and descending of a water ejection nozzle.

Another aspect of the present disclosure relates to a water ejecting apparatus that prevents shaking or vibration during an elevating operation of a water ejection nozzle.

Another aspect of the present disclosure relates to a water ejecting apparatus that reduces a water splash phenomenon that may result from a hydraulic head based on a distance between a water ejection nozzle and a water receiving container. For example, the water ejecting apparatus of the present disclosure can reduce a water splash by adjusting a height of the water ejection nozzle. In addition, the water ejecting apparatus can reduce or eliminate contamination of the water ejection nozzle, thereby improving hygiene.

Another aspect of the present disclosure relates to a water ejecting apparatus that improves safety by preventing burns that may result from water splashing during hot water ejection.

Another aspect of the present disclosure relates to a water ejecting apparatus that is capable of detecting containers having various sizes of inlets and containers of various heights.

Another aspect of the present disclosure relates to a water ejecting apparatus that is capable of identifying an elevating operation state of a water ejection nozzle even if the operation of the water ejecting apparatus is intervened, such as by a user's accidental or unconscious interference with the apparatus.

Another aspect of the present disclosure relates to a water ejecting apparatus that can dispense water after a water ejection nozzle descends near a water receiving container, which can be determined using a reduced number of sensors.

Additional advantages and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

To achieve these and other advantages and in accordance with the purpose of the invention, as embodied and broadly described herein, particular embodiments described herein include a liquid ejecting apparatus that includes a case and a liquid ejector at least partially protruding from the case. The liquid ejector may include a lifting gear, a lifting cover, a lifting motor, a gear assembly, a liquid ejection nozzle, a signal detecting unit, and a controller. The lifting gear may be connected to the case. The lifting cover may be connected to the case and movable with respect to the case. The lifting motor may be coupled to the lifting cover and configured to generate a frequency generation (FG) signal based on operation of the lifting motor. The gear assembly may be configured to engage with the lifting motor and the lifting gear. The liquid ejection nozzle may be disposed at an end of the lifting cover and configured to eject liquid. The signal detecting unit may be configured to detect the FG signal generated by the lifting motor. The controller may be connected to the signal detecting unit and configured to control the lifting motor. The controller may be configured to determine that the lifting cover reaches a preset top dead point or a bottom dead point based on the FG signal, and change operation of the lifting motor based on the determination.

In some implementations, the apparatus may optionally include one or more of the following features. The liquid ejector may include a fixed cover connected to the case and including the lifting gear. The lifting cover may be at least partially received in the fixed cover and configured to move relative to the fixed cover. The first cover may include the top dead point and the bottom dead point. The lifting gear may be disposed between the top dead point and the bottom dead point of the first cover. The controller may be configured to store at least one of information of a first rotation amount of the lifting motor that causes the lifting cover to move from the top dead point to the bottom dead point, or information of a second rotation amount of the lifting motor that causes the lifting cover to move from the bottom dead point to the top dead point. The controller may be configured stop the operation of the lifting motor based on detection of a value of load in the lifting motor equal to or greater than a reference value as the lifting motor operates to move the lifting cover. The controller may be configured to: receive a rotation amount of the lifting motor; compare the received rotation amount of the lifting motor with the first rotation amount or the second rotation amount; based on the received rotation amount being smaller than the first rotation amount or the second rotation amount, determine that the lifting cover contacts an obstacle or a liquid receiving container before reaching the bottom dead point; and based on a determination that the lifting cover contacts the obstacle or the liquid receiving container before reaching the bottom dead point, control the operation of the lifting motor such that the lifting cover moves away from the obstacle or the liquid receiving container by a preset height and then stops. The controller may be configured to store information of an $n^{th}$ rotation amount of the lifting motor after moving toward the obstacle or the liquid receiving container n times. The information of the $n^{th}$ rotation amount may be used to predict a distance to the top dead point to which the lifting cover moves. The controller may be configured to: receive a rotation amount of the lifting motor based on the FG signal from the lifting motor; compare the received rotation amount of the lifting motor with the first rotation amount or the second rotation amount, as the lifting motor operates to move the lifting cover toward the bottom dead point; based on the received rotation amount being equal to the first rotation amount or the second rotation amount, determine that the lifting cover reaches the bottom dead point; and based on a determination that the lifting cover reaches the bottom dead point, stop the lifting motor. The controller may be configured to lower a rotation speed of the lifting motor based on the lifting cover approaching the bottom dead point. The controller may be configured to open a liquid ejection valve to deliver liquid to the liquid ejection nozzle. The controller may be configured to: receive a rotation amount of the lifting motor based on the FG signal from the lifting motor; compare the received rotation amount of the lifting motor with the first rotation amount or the second rotation amount, as the lifting motor operates to move the lifting cover toward the top dead point; and based on the received rotation amount being equal to the first rotation amount or the second rotation amount, determine that the lifting cover reaches the top dead point. The lifting motor may include a brushless direct current (BLDC) motor. The controller may be configured to adjust a speed of the lifting motor through duty control.

Particular embodiments described herein include a liquid ejecting apparatus that includes a case and a liquid ejector at least partially protruding from the case. The liquid ejector may include a lifting gear, a lifting cover, a gear assembly, a liquid ejection nozzle, a signal detecting unit, a touch bar, a detection sensor, and a controller. The lifting gear may be connected to the case. The lifting cover may be connected to the case and movable with respect to the case. The gear assembly may include a lifting motor that is coupled to the lifting cover. The gear assembly may be configured to engage with the lifting motor and the lifting gear. The liquid ejection nozzle may be disposed at an end of the lifting cover and configured to eject liquid. The signal detecting unit may be configured to detect a frequency generation (FG) signal generated by the lifting motor based on operation of the lifting motor. The touch bar may be at least partially received in the lifting cover and configured to move based on contact with a liquid receiving container that is placed below the liquid ejection nozzle. The detection sensor may be received in the lifting cover and configured to detect movement of the touch bar. The controller may be connected to the signal detecting unit and the detection sensor and configured to control the lifting motor.

In some implementations, the apparatus can optionally include one or more of the following features. The liquid ejector may include a fixed cover connected to the case and including the lifting gear. The lifting cover may be at least partially received in the fixed cover and configured to move relative to the fixed cover. The first cover may include the top dead point and the bottom dead point. The lifting gear may be disposed between the top dead point and the bottom dead point. The controller may be configured to: determine that the detection sensor does not detect the movement of the touch bar; determine that the lifting cover reaches the bottom dead point based on the FG signal detected by the lifting motor; and based on a determination that the detection sensor does not detect the movement of the touch bar and a determination that the lifting cover reaches the bottom dead point, stop the lifting motor. The controller may be configured to: determine that the detection sensor detects the movement of the touch bar; based on a determination that the detection sensor detects the movement of the touch bar, determine that an end of the touch bar becomes to contact with a liquid receiving container; based on a determination that the end of the touch bar contacts with the liquid receiving container, stop the lifting motor; and based on a determination that the end of the touch bar contacts with the liquid receiving container, control the lifting motor to move the lifting cover away from the liquid receiving container by a preset height and subsequently stop the lifting motor. The controller may be configured to store information of an $n^{th}$ rotation amount of the lifting motor after moving toward the liquid receiving container n times. The information of the $n^{th}$ rotation amount may be used to predict a distance to the top dead point when the lifting cover moves. The controller may be configured to store at least one of information of a first rotation amount of the lifting motor that causes the lifting cover to move from the top dead point to the bottom dead point or information of a second rotation amount of the lifting motor that causes the lifting cover to move from the bottom dead point to the top dead point. The controller may be configured to: receive a rotation amount of the lifting motor based on the FG signal from the lifting motor; compare the received rotation amount of the lifting motor with the first rotation amount or the second rotation amount, as the lifting motor operates to move the lifting cover toward the bottom dead point; based on the received rotation amount being equal to the first rotation amount or the second rotation amount, determine that the lifting cover reaches the bottom dead point; and based on a determination that the lifting cover reaches the bottom dead point, stop the lifting motor. The controller may be configured to, based on the lifting cover approaching the bottom dead point, lower a rotation speed of the lifting motor. The controller may be configured to, based on the lifting motor being stopped, open a liquid ejection valve to deliver liquid to the liquid ejection nozzle. The controller may be configured to receive a rotation amount of the lifting motor based on the FG signal from the lifting motor; compare the received rotation amount of the lifting motor with the first rotation amount or the second rotation amount, as the lifting motor operates to move the lifting cover toward the top dead point; and based on the received rotation amount being equal to the first rotation amount or the second rotation amount, determine that the lifting cover reaches the top dead point. The lifting motor may include a brushless direct current (BLDC) motor. The controller may be configured to adjust a speed of the lifting motor through duty control.

To achieve these and other advantages and in accordance with the purpose of the present disclosure, as embodied and broadly described herein, there is provided a water ejecting apparatus including a case and a water ejection unit coupled to one side of the case. The water ejecting part may include a lifting cover that performs an elevating operation with respect to the case. The water ejection unit may include a fixed cover coupled to the case, a lifting cover movably accommodated in a vertical direction inside the fixed cover, a lifting motor coupled to the lifting cover, a gear module interworking with the lifting motor, and a water ejection nozzle to eject water. In some implementations, a circular rotator is rotatably coupled to an inside of the case. The fixed cover may be connected to the rotator.

In another aspect of the present disclosure, there is provided a water ejecting apparatus including a main body including a filter, a cold water generator, a hot water generator, a water pipe, and a freezing device for the cold water generator. The water ejecting apparatus may include a case that forms an outer appearance, and a water ejection unit including a water ejection nozzle.

In some implementations, the water ejection unit may include a motor installed inside a lifting cover, a plurality of following gears connected to a shaft of the motor, a rack coupled to at least one of the following gears and coupled to a fixed cover, and a guide member provided at the fixed cover and the lifting cover. The guide member may linearly guide an elevating operation of the lifting cover. A water ejection pipe that connects the main body with the water ejection nozzle may extend to a lower portion of the lifting cover and may be coupled to the water ejection nozzle that is provided at a lower end of the lifting cover in a horizontal direction.

In some implementations, a separate lighting unit may be provided near the water ejection nozzle. The lighting unit may include a guiding member exposed to the outside of the lifting cover to transfer light and a plurality of light emitting diodes (LEDs) mounted on a board installed in the lifting cover. The lighting unit can output light when the water ejection nozzle performs an elevating operation or when water is ejected from the water ejection nozzle.

In some implementations, the water ejection nozzle and a touch bar may be installed to be partially exposed from the water ejection unit. At least one of the water ejection nozzle and the touch bar can extend toward a front cover that forms a front surface of the main body in a front-rear direction. The touch bar may be coupled to, and rotate about, a plurality of hinges arranged in a front-rear direction. In some implementations, a rotating shaft is provided integrally with the touch bar and may be arranged in parallel with the extending direction of the touch bar. In some implementations, a non-contact infrared (IR) sensor is disposed above the touch bar to detect whether the touch bar ascends or descends in the lifting cover.

In some implementations, the inside of the fixed cover is provided with a metal guide bar of a cylindrical body extending in the up-down direction and a rack gear spaced apart from the metal guide bar and disposed in parallel therewith. Circular holes or recesses may be provided and arranged in a line in the rack gear, so that resistance may work against a phenomenon of bending of the rack gear.

In some implementations, a gear bracket may be coupled to the lifting cover. A driven gear coupled with a motor may be installed on one side of the gear bracket, and a circular guide hole which can vertically slide may be provided on the other side of the gear bracket and contact with an outer circumferential surface of the cylindrical metal guide bar.

In some implementations, the fixed cover or the lifting cover may be disposed at a rear of the motor and the driven gear, and a separator may be provided to partition the space in the front-rear direction, thereby preventing the motor from being short-circuited due to a water splash accident.

The motor may be provided as a BLDC motor, and a plurality of Hall sensors may be arranged on the motor substrate to detect a magnetic force generated in a permanent magnet of the motor rotor to detect a position of the rotor. In some implementations, a direction of rotation, a rotation speed, and other parameters of the motor may be detected by a counter electromotive force and an FG signal of the motor.

An operation and display part may be mounted on an upper portion of the fixed cover, and a water ejecting button may be provided at the operation and display part.

The water ejection pipe coupled to the water ejection unit may include a common pipe and a separate hot water pipe. The common pipe is used to deliver cold water and purified water flow selectively. The common pipe may go through a central axis of a rotator located inside the main body, and the hot water pipe may be separately connected to a hot water generating part.

In another embodiment of the present disclosure, the aforementioned water ejection unit may be horizontally disposed so that at least a portion of the water ejecting unit may be moved forward and backward. The water ejecting unit that can be moved back and forth may include a fixed cover that is coupled to the main body and protrudes forward, and a forward/backward lifting cover that is installed in the fixed cover and movable in a front-rear direction. A water ejection nozzle may be disposed below the forward/backward lifting cover and a pipe connected thereto may be connected to an inside of the main body. The fixed cover may include a metal guide rod of a cylindrical body extending in the front-rear direction and a rack gear spaced apart therefrom and disposed in parallel. In some implementations, circular holes or recesses may be arranged in a line between threads of the rack gear to resist a bending phenomenon. A driven gear coupled with a motor may be installed on one side of the front-rear movement guide member, and a circular guide hole which slides forward and backward may be formed in contact with an outer circumferential surface of the cylindrical metal guide bar on the other side of the front-rear movement guide member.

Example Operations and control methods of the apparatus provided in the present disclosure will be described.

In some implementations, when the user presses a water ejecting button disposed on an operation and display part, the lifting cover located at a top dead point descends on the rack gear according to driving of the motor. In the descending operation, a rotation speed of the motor may be controlled and detected by a plurality of Hall sensors installed in the motor. In this state, when the container is placed on the front surface of the main body, a part of the touch bar that is exposed to the lower surface of the lifting cover becomes to contact with the upper surface of the container, causing the touch bar to rotate upward in the lifting cover so that the non-contact sensor can detect the movement of the touch bar. As a result of the detection, the driving of the motor is immediately stopped, and a pre-programmed control program can cause the motor to reversely rotate by a predetermined amount so that the lifting cover can ascend by a predetermined height and then stop. When the motor is stopped, a water supply valve on the pipe is opened to supply water to the water ejection nozzle, and water is dispensed into the container.

When the water ejection is terminated, the motor rotates reversely, and when the lifting cover ascends and reaches a top dead point, the lifting cover is retrained from further ascending. Then, a hall sensor detects that the rotor stops while power is applied to the motor. Based on the detection, the motor can be immediately stopped, and the operation of the motor is terminated.

In some implementations, if certain resistance occurs in the motor while the lifting cover descends according to a user's water ejection operation request but a container is not detected using the touch bar, the resistance may be recognized as being caused by an obstacle (not a container). In this case, the driving of the motor is immediately stopped, and the descending operation of the lifting cover is stopped. In some implementations, when such resistance occurs in the motor in a forward rotation state, the motor may be reversely rotated, and then water ejection may be performed after the lifting cover ascends by a predetermined height. Alternatively, if such resistance occurs in the motor in the forward rotation state, the motor reversely rotates, the lifting cover ascends to a height of atop dead point, water ejection is not performed, and the operation is terminated.

In some implementations, as the lifting cover moves from the top dead point to the bottom dead point, the LED installed therein emits light so that the user may recognize the elevating operation.

As for control of a rotation speed of the motor, the motor may be controlled such that the lifting cover moves relatively slowly when it moves from the top dead point to the bottom dead point, and moves relatively quickly when it returns from the bottom dead point to the top dead point. In some implementations, when moving from the top dead point to the bottom dead point, a descending speed of the lifting cover may be controlled to gradually decrease in some sections. For example, as it approaches the bottom dead point, the descending speed of the lifting cover may be controlled to gradually decrease.

The method of controlling the vertically movable water ejecting unit described above may be similarly applied to a forward-backward movable water ejecting unit in another embodiment of the present disclosure.

An example method of assembling the apparatus provided in the present disclosure will be described.

In some implementations, the touch bar may be fitted to the lifting cover downward so as to be installed, and the IR sensor for detecting the touch bar is fitted downward so as to be installed inside the lifting cover. Thereafter, a nozzle assembly, in which the water ejection nozzle and the water ejection pipe are included, is fitted downward so as to be installed and subsequently fixed by screws. Thereafter, a separate separator is installed on the rear surface of the lifting cover. Then, the lifting cover is inserted into the fixed cover. Also, a pipe is connected and assembled to the fixed cover and rotator. The motor is mounted on one side of the gear bracket, and a driving gear connected to the rotating shaft of the motor is mounted on the other side. Thereafter, at least one driven gear is connected to the driving gear. Then, a motor cover is fastened to surround the motor. The motor cover may be fastened by a hook method. Further, the driving gear may be covered with a gear cover. Such a coupled configuration may be referred to as a lifting driving assembly. Thereafter, an upper end of the metal guide bar is fitted into the guide hole formed in the lifting cover opposite the rack gear, and the driven gear of the lifting driving assembly is engaged with the rack gear and fitted downward in a space between the fixed cover and the lifting cover so that the lifting driving assembly is installed in the lifting cover. Here, a lower end of the metal guide bar is inserted into and fixed to a coupling recess formed at a protrusion protruding from a lower side of the fixed cover. Then, a screw is fastened in the up-down direction from an upper end of the lifting driving assembly to couple the lifting driving assembly to the lifting cover.

In some implementations, the fixed cover includes a lifting gear extending in the up-down direction. In some implementations, the gear module includes a gear bracket coupled to the lifting cover and a gear that is rotatably installed on the gear bracket and engaged with the lifting gear. Accordingly, the gear can be rotated along the lifting gear according to the operation of the lifting motor, and the lifting cover can be moved relative to the fixed cover in the up-down direction.

In some implementations, an example method of controlling a water purifier according to the present disclosure includes placing the water receiving container on a tray that is disposed vertically downward of the water ejection nozzle, determining a height of the water receiving container, and operating the lifting motor if it is determined that the water ejection nozzle is required to descend or if there is an input from a lifting input unit.

Based on the operation of the lifting motor, the gear coupled to the lifting cover can be rotated and descend along the lifting gear that extends in the up-down direction and mounted to the fixed cover, so that the lifting cover and the water ejection nozzle are moved downward.

Based on an input from a water ejection input unit, water can be ejected from the water ejection nozzle and dispensed into the water receiving container.

In some implementations, the touch bar is located on an imaginary line connecting the center of the water ejection nozzle and the center of the front cover forming the front surface of the case. Alternatively or in addition, the touch bar is located on an imaginary line connecting the center of the water ejection nozzle and the center of the rotator rotatably mounted in the case. In some implementations, a rotation axis of the touch bar is parallel to an extending direction of the touch bar and is spaced apart from one side of the touch bar. In some implementations, a sensor for detecting the touch bar is located above the touch bar. In some implementations, in order for the water ejection nozzle to automatically vertically move, the touch bar, the sensor, and a return spring are disposed in the lifting cover.

In some implementations, when the motor operates, a sensor that detects a frequency generation (FG) signal of the motor detects top and bottom dead points of the lifting cover and controls a height of the elevating of the water ejection nozzle. In some implementations, a lifting distance is calculated using the FG signal to predict and the top dead point and the bottom dead point.

In some implementations, when the lifting cover and the water ejection nozzle are automatically moved up and down, the water ejection pipe, the motor, and the gear move together with the lifting cover and the water ejection nozzle.

In some implementations, the lifting cover and the water ejection nozzle automatically perform an elevating operation by a rack and pinion structure and the motor built in the water ejection unit. A metal cylindrical guide bar and a rack may be arranged on both sides of the fixed cover. The lifting cover may ascend, while being in contact with and supported by the metal cylindrical guide bar and the rack, so that a gap between the fixed cover and the lifting cover is equally maintained at the top dead point and the bottom dead point when the lifting cover and the water ejection nozzle perform an elevating operation.

In some implementations, in order to prevent warpage of the rack, the rack includes holes or recesses of the same pattern at the end of gear teeth of the rack to prevent vertical warpage. The rack can further include an H-beam structure configured to guide during vertical sliding.

In some implementations, a structure is provided to transmit light that is generated from a light source printed circuit board (PCB) (indicator PCB) in the lifting cover to the outside through a transparent cover component.

In some implementations, a cold water pipe can be configured such that a connection portion with the water ejecting piping can rotate to compensate a change in length of the cold water pipe in an internal space. In addition or alternatively, a change in length of a hot water pipe can be compensated by securing a space in the internal space of the case or the water ejection unit where the hot water pipe can flex or bend.

In some implementations, the metal cylindrical guide in the lifting cover may be located at one side or both sides to linearly guide movement of the lifting cover and the water ejection nozzle.

It is to be understood that both the foregoing general description and the following detailed description of the present disclosure are exemplary and explanatory.

The water ejecting apparatus according to embodiments of the present disclosure may provide one or more of the following advantages.

The lifting cover including the water ejection nozzle can move relatively in the up-down direction according to the driving of the lifting motor, thereby increasing user convenience and stability. For example, the water ejection nozzle can descend by simply a user input of pressing the button of the lifting input part or by automatically determining the position or presence of the water receiving container in a tray. Accordingly, user convenience may be further increased.

In some implementations, the water ejection nozzle can descend to a height of the water receiving container, and thus prevent water from splashing or scattering in or around the container. In addition, safety of the user may be ensured when hot water is dispensed.

In some implementations, since the water ejection nozzle is rotatable in the horizontal direction, the user may be able to freely move the water ejection nozzle as necessary.

In some implementations, in order to effectively elevate the water ejection nozzle within the limited size of the water ejection unit, the gear of the rack and pinion and the multi-step gear are applied, whereby water splashing may be reduced by adjusting a height of the water ejection nozzle, and hygiene may be improved in using the apparatus.

In some implementations, instead of using a mechanical container detection technology that limitedly performs detection based on types and sizes of the container, the apparatus according to the present disclosure can advantageously detect any container disposed between the water ejection nozzle and the front surface of the case through the linear touch bar disposed between the water ejection nozzle and the front surface of the case.

In some implementations, various pipes for water ejection may be easily disposed in the water ejection unit. Further, when the water ejection unit rotates or elevates, the movement of the pipes disposed inside the case may be minimized and thus deformation of the pipes are minimized.

In some implementations, containers having various heights and various inlet sizes may be accurately detected without being damaged when placed below the water ejection nozzle. For example, a paper cup having a light weight may be relatively easily collapsed or crushed due to a contact force by the touch bar that contacts the cup. However, the touch bar of the present disclosure has a lightweight structure. In addition, the apparatus according to the present disclosure is configured to adjust strength of an elastic member to provide elasticity to the touch bar. Therefore, according to the present disclosure, when the water ejection nozzle descends and the light-weight touch bar touches the paper cup, a less load is applied to the edge of the paper cup, so that the paper cup does not collapse or crush while the touch bar can move upward against the paper cup. As such, the apparatus according to the present disclosure implements a lightweight touch bar structure and contacting operation and thus may dispense water after detecting the height of a container even if the container is a paper cup, a disposable cup, etc., which is light in weight.

In some implementations, the apparatus of the present disclosure exposes only a small portion of the touch bar so that a contact area that contacts with the edge of the water receiving container is reduced, thereby minimizing contamination of the edge of the water receiving container.

In some implementations, when the touch bar that is installed at the lifting cover detects the contact of the container, the lifting cover moves upward by a certain distance and then is stopped. Therefore, interference between the water ejection nozzle and the water receiving container may be minimized, and thus a user can easily pull out the water receiving container from below the water ejection nozzle.

In some implementations, the apparatus according to the present disclosure can detect the height of a water receiving container of any size when it is disposed between the water ejection nozzle and the front of the case. In some implementations, the apparatus according to the present disclosure can adjust a reaction speed of the touch bar that detects the water receiving container. In some implementations, the apparatus according to the present disclosure is configured to increase strength of the parts for elevating the water ejection nozzle. In some implementations, vibration or shaking of the apparatus or parts thereof may be prevented or reduced during the elevating operation of the water ejection nozzle. In some implementations, water splashing is reduced and hygiene is improved as the height of the water ejection nozzle can be adjusted. In some implementations, inlet sizes and heights of various containers may be detected. In some implementations, an elevating operation of the water ejection nozzle may be identified even if the operation is intervened such as by a user's accidental or unconscious interference with the apparatus. In some implementations, the apparatus according to the present disclosure can reduce the number of sensors in performing water ejection after the water ejection nozzle descends near the water receiving container.

BRIEF DESCRIPTION OF THE DRAWINGS

The accompanying drawings, which are included to provide a further understanding of the present disclosure and are incorporated in and constitute a part of this application, illustrate embodiments of the present disclosure and together with the description serve to explain the principle of the present disclosure. In the drawings:

FIG. 45 is a view showing a state where a lifting cover and a water ejection nozzle are automatically elevated according to the present disclosure.

DETAILED DESCRIPTION

Figure 1:
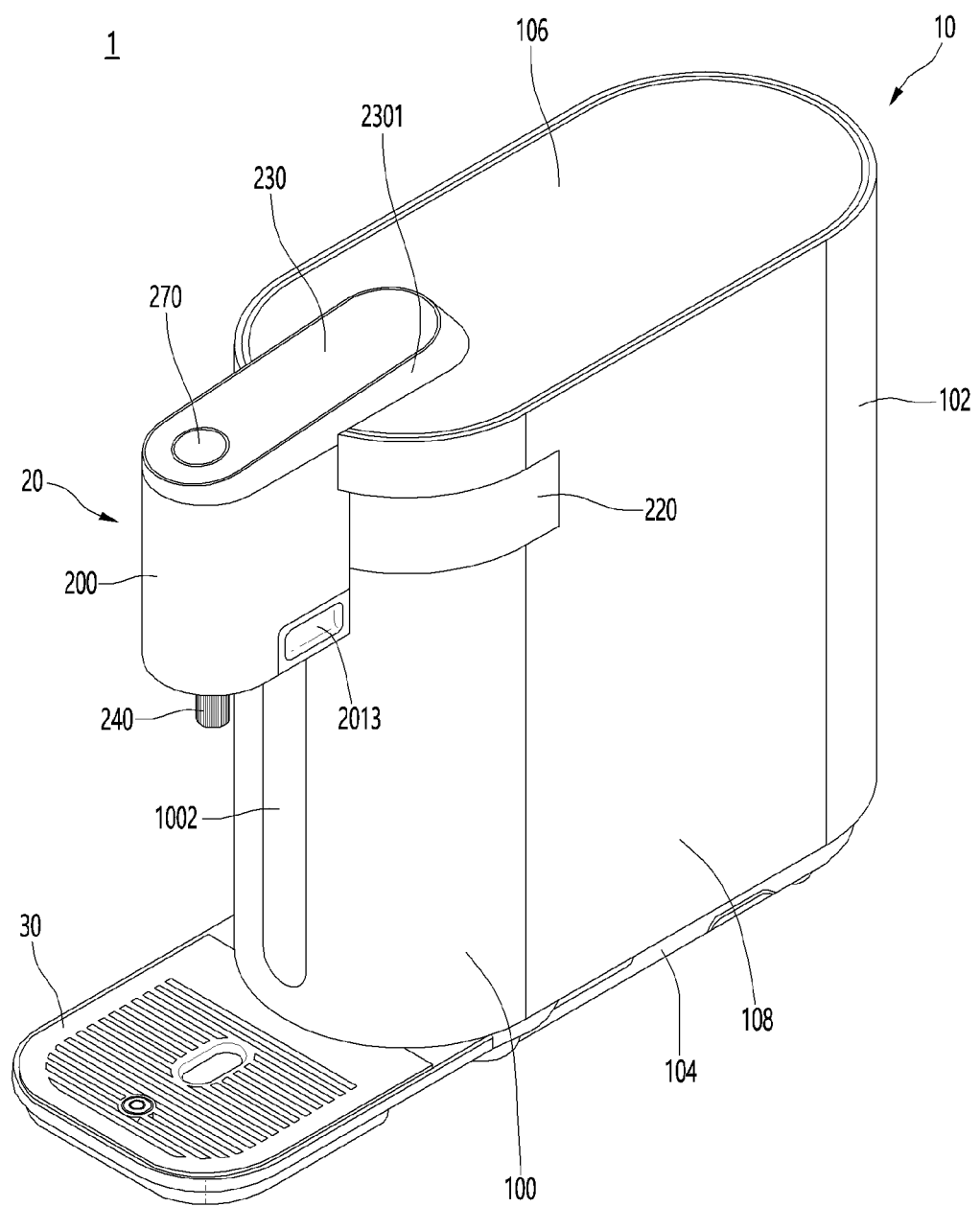
FIG. 1 is a view showing a water purifier according to an embodiment of the present disclosure.

Hereinafter, exemplary embodiments of the present disclosure will be described in detail with reference to the accompanying drawings. In adding reference numerals for elements in each figure, it should be noted that like reference numerals already used to denote like elements in other figures are used for elements wherever possible. Moreover, detailed descriptions related to well-known functions or configurations will be ruled out in order not to unnecessarily obscure subject matters of the present disclosure.

FIG. 1 is a view showing a water ejecting apparatus according to an embodiment of the present disclosure. In this document, the water ejecting apparatus may refer to a variety of water ejecting apparatuses that supply raw water in a drinkable state, such as a water purifier, a drinking water vending machine, a coffee machine, and other suitable apparatuses. As shown in FIG. 1, the water ejecting apparatus 1 according to the present disclosure includes a case 10 that forms an outer appearance, and a water ejection unit 20 coupled to a side of the case 10.

The case 10 defines an internal space in which various components to be described later are installed. For example, as shown in FIG. 1, the case 10 may have a cylindrical shape. However, this is an exemplary shape and the case 10 may have various other shapes.

The case 10 may be made by coupling a plurality of plates. For example, the case 10 includes a front cover 100, a rear cover 102, a base cover 104, a top cover 106, and a pair of side covers 108. Here, these covers may define front, rear, lower, upper and side surfaces of the water ejecting apparatus 1.

In some implementations, the covers may be connected to one or more of the other covers through a coupling member or coupling structure. For example, the front cover 100 and the rear cover 102 are spaced apart from each other forward and backward. In addition, a pair of side covers 108 may connect to the front cover 100 and the rear cover 102 to form a circumference of the water ejecting apparatus 1. Atop cover 106 is coupled to upper ends of the front cover 100, the rear cover 102, and the pair of side covers 108. In addition, a base cover 104 is coupled to lower ends of the front cover 100, the rear cover 102, and the pair of side covers 108. The base cover 104 is understood as a part seated on a bottom surface on which the water ejecting apparatus 1 is installed.

In some implementations, the front cover 100 and the rear cover 102 are bent at a predetermined curvature, and the pair of side covers 108 may be formed as a flat plate. For example, the front cover 100 and the rear cover 102 may be formed to be convex forward and backward, respectively. The base cover 104 and the top cover 106 have rounded peripheries at their front and rear ends to correspond to the curved shapes of the front cover 100 and the rear cover 102.

In some implementations, a flat portion 1002 may be provided in an up-down direction at the center of the front cover 100. The flat portion 1002 may function as a center point (e.g., a reference point) for describing rotation of the water ejection unit 20 relative to the case, as described later in more detail. In some implementations, the flat portion 1002 may be a recessed portion in the front cover 100 that protrudes forward. The front surface of the front cover 100 can provide a portion or space in which a user disposes a container such as a cup (hereinafter, referred to as a water receiving container) for taking water. Accordingly, the flat portion 1002 can be formed so that the user may place the water receiving container more closely toward the case (e.g., the front cover 100) and the water receiving container may be stably supported.

In some implementations, the water ejecting apparatus 1 includes a tray 30 on which the water receiving container is seated. The tray 30 is connected to the base cover 104 and is disposed to protrude forward. Therefore, the tray 30 may be understood as forming a lower surface of the water ejecting apparatus 1 together with the base cover 104.

The tray 30 may be positioned vertically below the water ejection nozzle 240. In some implementations, the tray 30 may include a structure for receiving water that is not received in the water receiving container or drips outside the container. For example, the tray 30 may include a grille and a storage part below the grille.

The water ejection unit 20 may be coupled to, and protrude from, one side of the case 10. For example, the water ejection unit 20 may be arranged to protrude forward from the front cover 100 and the top cover 106. In addition, the water ejection unit 20 is coupled in communication with the case 10.

The water ejection unit 20 includes a water ejection top cover 230, water ejection lifting covers 200 and 210, and a rotator 220. Each cover may form an outer appearance of the water ejection unit 20.

Figure 3:
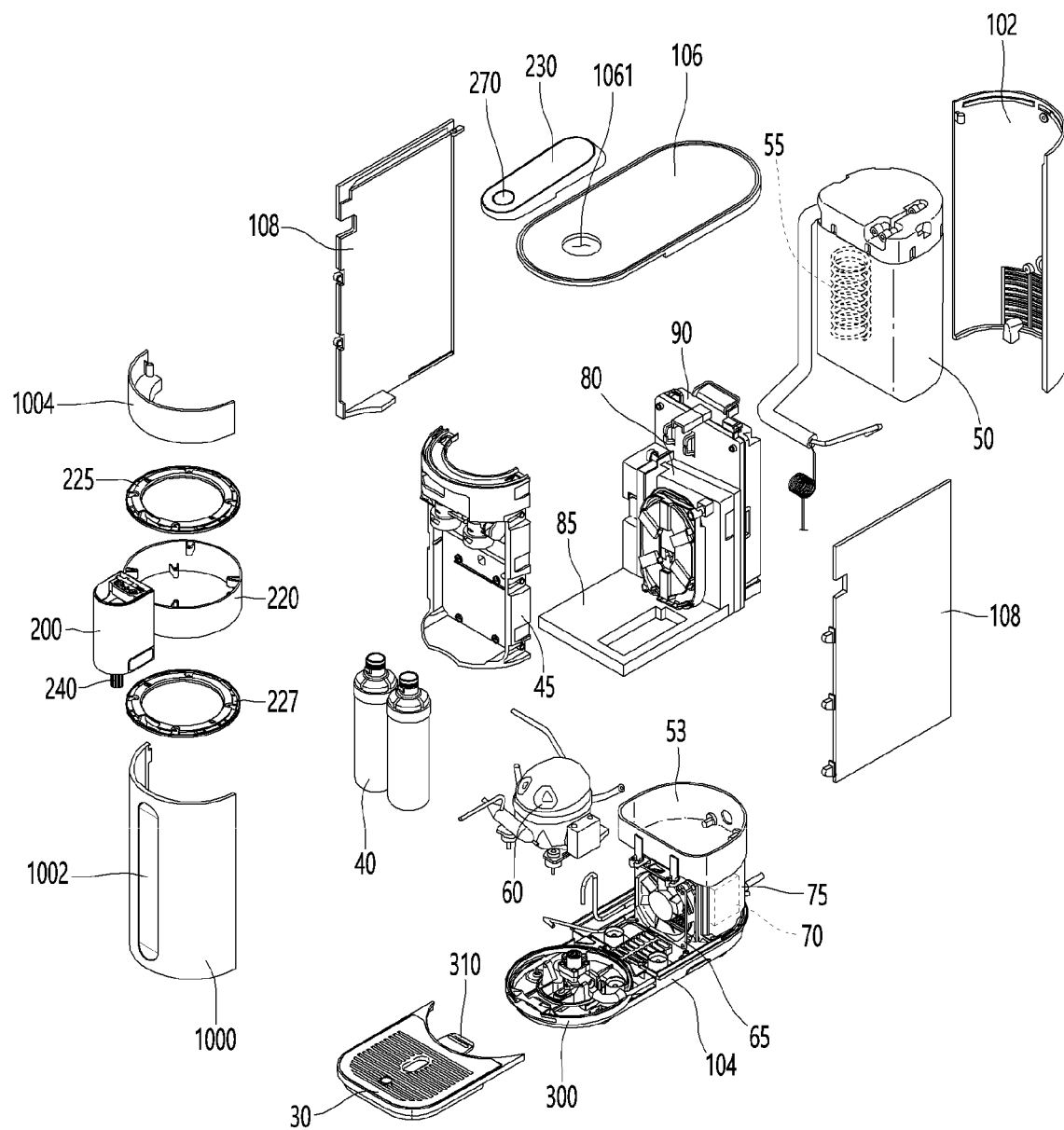
FIGS. 3 and 4 are exploded views of a water purifier according to an embodiment of the present disclosure.

The rotator 220 is seated on the case 10. Referring to FIG. 3, the rotator 220 is provided in a cylindrical shape corresponding to curvature of the front cover 100. The rotator 220 can be disposed such that the front cover 100 is divided into upper and lower portions. Accordingly, the front cover 100 is divided into a lower front cover 1000 coupled with the base cover 104 and an upper front cover 1004 coupled with the top cover 106.

The upper front cover 1004 can have a smaller cross-sectional area than the lower front cover 1000. Therefore, the upper front cover 1004 is understood as an auxiliary portion in forming the outer appearance. The lower front cover 1000 is understood as a portion in which the flat portion 1002 is formed, and disposed on one side of the water receiving container.

The water ejecting lifting covers 200 and 210 can be disposed to protrude forward from the front cover 100. For example, the water ejecting lifting covers 200 and 210 protrude convexly to the outside from the rotator 220. The water ejection top cover 230 extends from the top cover 106 to cover the upper ends of the water ejection lifting covers 200 and 210.

The water ejection top cover 230 may include various input units 270 through which a user inputs a predetermined command. The input unit 270 may be provided in various forms such as a button and a touch-sensitive element. Although the input unit 270 is illustrated as a single input element in FIG. 1, the input unit 270 may include multiple elements.

The water ejection top cover 230 may include aside wall portion 2301. One side of the side wall portion 2301 may be rotatably coupled to the top cover 106 and the other side of the side wall portion 2301 may be coupled to an upper side of the water ejection lifting covers 200 and 210. The one side of the side wall portion 2301 that is coupled to the top cover 106 may be higher than the other side thereof coupled to the upper side of the water ejection lifting covers 200 and 210. Therefore, the water ejection top cover 230 may be spaced apart from the top cover 103 by the side wall portion 2301, and the water ejection top cover 230 may be downwardly inclined toward the water ejection unit 20 from the case 10. Accordingly, readability of the input unit 270 and a display unit may be improved.

A wiring hole 1061 (see FIG. 3) may be formed in the top cover 106. Various wires may pass through the wiring hole 1061 and may be connected to the input unit 270 and the display unit.

The water ejection top cover 230 and the side wall portion 2301 may be supported on the wiring hole 1061 (e.g., by contacting a portion surrounding the wiring hole 1061) and rotate with respect to the wiring hole 1061. Therefore, wire twisting may be reduced when the water ejection top cover 230 and the side wall portion 2301 rotate.

The water ejection unit 20 includes a water ejection nozzle 240 through which a predetermined amount of water is dispensed. The water ejection nozzle 240 is installed to extend downward and may be disposed to be exposed below the water ejection lifting covers 200 and 210. As described above, the tray 30 is disposed vertically below the water ejection nozzle 240.

A water ejection pipe (as described herein) that is connected to the water ejection nozzle 240 is disposed inside the water ejection unit 20. The water ejection pipe may extend from the inside of the case 10 to the inside of the water ejection unit 20 and be coupled to the water ejection nozzle 240.

The water ejection unit 20 of the water ejecting apparatus 1 according to the present disclosure may be moved so that a position of the water ejection nozzle 240 is changed. This will be described in detail hereinafter.

Figure 2:
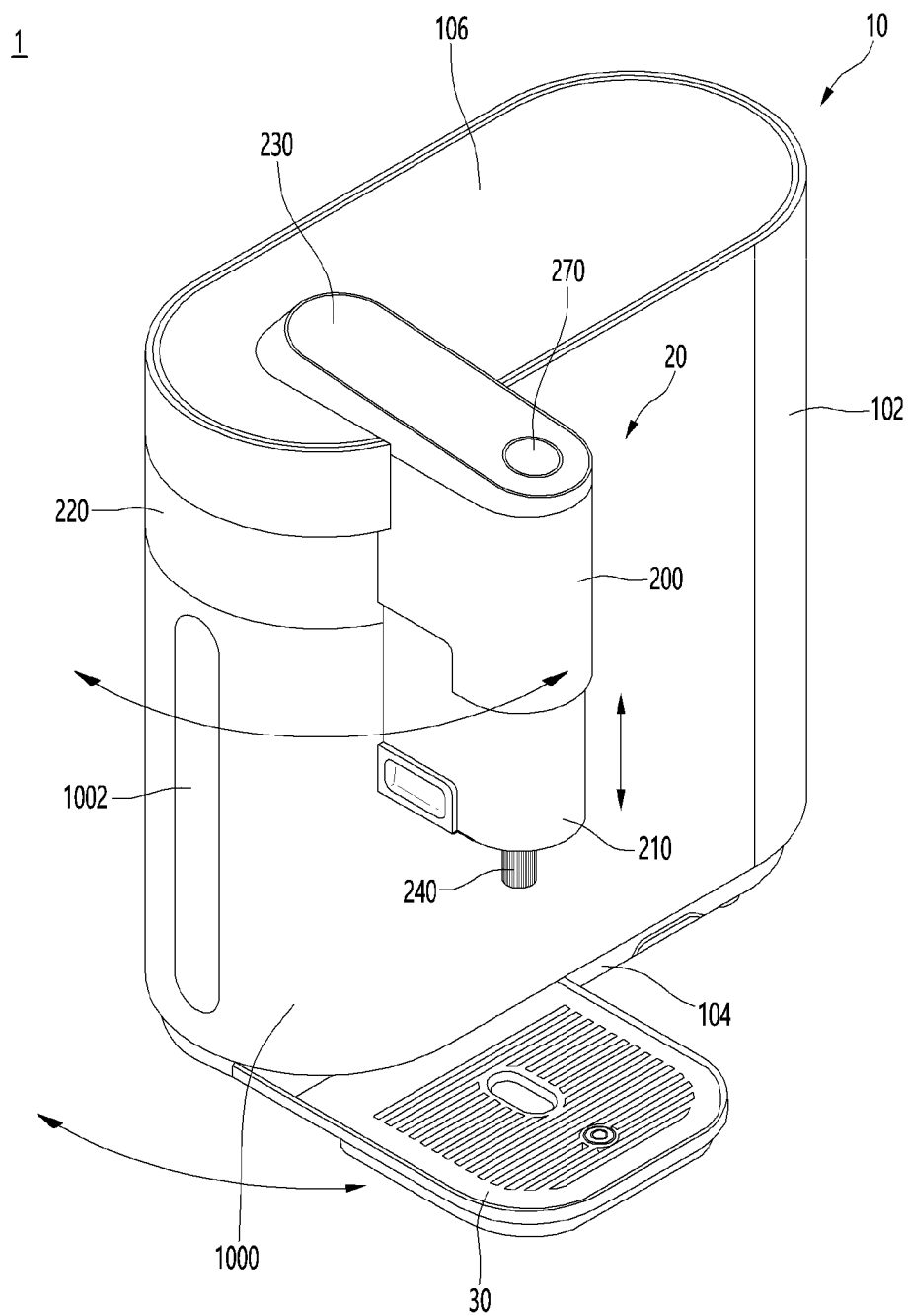
FIG. 2 is a view showing a state where a position of a water ejection nozzle of a water purifier is changed according to an embodiment of the present disclosure.

FIG. 2 is a view showing an example position of the water ejection nozzle of the water ejecting apparatus that is changed according to an embodiment of the present disclosure. As shown in FIG. 2, the water ejection unit 20 can rotate or move vertically. Accordingly, the water ejection nozzle 240 may be rotated or moved vertically. In addition, the tray 30 may be rotated according to the rotation to the water ejection nozzle 240.

First, the rotation mechanisms of the water ejection unit 20 will be described. The water ejection unit 20 may be rotated as the rotator 220 is rotated. That is, as the rotator 220 is rotated, the water ejection lifting covers 200 and 210, the water ejection top cover 230, and the water ejection nozzle 240 may be rotated.

For example, the water ejection unit 20 may be rotated along the front cover 100 and have a rotation radius of approximately 180 degrees. In addition, as the input unit 270 is formed on the water ejection top cover 230, it is rotated together with the water ejection unit 20 to correct user convenience.

The tray 30 can be rotatably coupled to the base cover 104 and rotated to correspond to the water ejection unit 20. The tray 30 may also have a rotation radius of approximately 180 degrees.

Second, the lifting mechanisms of the water ejection unit 20 will be described. The water ejection unit 20 includes water ejection lifting covers 200 and 210. The water ejection lifting covers 200 and 210 may be moved up and down based on the case 10 as a whole. At least a portion of the water ejection lifting covers 200 and 210 may move up or down based on the case 10.

For example, the water ejection lifting covers 200 and 210 include a lifting cover 210 which performs an elevating operation (i.e., which moves up and down) based on the case 10. As another example, the water ejection lifting covers 200 and 210 include a fixed cover 200 connected to the case 10 and a lifting cover 210 movably coupled to the fixed cover 200. The fixed cover 200 may be fixed to the rotator 220.

In addition, the water ejection top cover 230 may be coupled to an upper end of the fixed cover 200. The lifting cover 210 may be disposed inside the fixed cover 200 and may be moved along the fixed cover 200. In addition, the water ejection nozzle 240 may be installed on the lifting cover 210 and moved together with the lifting cover 210.

The water ejection unit 20 may be rotated and elevated independently. That is, the rotation and lifting of the water ejection unit 20 may be performed simultaneously or separately. For example, the rotation of the water ejection unit 20 may be performed while the water ejection unit 20 remains at a height (e.g., an installation position), and the lifting of the water ejection unit 20 may be performed based on a height of the water receiving container placed under the water ejection unit 20.

In addition, the water ejection unit 20 may have a structure that is rotated or lifted. That is, the water ejection unit 20 may have a structure lifted without being rotated. Accordingly, the rotator 220 may be fixed to the case 10 and disposed.

Hereinafter, an internal configuration of the water ejecting apparatus 1 will be described in detail.

Figure 4:
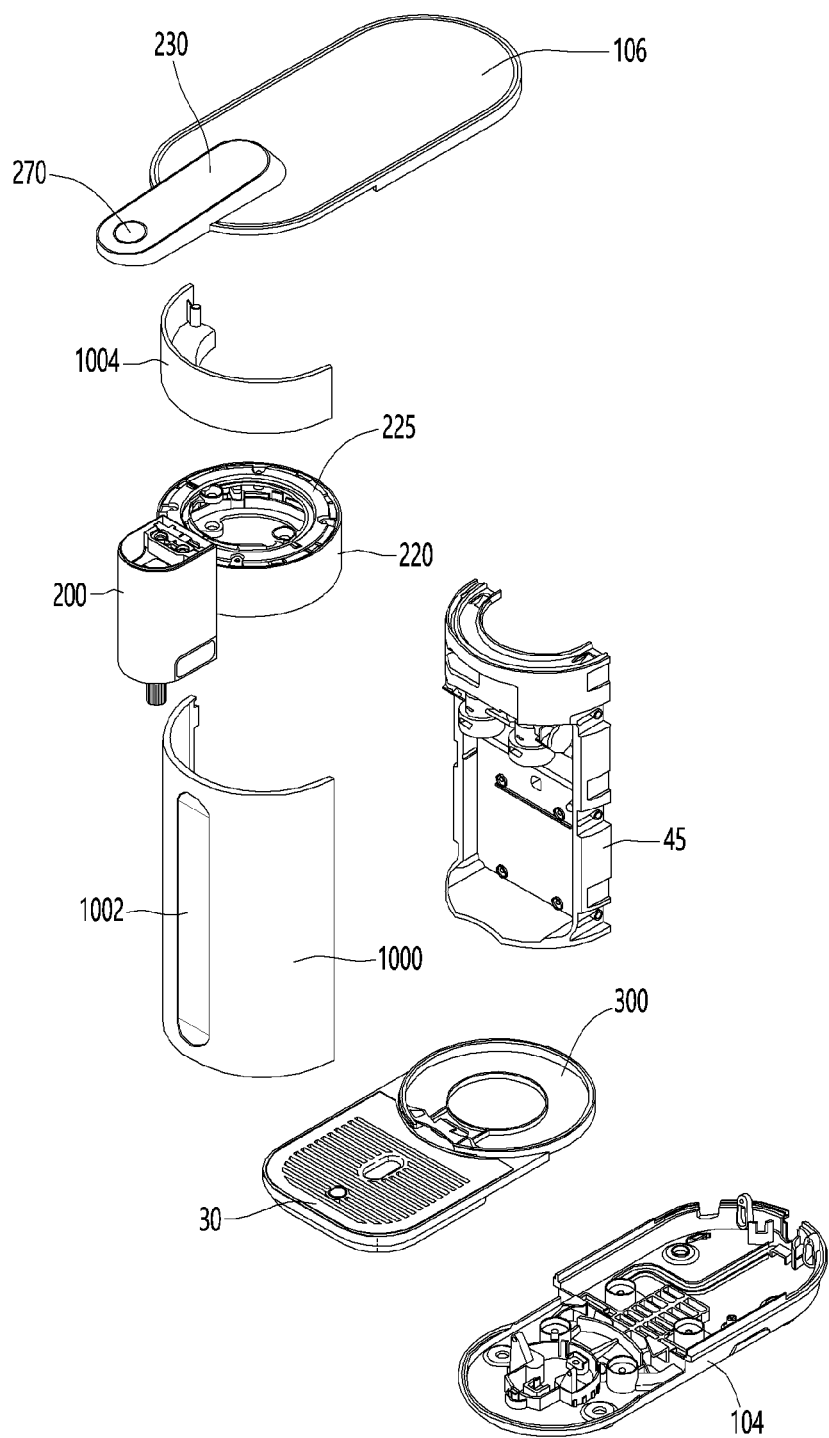

FIGS. 3 and 4 are exploded views of a water ejecting apparatus according to an embodiment of the present disclosure. FIG. 4 is a partial exploded view of some components of the water ejecting apparatus of FIG. 3 for convenience of understanding.

The water ejecting apparatus 1 shown in FIGS. 3 and 4 may have a configuration capable of supplying purified water, cold water, and hot water. However, this is merely an example, and the configuration of the water ejecting apparatus 1 is not limited to those described herein. Some of the configurations may be omitted, and/or other components may be added. For the convenience of the description, piping for delivering water is omitted in FIGS. 3 and 4.

As illustrated in FIGS. 3 and 4, the water ejecting apparatus 1 includes a filter 40 disposed in the case 10, a cooling tank 50, a compressor 60, a condenser 70 and an induction heating assembly 80. In addition, a filter bracket 45 in which the filter 40 is mounted is provided in the case 10. The filter bracket 45 may be seated on the base cover 104 adjacent to the front cover 100. In addition, the rotator 220 may be seated on the filter bracket 45. That is, the filter bracket 45 may be provided at a height corresponding to the lower front cover 1000. Upper and lower ends of the filter bracket 45 may be provided in a semicircle shape having a curvature corresponding to the front cover 100. In addition, the filter bracket 45 may form a space recessed backward so that the filter 40 may be accommodated therein.

In some implementations, the filter 40 is disposed in a space formed between the filter bracket 45 and the front cover 100. The filter 40 is configured to purify raw water (tap water) being supplied. The filter 40 may be made by a combination of filters having various functions. That is, the filter 40 may be provided in various numbers and various shapes.

In some implementations, the filter bracket 45 may be provided with various valves to be connected to respective pipes. For example, a pipe through which water flowing into the filter 40 flows and a pipe through which purified water flows from the filter 40 may be connected to the filter bracket 45.

In some implementations, water purified by the filter 40 may be supplied to the cooling tank 50 and the induction heating assembly 80 or the water ejection nozzle 240. That is, water purified by the filter 40 may be supplied in the form of cold water, hot water and purified water.

The compressor 60 and the condenser 70 form a refrigeration cycle together with an evaporator 55 disposed in the cooling tank 50. That is, the compressor 60 and the condenser 70 may be understood as components for supplying cold water. The compressor 60 and the condenser 70 may be seated on the base cover 104. For example, the compressor 60 and the condenser 70 may be disposed behind the filter bracket 45. In addition, a cooling fan 65 is disposed between the compressor 60 and the condenser 70. The cooling fan 65 is understood as a component for cooling the compressor 60 and the condenser 70.

In some implementations, the compressor 60 may be an inverter-type compressor that may control cooling capacity by varying a frequency. Therefore, purified water may be efficiently cooled, thereby reducing power consumption. In addition, the condenser 70 may be positioned at a position corresponding to a discharge port formed at the rear cover 102. The condenser 70 may be formed by bending a plurality of flat tube type refrigerant tubes in order to efficiently use a space and improve heat exchange efficiency. In addition, the condenser 70 may be accommodated in a condenser bracket 75. The condenser bracket 75 is provided to form a space having a shape corresponding to an overall shape of the condenser 70 to accommodate the condenser 70. In addition, the condenser bracket 75 is formed such that portions facing the cooling fan 65 and a discharge port of the rear cover 102 are opened so that the condenser 70 may be effectively cooled.

A tank mounting part 53 in which the cooling tank 50 is accommodated is disposed on an upper portion of the condensation bracket 75. The tank mounting part 53 can be a component for fixing the cooling tank 50. For example, the tank mounting part 53 is provided so that a lower end of the cooling tank 50 is inserted.

The cooling tank 50 is for cooling purified water to produce cold water and is filled with a coolant for heat exchange with purified water flowing into the cooling tank 50. In addition, an evaporator 55 for cooling the coolant may be accommodated in the cooling tank 50. In addition, the purified water may be cooled so as to pass through the inside of the cooling tank.

The induction heating assembly 80, which is for heating purified water, is configured to heat purified water according to an induction heating (IH) method. The induction heating assembly 80 may heat water at an instant and rapid rate during hot water ejection operation and may heat purified water to a desired temperature by controlling an output of a magnetic field and provide the heated purified water to the user. Therefore, hot water at a desired temperature may be dispensed according to a user's operation.

The induction heating assembly 80 is seated and installed on a support plate 85. The support plate 85 extends from the filter bracket 45 to the cooling tank 50. The support plate 85 is provided above the compressor 160.

In some implementations, the water ejecting apparatus 1 includes a controller 90. The controller 90 may control the components described above to control the driving of the water ejecting apparatus 1. For example, the controller 90 is configured to control the compressor 60, the cooling fan 65, various valves, sensors, and the induction heating assembly 80. The controller 90 may be configured to be modularized by a combination of PCBs divided into a plurality of parts for each function.

The controller 90 may function to heat purified water together with the induction heating assembly 80. Accordingly, the controller 90 is disposed on one side of the induction heating assembly 80. For example, the controller 90 may be coupled with the induction heating assembly 80 as one module and seated on the support plate 85.

The water ejecting apparatus 1 includes a rotating structure of the water ejection unit 20. That is, the water ejecting apparatus 1 includes a structure that rotatably receives the rotator 220 and the tray 30. In some implementations, as shown in FIGS. 3 and 4, the rotating structure includes rotation mounting parts 225 and 227 that are coupled to the rotator 220. The rotation mounting parts 225 and 227 are provided in a ring shape having an outer diameter corresponding to the rotator 220. For example, guide rails are formed on the rotation mounting parts 225 and 227, and the rotator 220 may be slidably moved along the guide rails. In addition, the rotation mounting parts 225 and 227 may be provided as a pair of plates between which ball bearings or rollers are disposed.

The rotation mounting parts 225, 227 include an upper rotation mounting part 225 that is coupled to an upper end of the rotator 220, and a lower rotation mounting part 227 that is coupled to a lower end of the rotator 220. The lower rotation mounting part 227 may be fixed to an upper end of the filter bracket 45. The upper rotation mounting part 225 may be fixed to a lower end of the upper front cover 1104.

In some implementations, as shown in FIGS. 3 and 4, a tray mounting part 300 can be coupled to the tray 30. The tray mounting part 300 is fixed to the base cover 104 and is provided in a ring shape having an outer diameter corresponding to a front end of the base cover 104. The tray 30 can include a tray hook 310 that is coupled to the tray mounting part 300. The tray 30 can be detachably hooked to the tray mounting part 300. Therefore, the user may easily remove and wash the tray 30.

Hereinafter, the lifting structure of the water ejection unit 20 will be described in detail.

Figure 5:
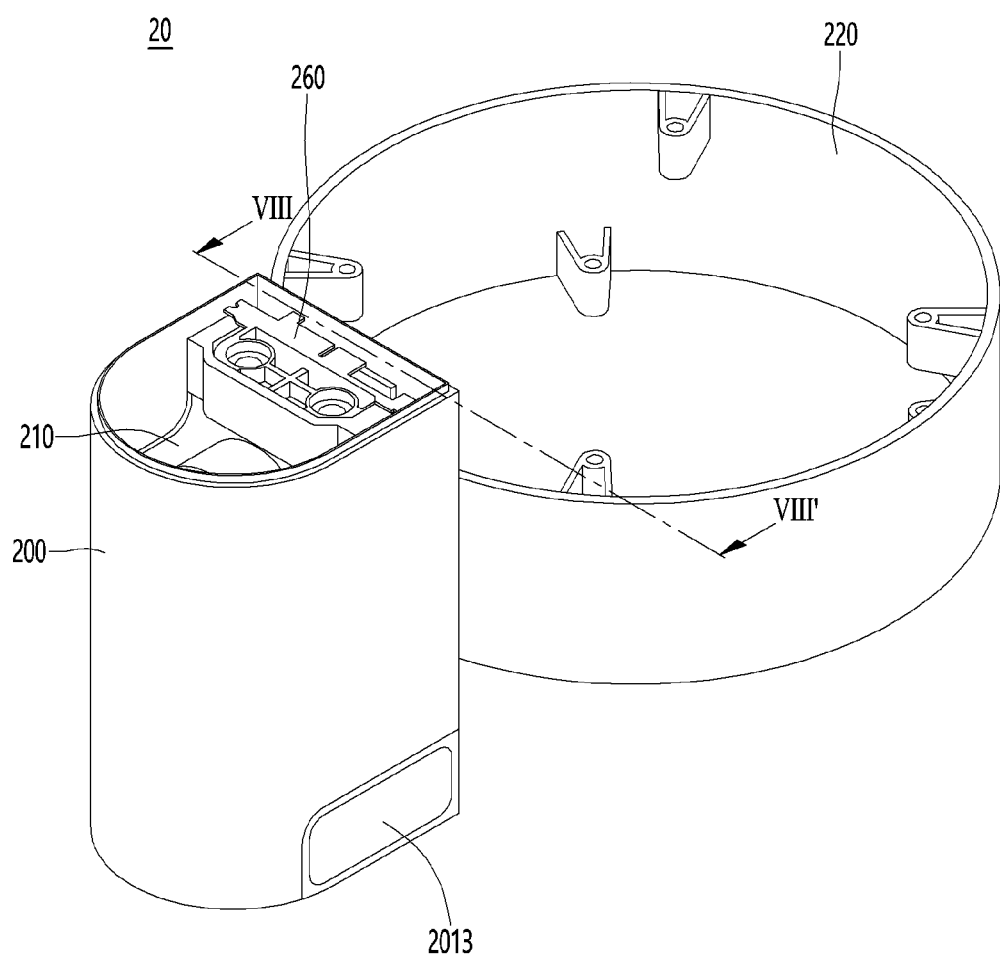
FIG. 5 is a view showing the water ejection unit of a water purifier according to an embodiment of the present disclosure.
Figure 6:
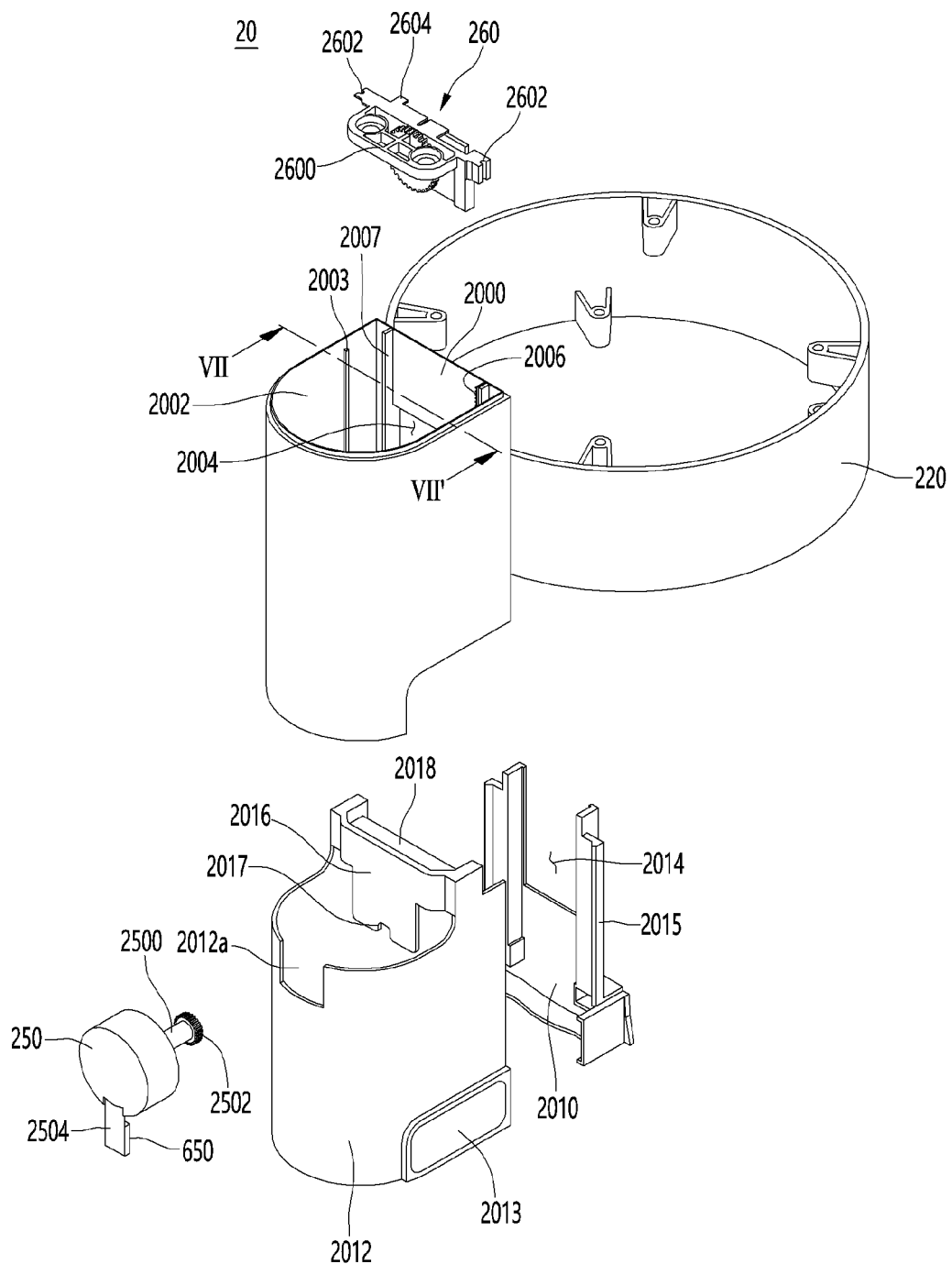
FIG. 6 is an exploded view of a water ejection unit of a water purifier according to an embodiment of the present disclosure.
Figure 7:
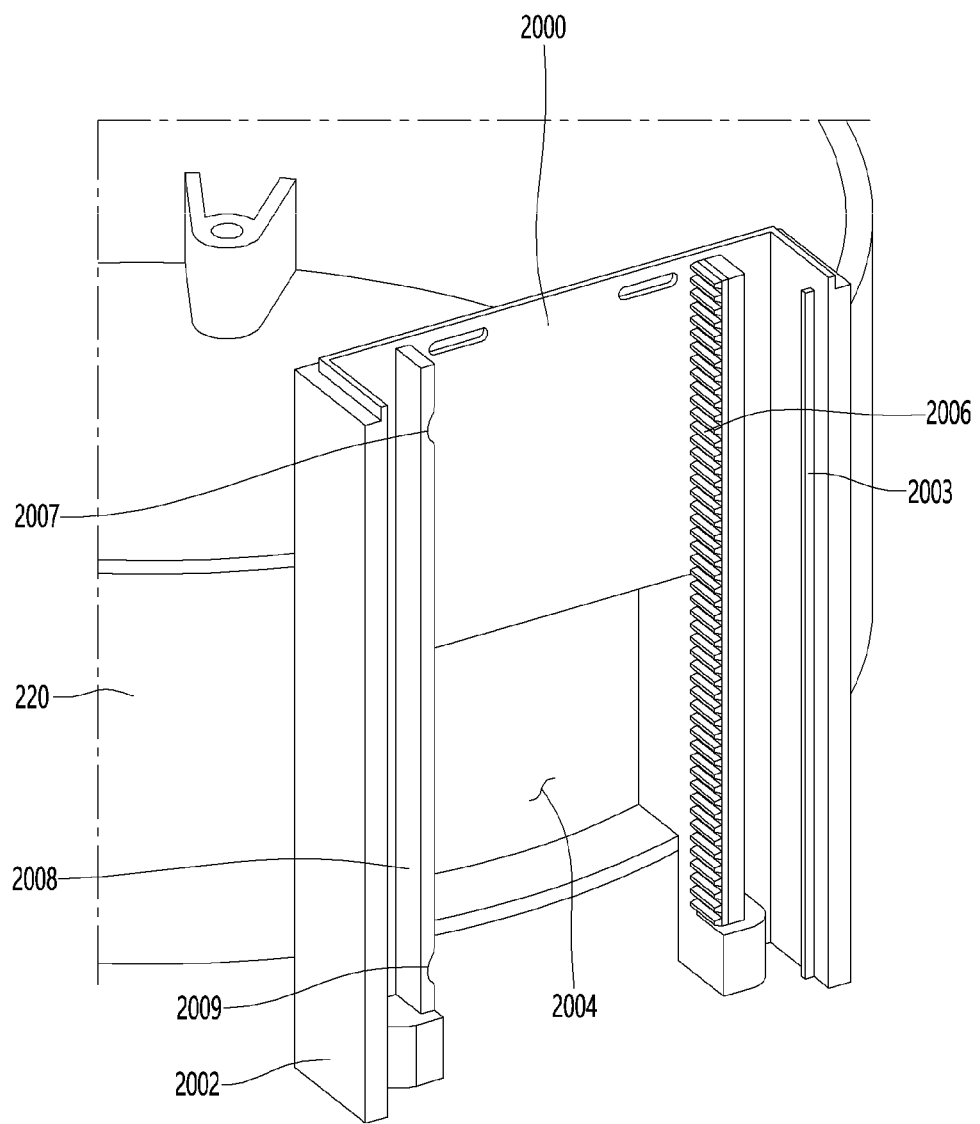
FIG. 7 is a cross-section view taken along line VII-VII' of FIG. 6.
Figure 8:
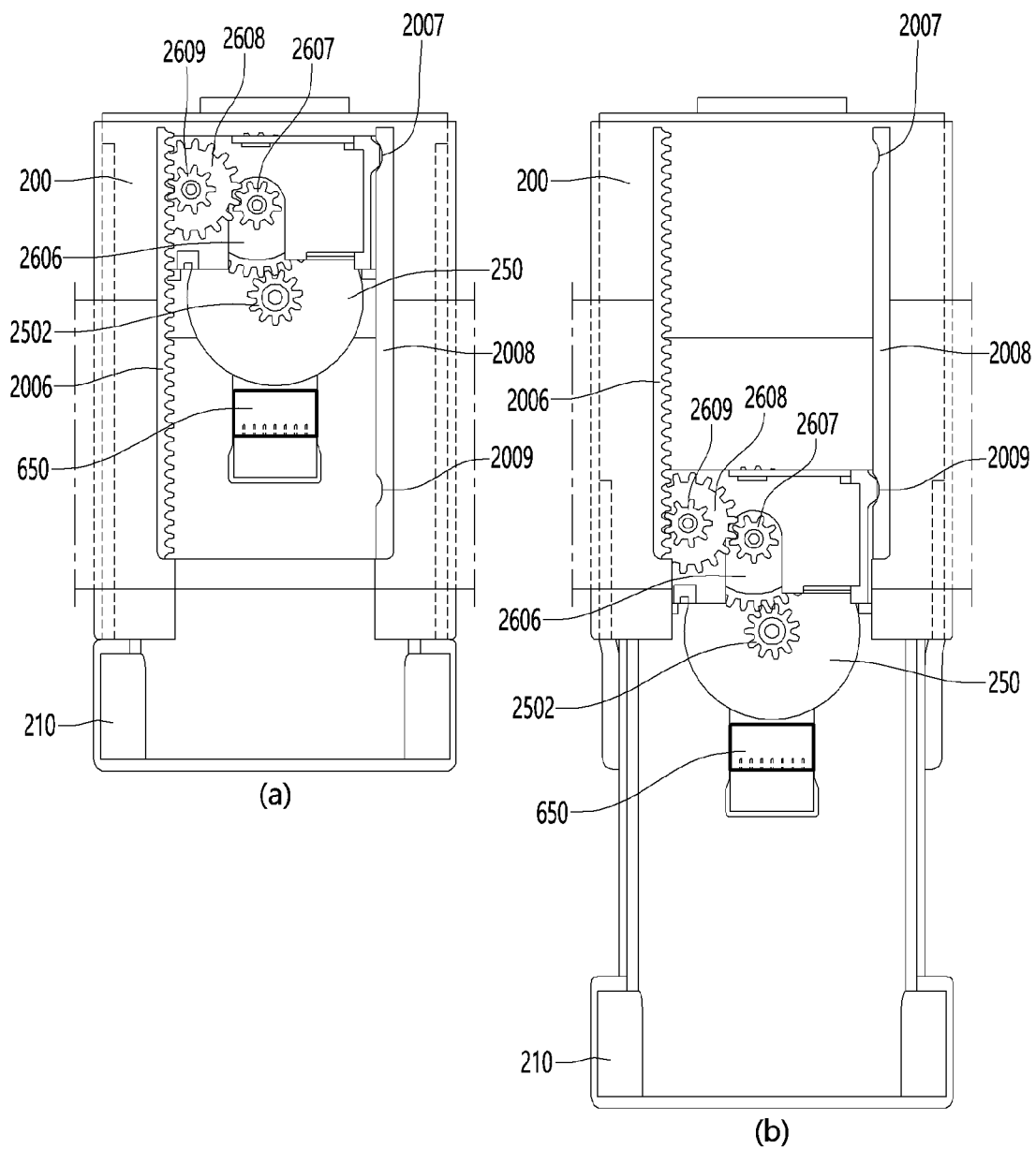
FIG. 8 is a cross-sectional view taken along line VIII-VIII' together with movement.

FIG. 5 is a view showing a water ejection unit of the water ejecting apparatus according to an embodiment of the present disclosure. FIG. 6 is a view showing an exploded water ejection unit of a water ejecting apparatus according to an embodiment of the present disclosure. FIG. 7 is a cross-sectional view of the water ejection unit 20 taken along line VII-VII' of FIG. 6. FIG. 8 are cross-sectional views of the water ejection unit 20 taken along line VIII-VIII' of FIG. 5, which are in different positions.

As shown in FIGS. 5 and 6, the water ejection unit 20 includes the water ejection lifting covers 200 and 210 and the rotator 220. The water ejection lifting covers can include the fixed cover 200 and the lifting cover 210. For convenience of description, the water ejection top cover 230 and the water ejection nozzle 240 are omitted.

As described above, the fixed cover 200 is a fixed component, and the lifting cover 210 is a movable component. However, this is merely an example, and the water ejection lifting covers 200 and 210 may be configured in other relatively movable forms. For example, both the water ejection lifting covers 200 and 210 may be configured to be movable.

As described above, the rotator 220 is provided in a cylindrical shape. For example, a front side of the rotator 220 may form a front appearance of the water ejecting apparatus 1 together with the front cover 100.

The fixed cover 200 is coupled to an outside of the rotator 220. In some implementations, the fixed cover 200 includes a first plate 2000 coupled to the rotator 220 and a second plate 2002 extending from the first plate 2000. The first plate 2000 and the second plate 2002 are separated for convenience of description and may be integrally formed with each other. The first plate 2000 is provided as a flat plate having a predetermined thickness. Alternatively, the first plate 2000 may be provided in the form of a plate bent with a curvature corresponding to the rotator 220. In this case, FIG. 7 illustrates the first plate 2000 by cutting the second plate 2002.

Referring to FIG. 7, the first plate 2000 is provided with a water ejection opening 2004 that communicates with an internal space of the case 10. In addition, a through hole corresponding to the water ejection opening 2004 is formed at the rotator 220. The water ejection opening 2004 corresponds to a hole through which the water ejection pipe extending to the water ejection nozzle 240 passes.

In some implementations, the first plate 2000 is provided with a lifting gear 2006 and a guide rail 2008 extending in the up-down direction. Here, the surface of the first plate 2000 on which the lifting gear 2006 and the guide rail 2008 are formed is referred to as an inner surface, and the surface of the first plate 2000 coupled with the rotator 220 is referred to as an outer surface.

The lifting gear 2006 and the guide rail 2008 are formed to protrude from the inner surface of the first plate 2000. The lifting gear 2006 and the guide rail 2008 may extend vertically from an upper end to a lower end of the first plate 2000.

In some implementations, the lifting gear 2006 and the guide rail 2008 are respectively disposed on both sides of the water ejection opening 2004. In FIG. 7, the lifting gear 2006 is located on the right side of the water ejection opening 2004 and is located on the left side of the guide rail 2008. That is, the lifting gear 2006 and the guide rail 2008 are spaced apart from each other in a horizontal direction and extend parallel to each other in a vertical direction.

The lifting gear 2006 can provide a linear rack. The lifting gear 2006 has gear teeth extending in the vertical direction. For example, the lifting gear 2006 has gear teeth that face one side surface, specifically, the water ejection opening 2004.

The guide rail 2008 can be configured in a smoothly extended rod shape. For example, a plurality of seating recesses 2007 and 2009 are formed on one surface, i.e., on the right surface, of the guide rail 2008 facing the lifting gear 2006. The plurality of seating recesses 2007 and 2009 may be recessed from the right surface of the guide rail 2008 to the left side.

The plurality of seating recesses 2007 and 2009 include a first seating recess 2007 and a second seating recess 2009 positioned below the first seating recess 2007. For example, the first seating recess 2007 is formed adjacent to an upper end of the guide rail 2008, and the second seating recess 2009 is formed adjacent to a lower end of the guide rail 2008. The first seating recess 2007 and the second seating recess 2009 may be spaced apart from each other by a maximum distance. For example, the distance between the first seating recess 2007 and the second seating recess 2009 may correspond to a distance by which the lifting cover 210 is moved.

The second plate 2002 can extend convexly from both ends of the first plate 2000. For example, the second plate 2002 can be coupled with both ends of the first plate 2000 in a bent form. Accordingly, a predetermined space is formed between the first plate 2000 and the second plate 2002. Such a space is provided with the top and bottom open. That is, upper and lower portions of the fixed cover 200 are provided in an open state. The upper portion of the fixed cover 200 can be closed by coupling the water ejection top cover 230 thereto. The lower portion of the fixed cover 200 may be closed by the lifting cover 210. The surface of the second plate 2002 that forms the space may be referred to as an inner surface, and the surface facing the inner surface may be referred to as an outer surface. The outer surface of the second plate 2002 is a portion protruding in front of the water ejecting apparatus 1 and corresponds to a surface forming an outer appearance. Accordingly, the outer surface of the second plate 2002 may be smoothly formed for aesthetics. In addition, the inner surface of the second plate 2002 is smoothly formed so that the fixed cover 210 may be moved. For example, a guide projection 2003 that protrudes laterally is formed on the inner surface of the second plate 2002. The guide projection 2003 extends from the top to the bottom of the second plate 2002 in the up-down direction.

In addition, the guide projection 2003 may be formed adjacent to each of the guide rail 2008 and the lifting gear 2006. In FIG. 6, the guide projection 2003 adjacent to the guide rail 2008 is illustrated, and in FIG. 7, the guide projection 2003 adjacent to the lifting gear 2006 is illustrated.

The lifting cover 210 can be disposed inside the fixed cover 200. For example, the lifting cover 210 is disposed in a space formed by the first plate 2000 and the second plate 2002 of the fixed cover 200. The lifting cover 210 can be moved downward inside the fixed cover 200.

The lifting cover 210 can be provided in a shape corresponding to the fixed cover 200. For example, the lifting cover 210 has the first plate 2010 and the second plate 2012 in the same manner as the fixed cover 200. Although the first plate 2010 and the second plate 2012 of the lifting cover 210 are separately illustrated in FIG. 6, this is illustrative and the first plate 201 and the second plate 2012 may be integrally formed. The second plate 2012 may be convex to the front (lower left end in FIG. 6). Accordingly, a predetermined space is also formed in the lifting cover 210 by the first plate 2010 and the second plate 2012. Also, an upper end of the lifting cover 210 is open and may be cut in a predetermined shape for coupling with the lifting motor 250 and the gear module 260 to be described later.

The water ejection nozzle 240 can be installed at a lower end of the lifting cover 210. For example, an opening to which the water ejection nozzle 240 is fitted may be provided at a lower portion of the lifting cover 210.

The first plate 2010 can include a water ejection recess 2014 that corresponds to the water ejection opening 2004. The water ejection recess 2014 may be formed at a position corresponding to the water ejection opening 2004 when the lifting cover 210 is in an ascended position. Accordingly, the water ejection pipe may be extended through the water ejection opening 2004 and the water ejection recess 2014.

In some implementations, an auxiliary guide rail 2015 can be provided on the first plate 2010. The auxiliary guide rail 2015 is configured to protrude toward both sides and extends in the up-down direction. The auxiliary guide rail 2015 may be in contact with the guide projection 2003 to guide movement.

The second plate 2012 may include a gripping part 2013 that a user may grip. The gripping part 2013 is located on both side lower portions of the second plate 2012. In addition, the fixed cover 200 is configured in a cut shape so that the gripping part 2013 may be exposed to the outside even when the lifting cover 210 ascends. The gripping part 2013 may be an auxiliary component for the user to manually move the lifting cover 210. In addition, the gripping part 2013 may be provided in various forms so that the user may conveniently move the lifting cover 210.

In some implementations, the second plate 2012 may be formed with an indented check recess 2012a at an upper end thereof. Through the check recess 2012a, a weight of the lifting cover 210 may be reduced. Through the check recess 2012a, the lifting motor 250 and the gear module 260 may be installed or the installed lifting motor 250 and the gear module 260 may be checked.

In some implementations, the second plate 2012 can include a lifting bracket 2016 coupled to a lifting motor 250 and a gear module 260, which will be described later. The lifting bracket 2016 includes a motor coupling part 2017 to which the lifting motor 250 is coupled and a gear seating part 2018 to which the gear module 260 is coupled.

The water ejection unit 20 further includes the lifting motor 250 and the gear module 260 interworking with the lifting motor 250.

The lifting motor 250 includes an external power supply or a main PCB, that is, an electric wire and a connector 2504 connected to the controller 90, a motor shaft 2500 rotated by supplied power, and a motor gear 2502 connected to the motor shaft 2500. The motor gear 2502 can include a spur gear in which gear teeth are cut to be parallel to the motor shaft 2500.

For reference, a signal detection unit 650, which will be described later, may be connected to the electric wire and the connector 2504 connected to the lifting motor 250.

As described above, the lifting motor 250 is coupled to the motor coupling part 2017. Thus, the lifting motor 250 may be coupled to the lifting cover 210. For example, the lifting motor 250 may be coupled to the lifting cover 210 such that the motor shaft 2500 extends in a horizontal direction and the motor gear 2502 is disposed at the rear. An example of the lifting motor 250 includes a BLDC motor having a brake function.

The gear module 260 may include a plurality of gears that can be rotated by the lifting motor 250. The gear module 260 can include a gear bracket 2600 for rotatably fixing a plurality of gears. The gear bracket 2600 may be seated on an upper portion of the motor coupling part 2017 and coupled by a coupling member.

The gear bracket 2600 includes gear guide protrusions 2602 that protrude from both sides and can be brought into contact with the guide projection 2003. The gear guide projection 2602 may be provided as a pair spaced apart from each other and protruding such that the guide projection 2003 is disposed therebetween. For example, the guide projection 2003 and the gear guide projection 2602 may be disposed in a state where they are fitted with each other. Accordingly, the gear bracket 2600 may be guided and moved in an up-down direction along the guide projection 2003.

In some implementations, the gear bracket 2600 includes a guide rail projection 2604 that protrudes backward. The guide rail projection 2604 may be disposed to contact the inner surface of the guide rail 2008. Accordingly, the gear bracket 2600 may be guided in the up-down direction along the guide rail 2008.

For example, the guide rail projection 2604 may be in close contact with an inner surface of the guide rail 2008 to receive an external force. In some implementations, a force that the guide rail projection 2604 pushes the inner surface of the guide rail 2008 to the outside may be generated. Accordingly, the guide rail projection 2604 may be inserted into the first and second seating recesses 2007 and 2009.

Referring to FIG. 8, the gear module 260 includes a first gear 2606, a second gear 2607, a third gear 2608, and a fourth gear 2609 mounted on the gear bracket 2600. Here, the number and shape of the gears are merely illustrative.

The first gear 2606 is a gear engaged with the motor gear 2402. The second gear 2607 is coaxially connected to the first gear 2606. In some implementations, the first gear 2606 and the second gear 2607 may be formed as one gear. A size (diameter) of the first gear 2606 may be larger than a size (diameter) of the second gear 2607.

The third gear 2608 is a gear engaged with the second gear 2607. The fourth gear 2609 is coaxially connected to the third gear 2608. In some implementations, the third gear 2608 and the fourth gear 2609 may be formed as one gear. A size (diameter) of the third gear 2608 may be formed to be larger than a size (diameter) of the fourth gear 2609.

The fourth gear 2609 is engaged with the third gear 2608. In some implementations, the third gear 2608 is formed on the fixed cover 200 and is a fixed component. In addition, the fourth gear 2609 is mounted on the gear bracket 2600 and is a component coupled to the lifting cover 210. Therefore, as the fourth gear 2609 is rotated, the lifting cover 210 may be moved.

As described above, as the gear module 260 includes the plurality of gears, the gear module 260 may function as a reduction gear.

An example lifting mechanism of the lifting cover 210 will be described with reference to FIG. 8. FIG. 8(a) shows that the lifting cover 210 is in an ascended position, and FIG. 8(b) shows the lifting cover 210 is a descended position. Also, FIG. 8(a) shows that the guide rail projection 2604 is inserted into the first seating recess 2007 and FIG. 8(b) shows that the guide rail projection 2604 is inserted into the second seating recess 2009. Therefore, the lifting cover 210 may be moved by a distance between the first and second seating recesses 2009. In some implementations, the water ejection nozzle 240 that is installed on the lifting cover 210 may be lifted or lowered by a moving distance of the lifting cover 210.

<Water Ejection Pipe Arrangement Structure>

Figure 9:
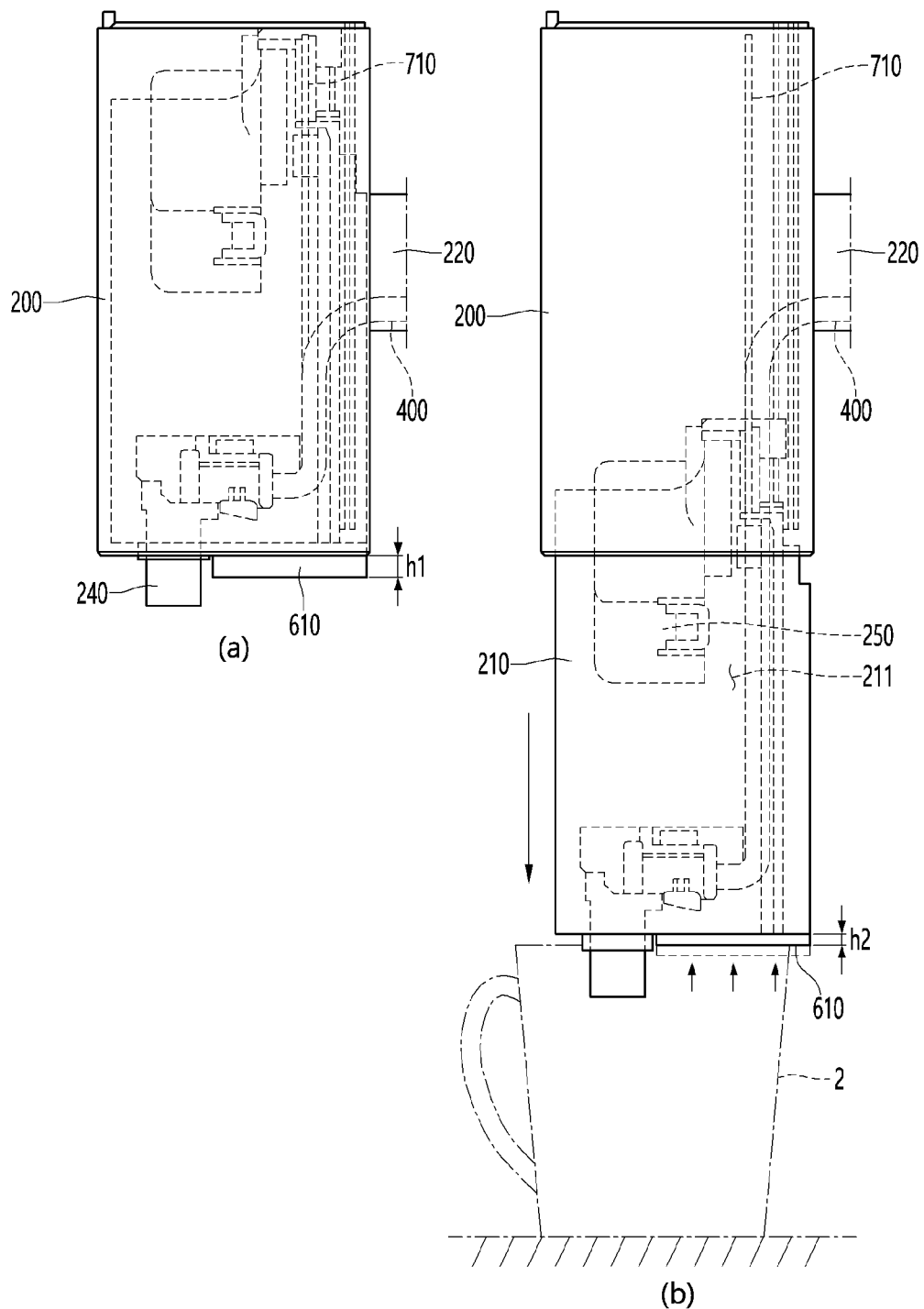
FIG. 9 is a side view showing a state before and after lifting of a water ejection unit of a water purifier according to an embodiment of the present disclosure.
Figure 10:
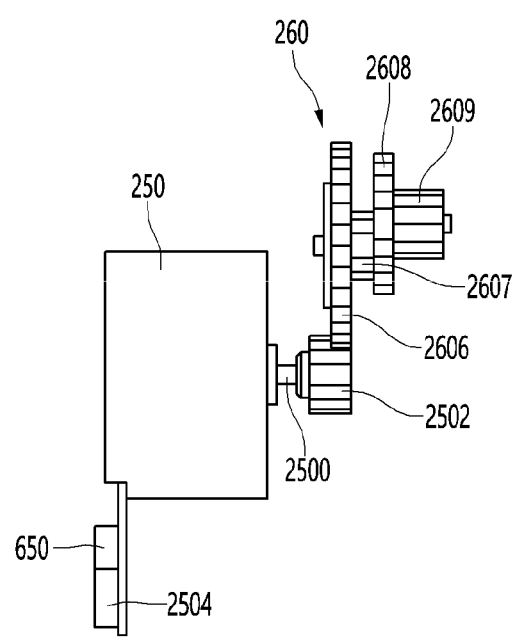
FIG. 10 is a side view of a driving motor and a gear module, which are some components of the present disclosure.

FIG. 9 illustrates side views of the water ejection unit of the water ejecting apparatus in ascended and descended positions according to an embodiment of the present disclosure. FIG. 10 is a side view of the lifting motor and the gear module.

Referring to FIG. 9, when the lifting cover 210 ascends or descends, the water ejection nozzle 240 coupled to the lower side of the lifting cover 210 ascends or descends together. In addition, the water ejection nozzle 240 is connected to the water ejection pipe 400.

After passing through the water ejection opening (2004, see FIG. 7) and the water ejection recess (2014, see FIG. 6), the water ejection pipe 400 may extend to the inside of the water ejection unit 20 from the inside of the case 10 and may be connected to the water ejection nozzle 240.

In some implementations, when the water ejection pipe 400 is placed inside the lifting cover 210, the water ejection pipe 400 can ascend or descend as the lifting cover 210 ascends or descends. In some implementations, the water ejection pipe 400 may be rotated together as the water ejection unit 20 is rotated, when the water ejection pipe 400 is disposed inside the lifting cover 210.

The water ejection pipe 400 that is received inside the lifting cover 210 may be disposed in an empty space provided below the lifting motor 250 and the gear module 260.

Referring to the drawing, a gear module 260 is disposed at the rear of the lifting motor 250. That is, the lifting motor 250 is disposed in front of the gear module 260. Here, the rear may refer to a direction close to the case 10.

Also, a space 211 is formed below the gear module 260, and the water ejection pipe 400 may be introduced into the inside of the lifting cover 210 and connected to the water ejection nozzle 240 through this space 211.

In some implementations, the gear module 260 includes a plurality of gears. In addition, a motor gear 2502 is connected to the motor shaft 2500 of the lifting motor 250. The gear module 260 can include a first gear 2606, a second gear 2607, a third gear 2608, and a fourth gear 2609. The first gear 2606, the second gear 2607, the third gear 2608, and the fourth gear 2609 may all be disposed at the rear of the lifting motor 250. In addition, all of the first gear 2606, the second gear 2607, the third gear 2608, and the fourth gear 2609 may be positioned above the motor shaft 2500 of the lifting motor 250.

In some implementations, rotating shafts of the first gear 2606 and the second gear 2607 are positioned above the rotating shaft of the motor gear 2502 and may be positioned to be eccentric to one side. Here, 'one side' refers to a direction in which the lifting gear 2006 is formed.

In some implementations, the rotating shafts of the third gear 2608 and the fourth gear 2609 may be positioned above the rotating shafts of the first gear 2606 and the second gear 2607 and positioned to be eccentric to one side. Therefore, the lifting gear 2006 engaged with the fourth gear 2609 may be disposed on one side spaced apart from the center at the maximum.

Accordingly, the larger space 211 in which the water ejection pipe 400 is accommodated may be secured at a lower side of the gear module 260.

If the motor gear 2502 connected to the motor shaft 2500 of the lifting motor 250 is directly engaged with the lifting gear 2006 to rotate or if only one gear is connected between the motor gear 2502 and the lifting gear 2006, it may be difficult to secure a space for disposing the gear as the gear increases. Meanwhile, when a plurality of gears are connected between the motor gear 2502 and the lifting gear 2006 as in the present disclosure, the size of the gears may be reduced and the gears may be installed only on one side, thereby facilitating securing of a space inside the lifting cover 210. For example, a space for accommodating the water ejection pipe 400 may be secured.

In addition, when a plurality of gears are connected between the motor gear 2502 and the lifting gear 2006, a lifting speed may be finely adjusted by utilizing a gear ratio. That is, it is easy to control the lifting speed of the lifting cover 210.

According to the present disclosure, the water ejection unit 20 can be configured to perform an elevating operation and a rotation operation with respect to the case 10. The water ejection lifting covers 200 and 210 that form an outer appearance of the water ejection unit 20 are formed to be convex forward so that the user may easily grip the water ejection unit 20. Therefore, a space may be created therein, and the lifting motor 250, the gear module 260, and the water ejection pipe 400 may be accommodated in the space. For example, the lifting motor 250 may be disposed at the center which is convex forward.

In some implementations, one side of the water ejection pipe 400 is received inside the lifting cover 210 and is connected to the water ejection nozzle 240. Also, the water ejection pipe 400 is disposed inside the rotator 220 through the water ejection recess 2014 formed at the rear of the lifting cover 210 and the water ejection opening 2004 formed at the rear of the fixed cover 200, and as a result, the water ejection pipe 400 is disposed inside the case 10.

For reference, the rotator 220 can include a through hole 221 (see FIG. 12) that communicates with the water ejection opening 2004. Therefore, the water ejection pipe 400 passing through the water ejection recess 2014 and the water ejection opening 2004 may be disposed inside the rotator 220 and the case 10 through the through hole 221 (see FIG. 12).

In some implementations, the water ejection pipe 400 may be made of an elastic material, such as rubber or silicone, so as to be bent or spread during an elevating operation of the lifting cover 210.

In the above case, when the lifting cover 210 and the water ejection nozzle 240 perform an elevating operation, the water ejection pipe 400 is bent or spread in the space 211 of the lifting cover 210 to correspond to the elevating operation of the lifting cover 210, and further, cold water, purified water, and hot water may be supplied to the water ejection nozzle 240 regardless of height of the lifting cover 210 and the water ejection nozzle 240.

For example, when the lifting cover 210 and the water ejection nozzle 240 perform the elevating operation, the water ejection pipe 400 may be bent or spread in the up-down direction in the space 211 of the lifting cover 210 to flexibly cope with the elevating operation of the lifting cover 210.

Referring to FIG. 9, a touch bar 610, which will be described later, is exposed to a bottom surface of the lifting cover 210. The touch bar 610 may be exposed by a first height h1 before coming into contact with the water receiving container 2. When the lifting cover 210 descends, the touch bar 610 comes into contact with the water receiving container 2 and the touch bar 610 ascends. In addition, a detection sensor can be disposed above the touch bar 610, and detect the lifting of the touch bar 610 and a height of the water receiving container.

As described above, when the touch bar 610 comes into contact with the water receiving container 2, the touch bar 610 ascends to be exposed to the bottom surface of the lifting cover 210 by a second height h2 smaller than the first height h, before coming into contact with the water receiving container 2.

Figure 11:
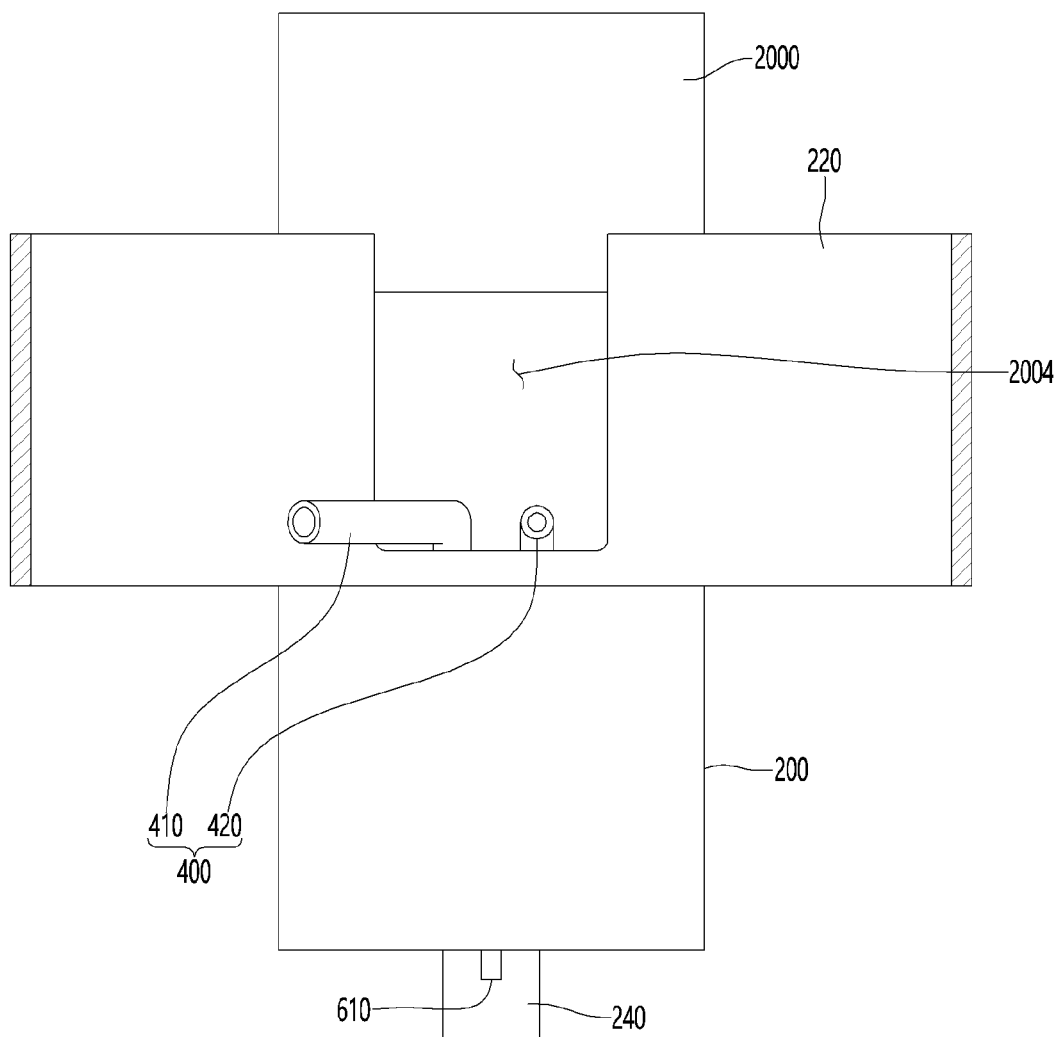
FIG. 11 is a rear view showing a state where a water ejection pipe is disposed at a water ejection unit of a water purifier according to an embodiment of the present disclosure.
Figure 12:
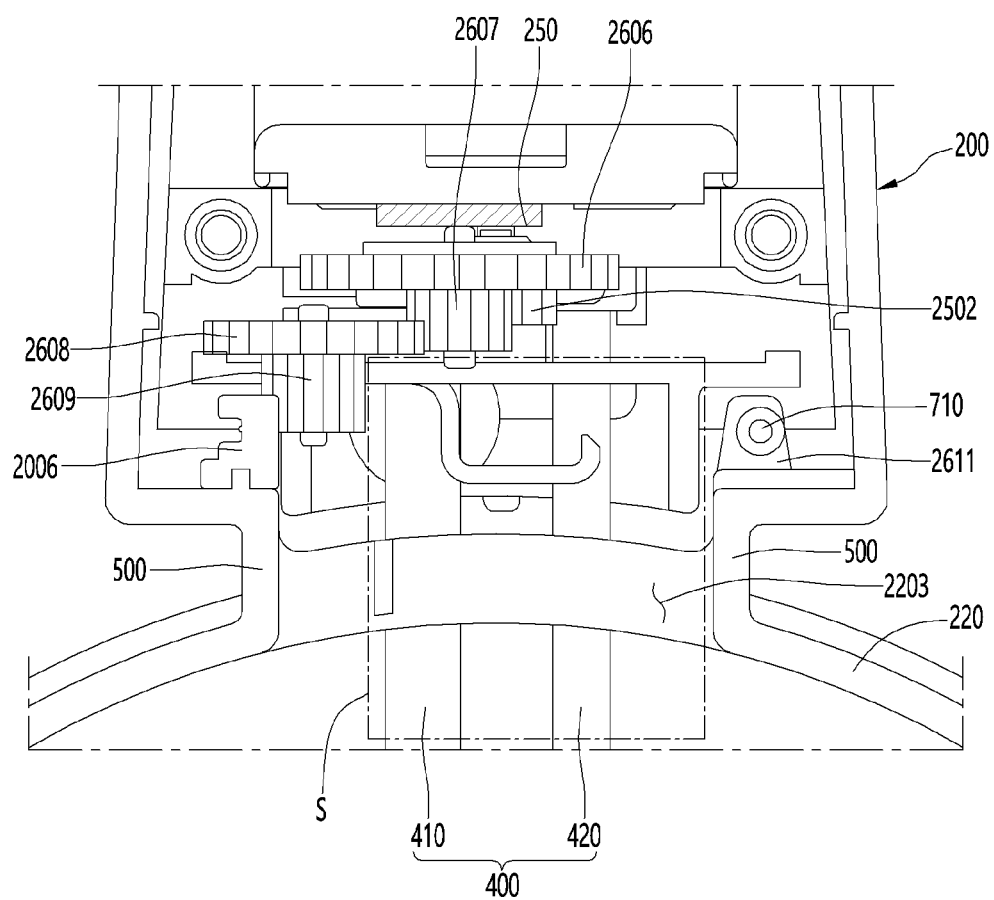
FIG. 12 is a top view showing a state where a water ejection pipe is disposed at a water ejection unit of a water purifier according to an embodiment of the present disclosure.

FIG. 11 is a rear view illustrating that a water ejection pipe is disposed at the water ejection unit of the water ejecting apparatus according to an embodiment of the present disclosure. FIG. 12 is a top view illustrating that a water ejection pipe is disposed at the water ejection unit of the water ejecting apparatus according to an embodiment of the present disclosure. Referring to FIGS. 11 to 12, the water ejection pipe 400 may include a first water ejection pipe 410 through which hot water is ejected and a second water ejection pipe 420 through which cold water and purified water are ejected.

The first water ejection pipe 410 and the second water ejection pipe 420 are connected to one water ejection nozzle 240. In this embodiment, abridge 500 may be further included to connect the rotator 220 with the fixed cover 200 of the water ejection unit 20. The bridge 500 integrally connects the rotator 220 and the fixed cover 200. Both ends of the bridge 500 are fixed to the rotator 220 and the fixed cover 200.

The water ejection pipe 400 may enter the water ejection unit 20 from the case 10 through the space between the bridges 500. For example, the water ejection pipe 400 inside the case 10 may enter the inside of the fixed cover 200 through the through hole 2203 of the rotator 220. In addition, the water ejection pipe 400 that enters the inside of the fixed cover 200 may enter the inside of the lifting cover 210 and may be connected to the water ejection nozzle 240. With the configuration of the bridge 500, the rotator 220 and the fixed cover 200 may be spaced apart from each other by a length of the bridge 500.

In some implementations, a space S in which the water ejection pipe 400 moves may be secured by a distance between the rotator 220 and the fixed cover 200. For example, when the lifting cover 210 ascends or descends, the water ejection pipe 400 is bent or spread so as to be changed in shape. Through the gap between the rotator 220 and the fixed cover 200, the space S in which the water ejection pipe 400 may move in the front-rear direction (up-down direction in FIG. 12) is secured and the water ejection pipe 400 may be deformed more easily.

In this embodiment, the first gear 2606 rotates in engagement with the motor gear 2502, and the second gear 2607 is coaxially disposed with the first gear 2606 and rotates in engagement with the third gear 2608. In addition, the fourth gear 2609 is coaxially disposed with the third gear 2608, and rotates in engagement with the lifting gear 2006.

In some implementations, the first gear 2606 and the motor gear 2502, which rotate in engagement with each other, may be formed of different materials. The second gear 2607 and the third gear 2608, which rotate in engagement with each other, may also be formed of different materials. The fourth gear 2609 and the lifting gear 2006, which rotate in engagement with each other, may also be formed of different materials. If the gears rotating in engagement with each other are formed of the same material, adsorption based on friction may occur. However, if the gears that rotate in engagement with each other are formed of heterogeneous materials rather than homogeneous materials as in the present disclosure, frictional adsorption may be prevented. In addition, noise may be prevented. In an example, at least one of the plurality of gears described above may be formed of engineering plastic. As another example, at least one of the plurality of gears described above may be formed of an elastomer material having rubber properties.

In some implementations, according to the present disclosure, the water ejection unit 20 may be rotated relative to the case 10 by the rotator 220.

Figure 13:
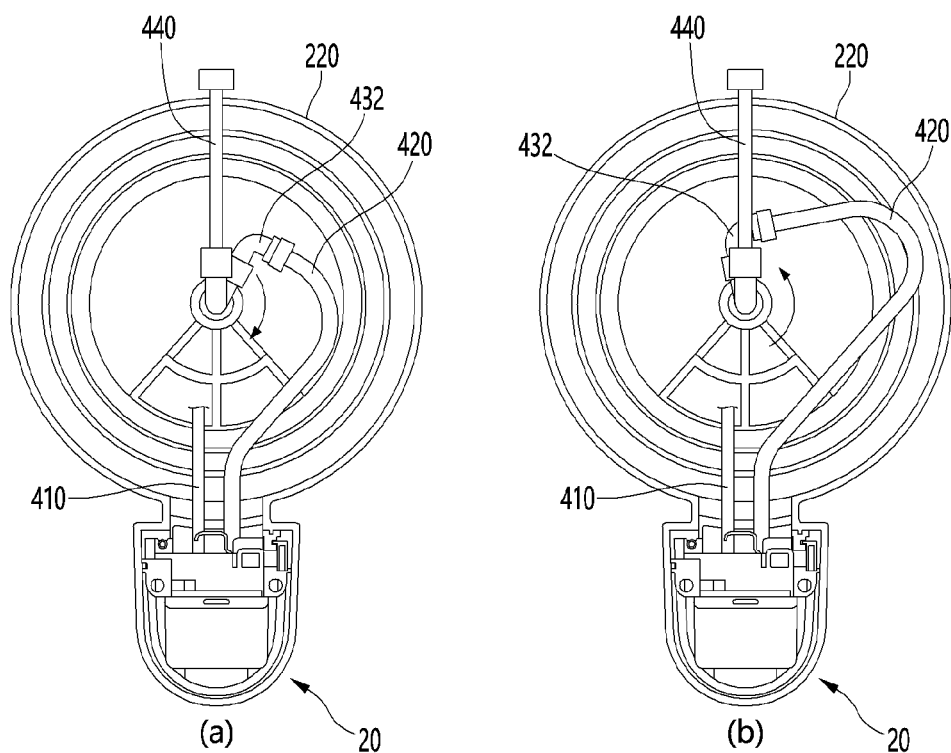
FIG. 13 is a plan view comparing states of a water ejection pipe depending on whether a water ejection nozzle ascends or descends.
Figure 14:
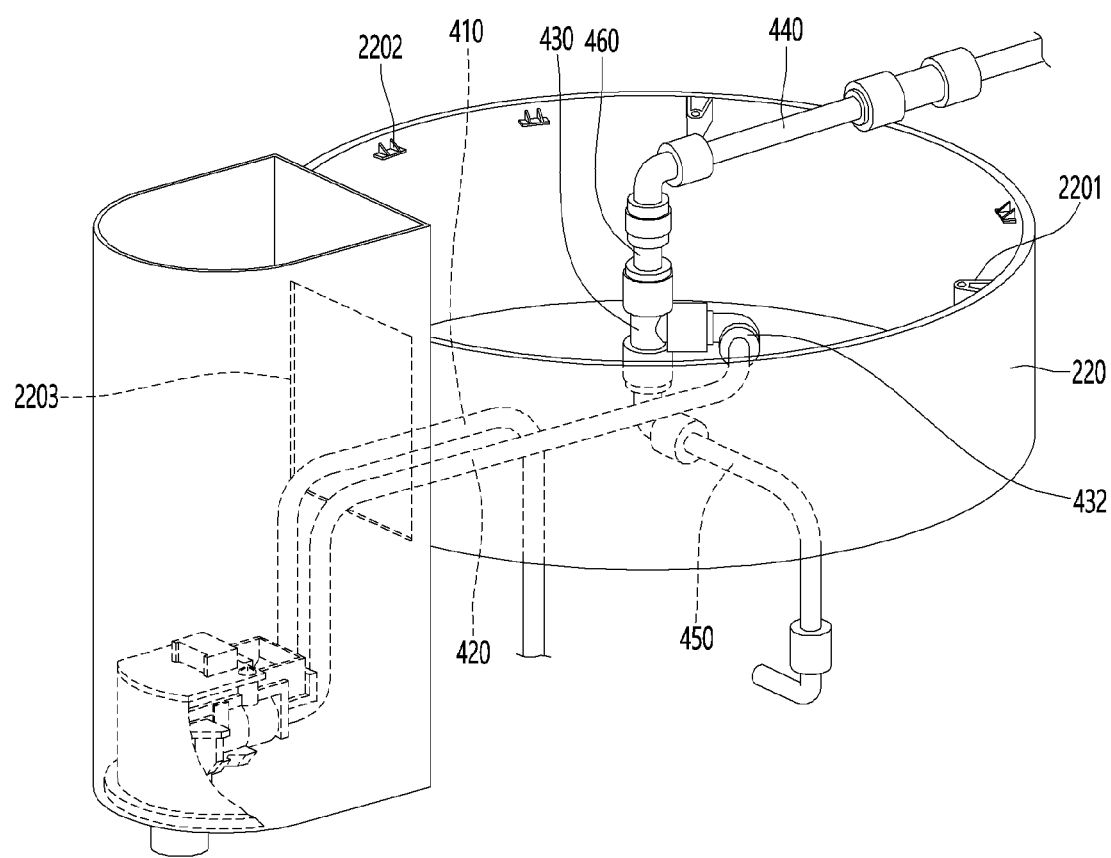
FIG. 14 is a view showing a connection state of a water ejection nozzle and a water ejection pipe.
Figure 15:
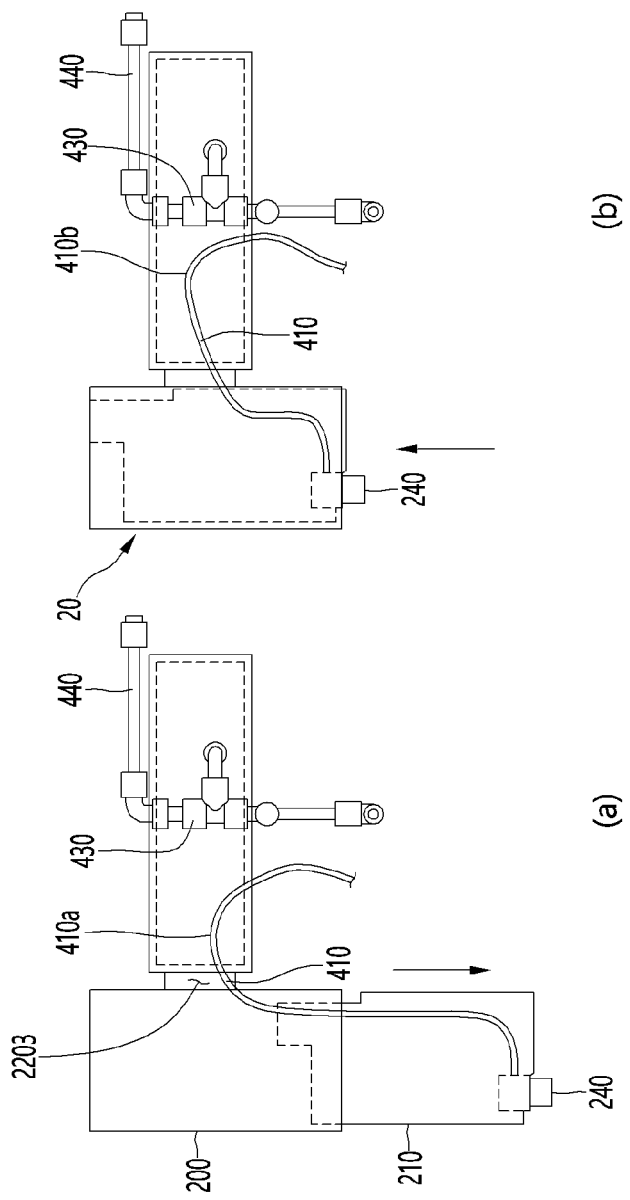
FIG. 15 is a side view comparing states of a water ejection pipe depending on whether a water ejection nozzle ascends or descends.
Figure 16:
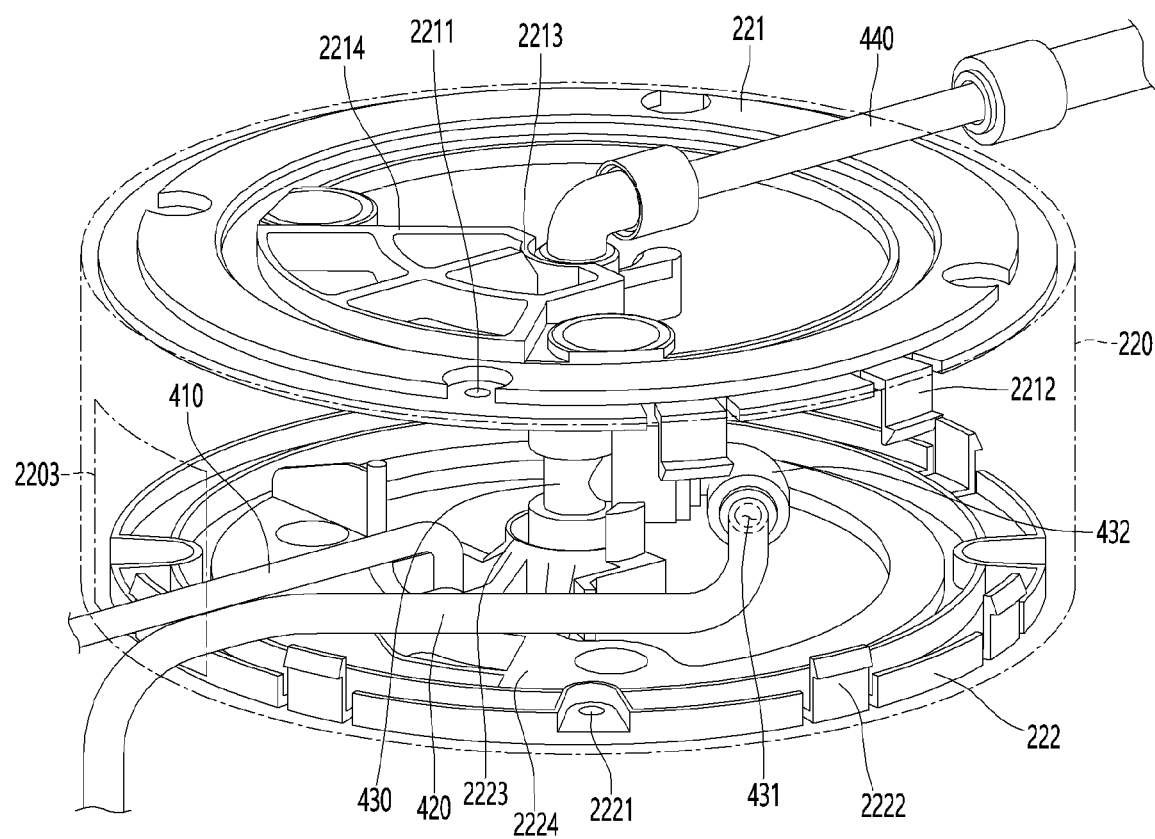
FIG. 16 is a perspective view showing a coupling structure of a rotator and the water ejection pipe.

FIG. 13 illustrates plan views of a water ejection pipe in different positions depending on whether the water ejection nozzle ascends or descends. FIG. 14 illustrates an example connection scheme of the water ejection nozzle and the water ejection pipe. FIG. 15 illustrates side views of the water ejection pipe in different positions depending on whether the water ejection nozzle ascends or descends. FIG. 16 is a perspective view of an example coupling structure of the rotator and the water ejection pipe.

Referring to the drawings, the rotator 220 has a cylindrical shape having a short height compared to a diameter thereof. The rotator 220 includes an upper guide bracket 221 and a lower guide bracket 222 spaced apart from each other on the upper and lower portions. Also, a fastening portion 2201 protrudes from an inner surface of the rotator 220, and fastening holes 2211 and 2221 are provided at intervals in a circumferential direction on the upper guide bracket 221 and the lower guide bracket 222. A bolt or other suitable fastening element is inserted into the fastening portion 2201 through the fastening holes 2211 and 2221 so that the upper and lower guide brackets 221 and 222 may be fastened to the rotator 220.

In some implementations, a plurality of fastening hooks 2212 and 2222 are provided along the circumference of the upper guide bracket 221 and the lower guide bracket 222, and fastening protrusions 2202 may be provided on the inner surface of the rotator 220. The fastening hooks 2212 and 2222 and the fastening protrusions 2202 may be locked to each other and serve to temporarily fix the upper guide bracket 221 and the lower guide bracket 222 when the upper guide bracket 221 and the lower guide bracket 222 are coupled.

In some implementations, a circular upper center ring 2213 and a lower center ring 2223 are provided at the centers of the upper guide bracket 221 and the lower guide bracket 222. The upper guide bracket 221 and the lower guide bracket 222 are formed such that an upper connection portion 2214 and a lower connection portion 2224 horizontally extend from an inner surface toward the upper center ring 2213 and the lower center ring 2223, respectively. The upper center ring 2213 and the lower center ring 2223 are connected to and supported by the upper guide bracket 221 and the lower guide bracket 222 by means of the upper connection portion 2214 and the lower connection portion 2224. The upper and lower connection portions 2214 and 2224 are configured in a fan shape and have a plurality of through holes therein.

The upper center ring 2213 and the lower center ring 2223 can be used to inform an operator of an installation position of the water ejection pipe 400 for delivering water. The upper center ring 2213 and the lower center ring 2223 are provided at the center of the rotator 220 and functions as a rotation center as the rotator 220 is rotated.

In some implementations, a T connector 430 may be provided at the upper center ring 2213 and the lower center ring 2223. A second water ejection pipe 420 is connected to an opening 431 on one side of the T connector 430, and extends toward the water ejection unit 20 and connected to the water ejection nozzle 240. A cold water pipe 440 is connected to an upper portion of the other two sides (vertically upper and vertically lower openings) of the T connector 430, and a purified water pipe 450 is connected to a lower portion of the other two sides of the T connector 430. In some implementations, the purified water pipe 450 and the cold water pipe 440 may each be connected to the T connector 430 by a rotation pipe 460.

For example, the cold water pipe 440 and the purified water pipe 450 pass through the upper center ring 2213 and the lower center ring 2223, respectively, and the T connector 430 is located in a space between the upper center ring 2213 and the lower center ring 2223. Accordingly, the T connector 430 may not be changed in position and always maintained at a uniform position. When the rotator 220 is rotated, the T connector 430 may be rotated about the rotation pipe 460 as a shaft and twisting of the pipe forming a flow path for water ejection may be prevented.

A through hole 2203 is provided in the rotator 220 so that the water ejection pipe 400 may pass therethrough. Through the through hole 2203, the water ejection pipe 400 may extend to the inside of the water ejection unit 20 via the upper guide bracket 221 and the lower guide bracket 222 of the rotator 220. In some implementations, the configuration of the through hole 2203 may generate a predetermined fixing force for holding the water ejection pipe 400, and the first water ejection pipe 410 and the second water ejection pipe 420 may be prevented from entangling or twisting while the water ejection unit 20 rotates, ascends or descends.

In some implementations, the first water ejection pipe 410, which is connected to the induction heating assembly 80 and supplied with hot water, may be directly connected to the water ejection nozzle 240. Therefore, when hot water is ejected, the water in the hot water tank may be immediately ejected and quality of the hot water is improved. In embodiments where a flow path used for cold water or purified water is also used for hot water, a temperature of hot water delivered shortly after cold water or purified water being dispensed may be lower than an intended temperature because the cold water or purified water remain in the flow path. However, when the separate first water ejection pipe 410 is connected to the water ejection nozzle 240, hot water of the hot water tank may be supplied to the water ejection nozzle 240 without temperature loss.

In some implementations, unlike the cold water pipe 440 and the purified water pipe 450, the first water ejection pipe 410 may be connected to the water ejection nozzle 240 by way of the outside of the upper centering ring 2213 and the lower center ring 2223 or may be connected to the water ejection nozzle 240 by way of a separate fixed guide provided outside the upper center ring 2213 and the lower center ring 2223, rather than passing through the upper center ring 2213 and the lower center ring 2223.

According to the features described above, when the water ejection unit 20 is rotated, the pipes 410, 420, 440, and 450 that form the flow path for water ejection may be prevented from being entangled or twisted.

FIG. 13(a) shows an example position of the second water ejection pipe 420, which is used to deliver cold water and purified water, as the lifting cover 210 descends. FIG. 13(b) shows an example position of the second water ejection pipe 420 as the lifting cover 210 ascends.

Referring to FIGS. 13 and 14, the second water ejection pipe 420 is connected to the opening 431 on one side of the T connector 430. For example, one side of the T connector 430 is connected to a connection pipe 432 which is connected and bent in a horizontal direction, and the connection pipe 432 has the opening 431 for connecting the second water ejection pipe 420. For example, the connection pipe 432 may be bent in an L shape.

In some implementations, the T connector 430, or the opening 431 on one side of the connection pipe 432, is formed to face in the horizontal direction. For example, one side of the second water ejection pipe 420 that is connected to the opening 431 of the T connector 430 has a bent shape corresponding to an inner circumferential surface of the rotator 220. That is, the second water ejection pipe 420 is bent in the horizontal direction inside the rotator 220.

In some implementations, the second water ejection pipe 420 is configured to have and secure a length sufficient to cope with the rotation and elevating operation of the water ejection unit 20. With this configuration, when the water ejection unit 20 rotates, the second water ejection pipe 420 can rotate together with the rotator 220 without deformation of the second water ejection pipe 420, and thus cold water and purified water may be easily ejected through the second water ejection pipe 420.

When the lifting cover 210 descends, the second water ejection pipe 420 is pulled downward. For example, the second water ejection pipe 420 that is bent inside the rotator 220 may be spread out. As the lifting cover 210 descends, the second water ejection pipe 420 is spread or straightened (e.g., changing from the state of FIG. 13(b) to the state of FIG. 13(a)), and also descended (e.g., pulled down) along with the water ejection nozzle 240.

In some implementations, as the T connector 430 rotates close to the water ejection unit 20, the second water ejection pipe 420 may be lowered along with the water ejection nozzle 240 more easily. For example, the T connector 430 may rotate about the rotation pipe 460.

Also, as the lifting cover 210 descends, the second water ejection pipe 420 is pulled downward and the T connector 430 may rotate close to the water ejection unit 20 (clockwise in FIG. 13). That is, as the lifting cover 210 descends, the second water ejection pipe 420 is spread and the T connector 430 rotates from the state of FIG. 13(b) to the state of FIG. 13(a) by a corresponding force. As a result, a descending distance of the second water ejection pipe 420 is increased and the descending operation of the second water ejection pipe 420 may be more easily performed.

As the lifting cover 210 ascends, the second water ejection pipe 420 can be pushed upward. For example, the second water ejection pipe 420 may be bent inside the rotator 220. As the lifting cover 210 ascends, the second water ejection pipe 420 becomes bent (e.g., changing from the state of FIG. 13(a) to the state of FIG. 13(b), and also ascended along with the water ejection nozzle 240. In addition, while the T connector 430 rotates away from the water ejection unit 20, the second water ejection pipe 420 may be easily elevated along the water ejection nozzle 240. For example, the T connector 430 may rotate about the rotation pipe 460.

Also, as the lifting cover 210 ascends, the second water ejection pipe 420 is pushed upward and the T connector 430 may rotate away from the water ejection unit 20 (in a counterclockwise direction in FIG. 13). That is, when the lifting cover 210 ascends, the second water ejection pipe 420 is bent and the T connector 430 rotates from the state of FIG. 13(a) to the state of FIG. 13(b) by a corresponding force. As a result, a rising distance of the second water ejection pipe 420 is increased, and the rising operation of the second water ejection pipe 420 may be more easily performed.

FIG. 15(a) shows the first water ejection pipe 410 that ejects hot water when the lifting cover 210 is in a descended position. FIG. 15(b) shows the first water ejection pipe 410 that ejects hot water when the lifting cover 210 is in an ascended position. Referring to the drawings, the first water ejection pipe 410 is bent in the up-down direction. For example, the first water ejection pipe 410 extends from the lower side to the upper side inside the case 10, passes from the rotator 220 to the water ejection unit 20 side, and is then bent to be convex upward. Then, after being accommodated inside the water ejection unit 20, the first water ejection pipe 410 is connected to the water ejection nozzle 240.

Referring to FIG. 15(b), it can be seen that, in a state where the lifting cover 210 ascends, the first water ejection pipe 410 is bent to be convex upward, and an uppermost end 410a is adjacent to an upper end of the rotator 220. For example, the first water ejection pipe 410 is configured to have and secure a length sufficient to correspond to or accommodate the rotation and elevating operation of the water ejection unit 20. With this configuration, when the water ejection unit 20 moves up and down and the lifting cover 210 descends, the first water ejection pipe 410 is pulled downward.

For example, the first water ejection pipe 410 that is bent inside the rotator may be spread. As the lifting cover 210 descends, the first water ejection pipe 410 is spread out (e.g., changing from the state of FIG. 15(b) to the state of FIG. 15(a)) and also descended (e.g., pulled down) along the water ejection nozzle 240. As the first water ejection pipe is spread based on the lifting cover 210 descending, the uppermost end 410b of the first water ejection pipe 410 is lowered to be adjacent to the lower end of the rotator 220.

As the lifting cover 210 ascends during the elevating operation of the water ejection unit 20, the first water ejection pipe 410 is pushed upward. For example, the first water ejection pipe 410 may be further bent upward from the inside of the rotator 220. As the lifting cover 210 ascends, the first water ejection pipe 410 is further bent to be convex upward (e.g., changing from a state FIG. 15(a) to a state of FIG. 15(b)) and also ascended along with the water ejection nozzle 240. When the first water ejection pipe 410 is bent based on the lifting cover 210 ascending as described above, the uppermost end 410a of the first water ejection pipe 410 ascends to be adjacent to the upper end of the rotator 220.

According to the present disclosure, as described above, the first water ejection pipe 410 and the second water ejection pipe 420 may be made of an elastic material, and a space in which the first water ejection pipe 410 and the second water ejection pipe 420 can be bent and spread is provided inside the water ejection lifting covers 200 and 210 and the rotator 220. Therefore, changes in length of the first water ejection pipe 410 and the second water ejection pipe 420 may be effectively buffered or compensated during the rotation and elevating operation of the lifting cover 210. Accordingly, it is possible to flexibly cope with the rotation operation and the elevating operation of the lifting cover 210, and as a result, the elevating and rotation operations of the lifting cover 210 and the water ejection nozzle 240 may be smoothly performed.

<Guide to Elevating Operation>

In some instances, when the lifting cover 210 performs an elevating operation along the fixed cover 200, the lifting cover 210 may wobble or the elevating operation of the lifting cover 210 may be unstable due to clearance. For example, when the lifting cover 210 moves downward, the lifting cover 210 and the fixed cover 200 are gradually separated, and accordingly, as the clearance increases, causing a bending phenomenon and a wobbling phenomenon.

According to the present disclosure, a guide unit is provided for eliminating the clearance so that the lifting cover 210 performs an elevating operation linearly along the fixed cover 200. For example, where an elevating length (stroke distance) of the lifting cover 210 is longer, it is necessary to further reduce the clearance between the lifting cover 210 and the fixed cover 200.

Figure 17:
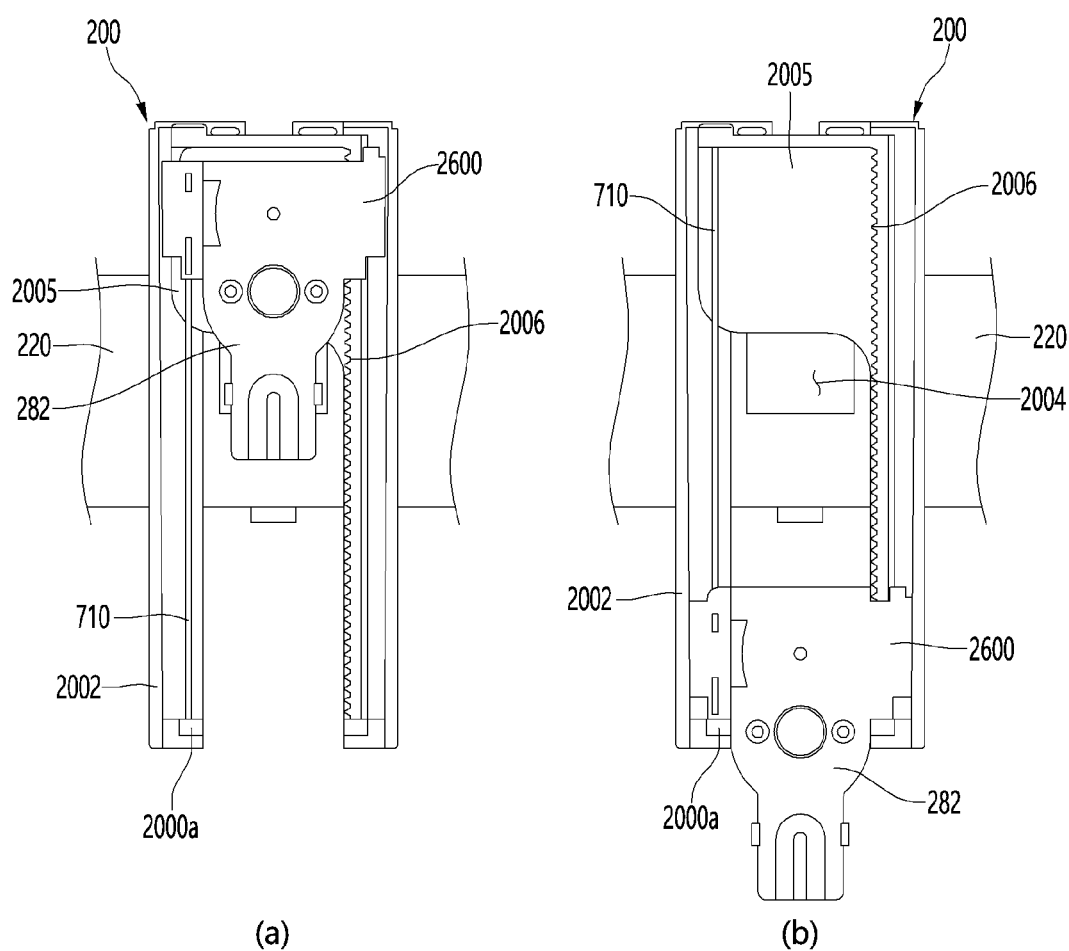
FIGS. 17 and 18 are front views showing a state where a lifting cover ascends or descends while a guide bar is mounted on a fixed cover.
Figure 18:
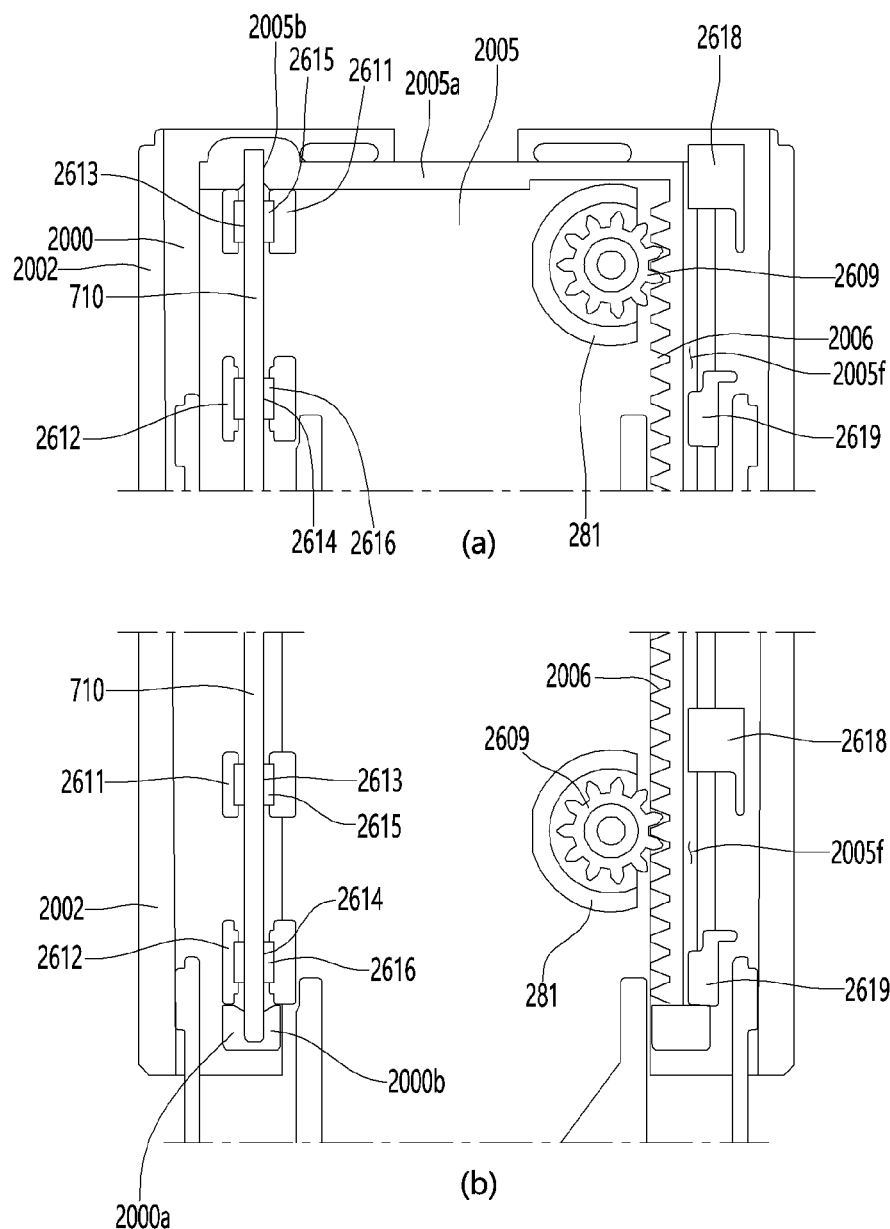
Figure 19:
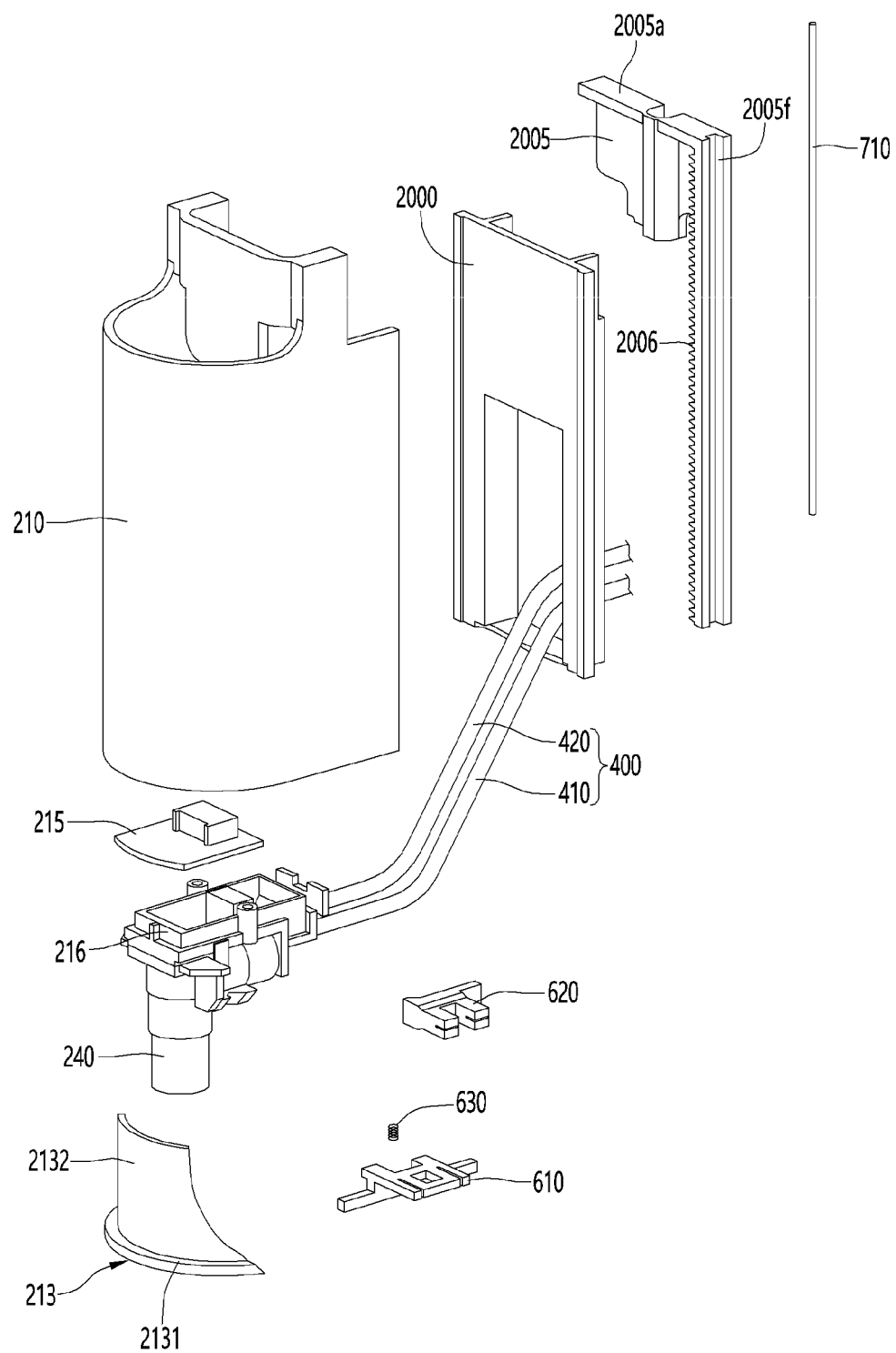
FIG. 19 is an exploded perspective view of a water ejection unit equipped with a guide bar.
Figure 20:
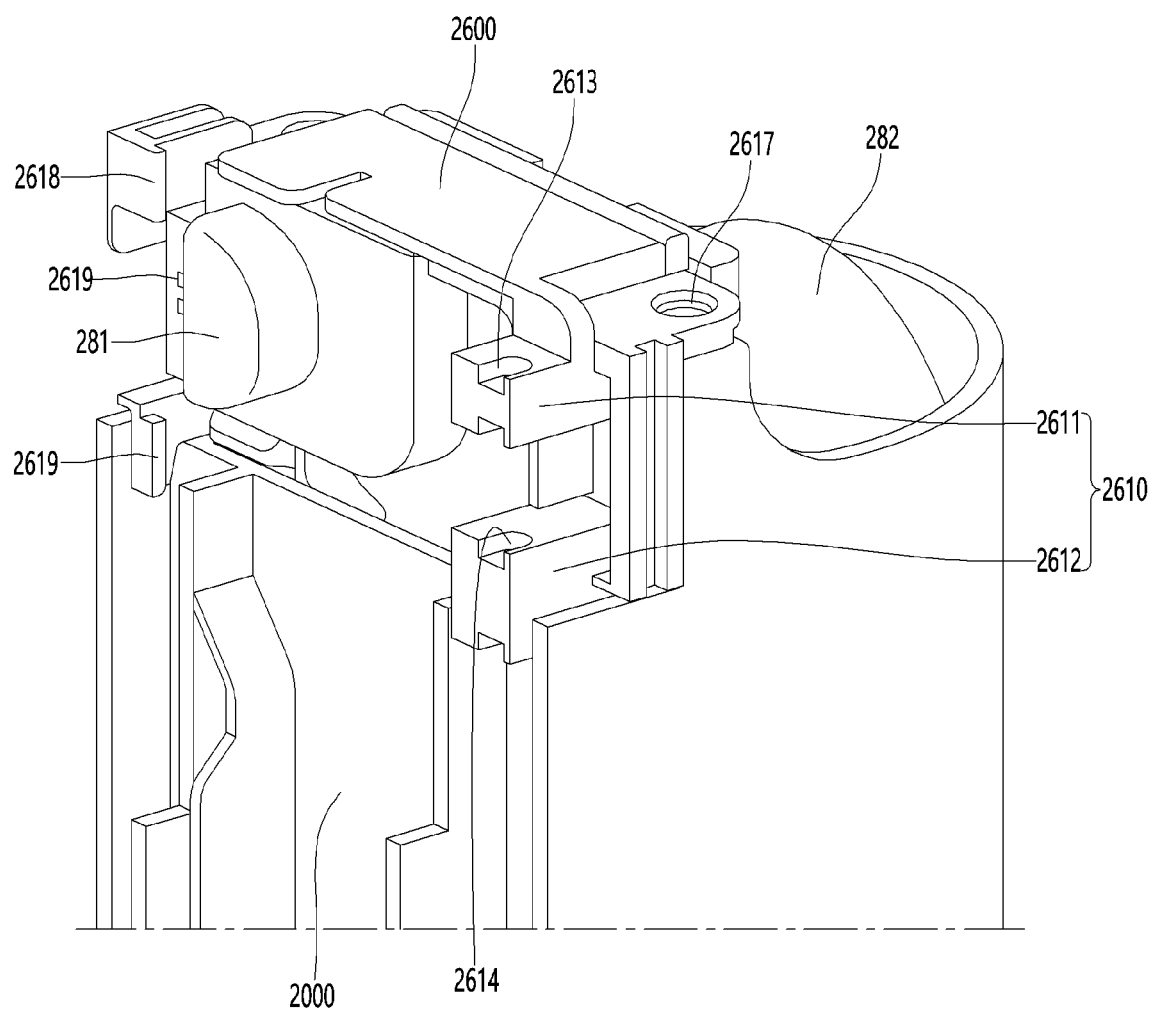
FIG. 20 is a rear perspective view of a water ejection unit equipped with a guide bar.

FIGS. 17 to 18 are front views showing that the lifting cover moves up and down while the guide bar is attached to the fixed cover. FIG. 19 is an exploded perspective view of a water ejection unit equipped with a guide bar. FIG. 20 is a rear perspective view of a water ejection unit equipped with a guide. Referring to FIGS. 17 to 20, a guide bar 710 may be mounted to the fixed cover 200. The guide bar 710 may be mounted on a rear surface of the fixed cover 200. For example, the rear surface of the fixed cover 200 may refer to the first plate 2000. The rear surface of the fixed cover 200 is coupled to the rotator 220. A rack-shaped lifting gear 2006 is provided at the rear adjacent to the rotator 220 inside the fixed cover 200. The lifting gear 2006 may be integrally formed with the rear surface of the fixed cover 200. Alternatively, the lifting gear 2006 may be provided as a separate member and coupled to the rear surface of the fixed cover 200. In the latter case, the lifting gear 2006 may be provided on one side of the third plate 2005, and the third plate 2005 may be coupled to an inside of the fixed cover 200.

With the configuration of the guide bar 710, clearance in a horizontal direction during the vertical movement of the lifting cover 210 may be improved.

In some implementations, the guide bar 710 may be made of a metal material. In some implementations, the guide bar 710 may be formed in a cylindrical shape. In some implementations, the guide bar 710 may be configured to face the lifting gear 2006 that is disposed on the fixed cover 200. In some implementations, the guide bar 710 may be disposed on both sides.

Therefore, during the elevating operation of the lifting cover 210, both sides of the lifting cover 210 are supported in contact with each other at the uppermost end and lowermost end, whereby the elevating operation of the lifting cover 210 may be maintained linearly. That is, with the configuration of the guide bar 710 as described above, when the lifting cover 210 is positioned at the uppermost and lowermost ends, clearance remains the same and the elevating operation of the lifting cover 210 is maintained in a straight line without wobbling.

An upper end of the guide bar 710 may be fixed to an upper end of the other side of the third plate 2005 (left side in FIG. 18). In addition, a lower end of the guide bar 710 may be fixed to a lower end of the other side at the rear of the fixed cover 200 (left side in FIG. 18).

Further, a fourth plate 2005a (see FIG. 19) that extends in a horizontal direction may be provided at an upper end of the third plate 2005. In some implementations, the fourth plate 2005a includes a guide bar mounting recess 2005b which is concave upward on the bottom surface. In some implementations, the upper end of the guide bar 710 may be inserted and fixed to the guide bar mounting recess 2005b. When the fourth gear 2609 ascends, the third plate 2005 may also function as a stopper that prevents the fourth gear 2609 from further ascending from a top dead point of the fourth gear 2609.

In some implementations, a guide bar mounting protrusion 2000a which is convex forward is provided at a lower end of the rear surface of the fixed cover 200. Also, the guide bar mounting protrusion 2000a can include a guide bar mounting recess 2000b concave downward from an upper surface thereof. Further, a lower end of the guide bar 710 may be inserted into and fixed to the guide bar mounting recess 2000b.

In some implementations, a guide bar passage hole through which the guide bar 710 passes may be provided in the lifting cover 210. Therefore, when the lifting cover 210 ascends in a state where the guide bar 710 is inserted in the guide bar passage hole, the elevating operation of the lifting cover may be guided linearly by the guide bar 710.

For example, an auxiliary protrusion 2610 that protrudes backward may be provided in the gear bracket 2600 through which the guide bar 710 passes. In addition, guide bar passage holes 2613 and 2614 through which the guide bars 710 pass may be provided in the auxiliary protrusions 2610. The auxiliary protrusion 2610 may be provided in plurality, and the plurality of auxiliary protrusions 2610 may be spaced apart from each other in the up-down direction. For example, the auxiliary protrusions 2610 may include an upper auxiliary protrusion 2611 and a lower auxiliary protrusion 2612. In addition, guide bar passage holes 2613 and 2614 may be provided in the auxiliary protrusions 2611 and 2612, respectively. Therefore, clearance between the fixed cover 200 and the lifting cover 210 may be more reliably eliminated.

In some implementations, anti-friction members 2615 and 2616 that reduce friction between the guide bar 710 and the auxiliary protrusions 2611 and 2612 may be inserted into the guide bar passage holes 2613 and 2614, respectively. Therefore, the elevating operation of the lifting cover 210 may be performed more smoothly.

When the guide bar 710 is provided as described above, one side of the lifting cover 210 may be in contact with and supported by the guide bar 710, and the other side of the lifting cover 210 may be in contact with and supported by the lifting gear 2006. Therefore, as both sides of the lifting cover 210 are in contact with and supported by the fixed cover 200, clearance between the fixed cover 200 and the lifting cover 210 is more reliably removed, and as the lifting cover 210 ascends and descends linearly in the up-down direction, the elevating operation of the lifting cover 210 may be stably performed.

In some implementations, the third plate 2005 may include an anti-wobble recess 2005f extending in the up-down direction on an outer surface of one side on which the lifting gear 2006 is formed. In some implementations, the gear bracket 2600 may be configured such that anti-wobble protrusions 2618 and 2619 protruding inward from the rear are formed on an upper side and a lower side and spaced apart from each other so as to be inserted into the anti-wobble recess 2005f. The anti-wobble protrusions 2618 and 2819 may be provided on opposite sides of the auxiliary protrusions 2611 and 2612, respectively. When the anti-wobble protrusions 2618 and 2619 are inserted into the anti-wobble recess 2005f as described above, wobbling in the front-rear direction may be prevented when the gear bracket 2600 and the lifting cover 210 move up and down.

In some implementations, the third plate 2005 may function as an anti-water splash barrier to prevent water from entering the rotator 220 through the water ejection opening 2004 or the like. To this end, the third plate 2005 may be provided to cover at least a portion of the water ejection opening 2004 and the through hole 2203.

For reference, reference numeral '281' in FIGS. 18 and 20 denotes 'gear cover' covering the gear module 260, and reference numeral '282' denotes 'motor cover' covering the lifting motor 250.

Hereinafter, an example assembly procedure of the gear bracket 2600, the guide bar 710, the first plate 2000, and the third plate 2005 will be described. First, the guide bar 710 can be coupled with the gear bracket 2600. For example, the guide bar 710 is fitted to the guide bar passage holes 2613 and 2614 of the auxiliary protrusions 2611 and 2612 formed at the rear of the gear bracket 2600. Thereafter, the guide bar 710 coupled with the gear bracket 2600 is fixed to the first plate 2000. For example, the guide bar 710 coupled with the gear bracket 2600 is moved from the upper side to the lower side, and a lower end of the guide bar 710 is fitted into the guide bar mounting recess 2000b of the guide bar mounting protrusion 2000a. Thereafter, an upper side of the guide bar 710 and the third plate 2005 are connected. For example, the fourth gear 2609 and the lifting gear 2006 are engaged to move the third plate 2005 from the upper side to the lower side. Then, the upper end of the guide bar 710 is inserted into and fixed to the guide bar mounting recess 2000b of the fourth plate 2005a. Thereafter, fastening holes 2617 formed at positions corresponding to both sides of the gear bracket 2600 and both sides of the lifting cover 210 are fastened with screws, bolts, or other suitable fastening elements to fix the gear bracket 2600 and the lifting cover 210. Accordingly, the guide bar 710 is fixed to the first plate 2000 and the third plate 2005, and the gear bracket 2600 may come into contact with and supported by the guide bar 710 so as to be guided.

<Reinforcing Structure of Lifting Gear>

In some instances, as the lifting cover 210 moves up and down along the fixed cover 200, a repetitive load may be applied to the lifting gear 2006 to cause the rod-shaped lifting gear 2006 to be bent to be deformed. Therefore, the lifting gear 2006 needs to be reinforced so as not to be bent or deformed even if it is repeatedly used for a long time. For example, where an elevating length (stroke distance) of the lifting cover 210 is longer, it is necessary to further reinforce the lifting gear 2006 so as not to be bent or deformed.

Figure 21:
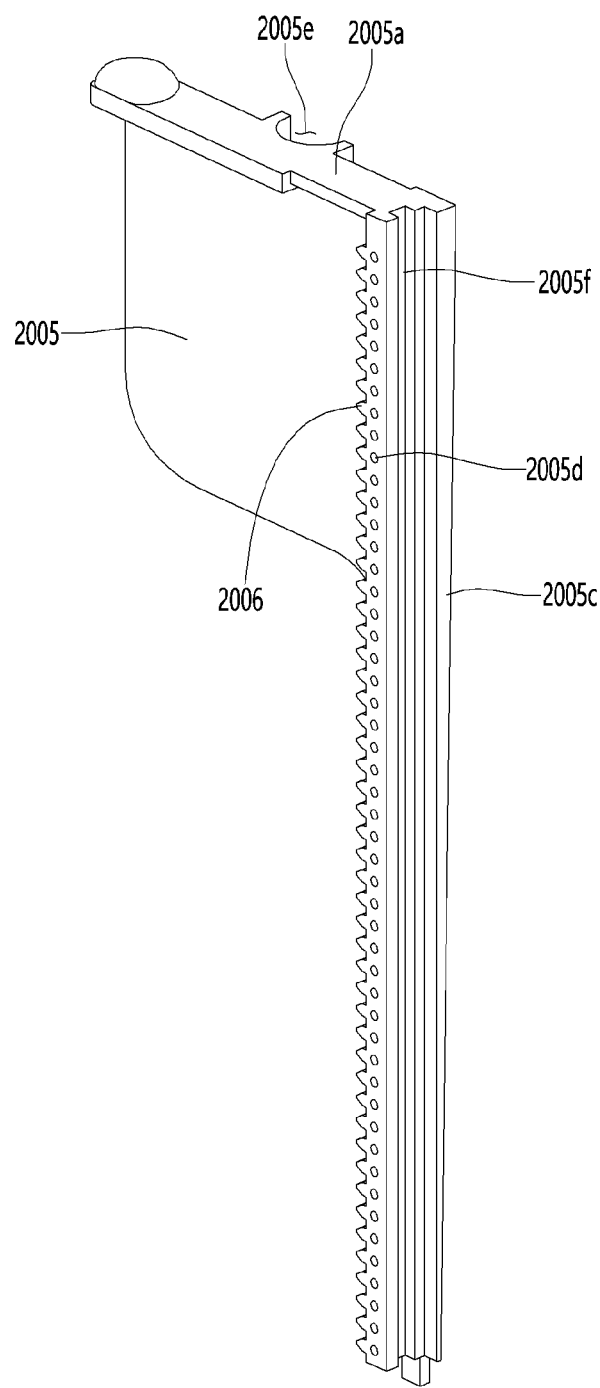
FIG. 21 is a perspective view of a third plate.
Figure 22:
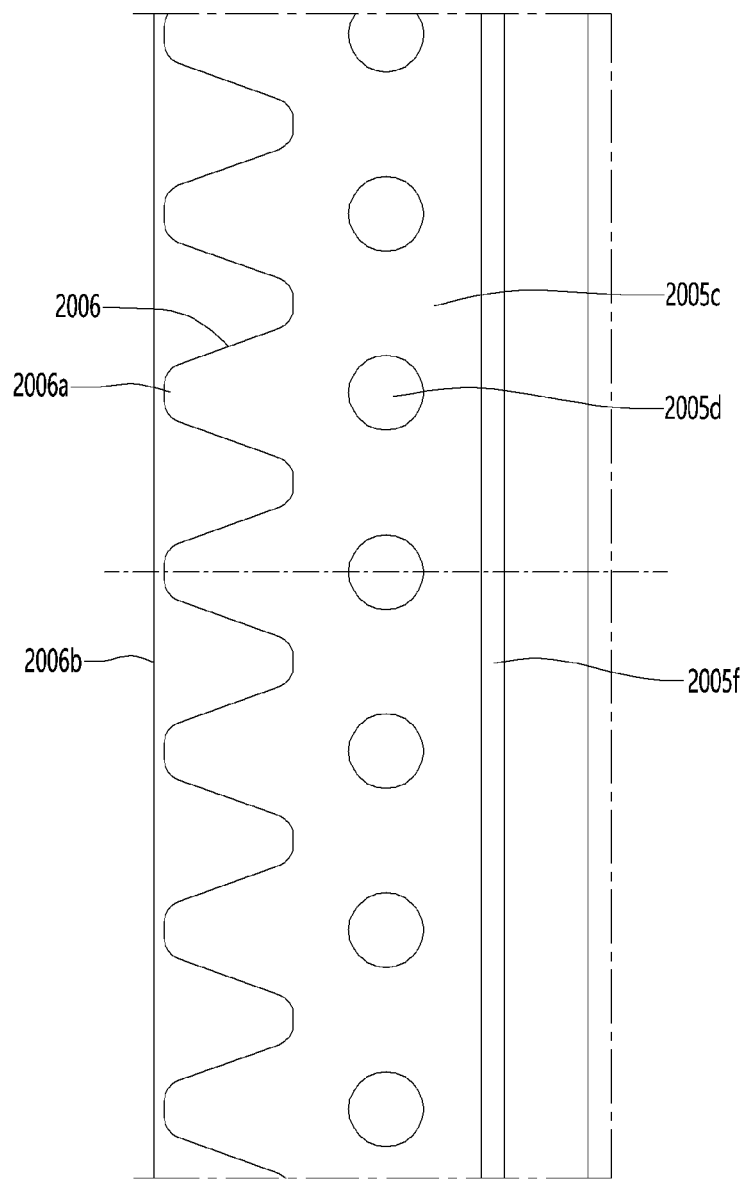
FIG. 22 is a front view of a portion of a third plate.

FIG. 21 is a front perspective view of the third plate. FIG. 22 is a front view of a portion of the third plate. First, in order to reinforce the lifting gear 2006, a reinforcing recess 2005d formed to be concave at the vertical extending portion 2005c provided with the lifting gear 2006 or a reinforcing hole penetrating a vertical extending portion 2005c may be provided.

For example, the reinforcing recess 2005d may be concave from the front to the rear in the vertical extending portion 2005c. In some implementations, the reinforcing recess 2005d may be provided in plurality and the plurality of reinforcing recesses 2005d may be spaced apart from each other in the up-down direction and may be arranged in a line. Further, the reinforcing recess 2005d may be provided in a circular shape when viewed from the front. In some implementations, the reinforcing recess 2005d may be arranged at the same interval as the interval between gear teeth of the lifting gear 2006. In some implementations, the center of the reinforcing recess 2005d may be disposed to be aligned with the highest portion of the gear teeth configuring the lifting gear 2006, i.e., the center of the thread ridge 2006a, in a horizontal direction. That is, the center of the reinforcing recess 2005d and the center of the thread ridge 2006a of the gear teeth configuring the lifting gear 2006 may be formed at the same height.

In some implementations, the vertical extending portion 2005c may form a plate-shaped reinforcing plate 2006b on one side of the lifting gear 2006. The reinforcing plate 2006b may be provided at a portion facing the fourth gear 2609. For example, the fourth gear 2609 may be located on the front side of the lifting gear 2006 and may be engaged with gear teeth configuring the lifting gear 2006, and the reinforcing plate 2006b may be positioned on the rear side of the lifting gear 2006.

On one side of the vertical extending portion 2005c, a gear teeth that configures the lifting gear 2006 is provided to be concave backward by a predetermined height on the front side to provide the lifting gear 2006, and a rear surface without the gear teeth may be provided as a reinforcing plate 2006b.

Where the reinforcing plate 2006b is configured as described above, the vertical extending portion 2005c provided with the lifting gear 2006 is reinforced to minimize damage to the gear teeth and deflection of the vertical extending portion 2005c.

Further, the third plate 2005 may have a screw fastening hole 2005e in the up-down direction. In some implementations, a screw fastening hole (not shown) may be formed in the third plate 2005 in the vertical direction and communicate with the screw fastening hole. Then, where the third plate 2005 is coupled, a screw may be fastened through the screw fastening hole 2005e exposed to the upper side of the third plate 2005 to fix the first plate 2000 to the third plate 2005.

Figure 23:
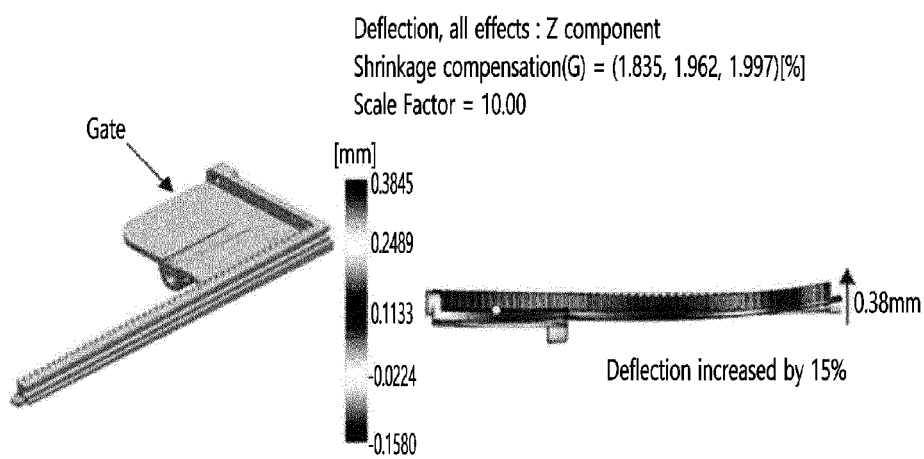
FIG. 23 is an example result of experimenting the degree of deflection deformation of a lifting gear before machining a reinforcing recess.
Figure 24:
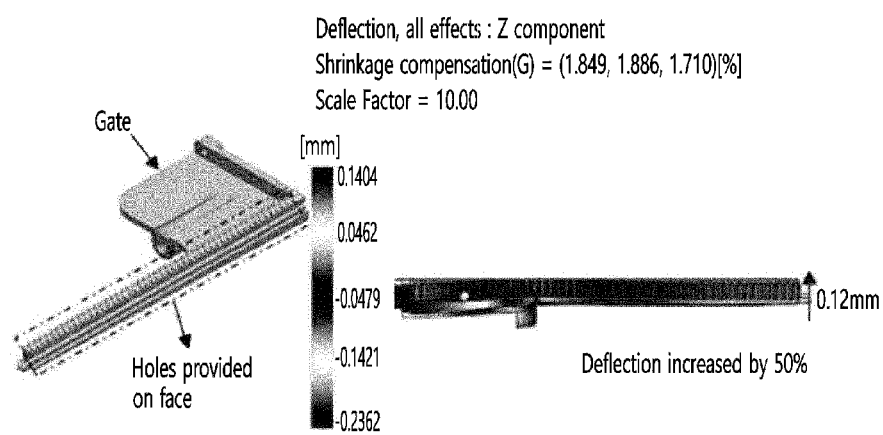
FIG. 24 is an example result of experimenting the degree of deflection deformation of a lifting gear after machining a reinforcing recess.

FIG. 23 shows an example result of experimenting a degree of deflection deformation of the lifting gear before machining a reinforcing recess. FIG. 24 shows an example result of experimenting a degree of deflection deformation of the lifting gear after machining the reinforcing recess.

In comparing between the results of FIGS. 23 and 24, it can be seen that the degree of deflection deformation of the vertical extending portion 2005c provided with the lifting gear 2006 is significantly low after the reinforcing recess 2005d is machined, as compared with the degree of deflection deformation of the vertical extending portion 2005c provided with the lifting gear 2006 before the reinforcing recess 2005d is machined.

That is, in the present disclosure, the vertical extending portion may be reinforced by machining the reinforcing recess 2005d in the vertical extending portion 2005c provided with the lifting gear 2006, thereby minimizing deflection deformation of the vertical extending portion 2005c.

Meanwhile, the lifting motors and gears, which are the main parts for the automatic elevating of the water ejection nozzle and the lifting cover, cause operational noise. Noise of the lifting motor decreases as the RPM decreases, while noise of the gears are caused by various factors such as a friction area, a rotation speed, and a gear shape.

According to the present disclosure, noise occurrence may be reduced by forming the gears in contact with each other with different materials and by forming the first gear with a material having good tensile elongation.

<Lighting Output Structure>

In some instances, where the water ejection lifting covers 200 and 210 and the water ejection nozzle 240 are configured to move up and down and rotate as described above, the user may act unconsciously during movement of the water ejection lifting covers 200 and 210 and the water ejection nozzle 240, thereby causing an interference between the water ejection lifting covers 200 and 210 and the water ejection nozzle 240. This may result in an injury to the user or an accident in which parts of the water ejecting apparatus parts damaged. Therefore, where the water ejection lifting covers 200 and 210 and the water ejection nozzle 240 are configured to move up and down and rotate, it may be necessary to display movement of the water ejection lifting covers 200 and 210 and the water ejection nozzle 240 so that the user may visually reliably recognize the movement of the water ejection lifting covers 200 and 210 and the water ejection nozzle 240.

As described below, a light source 212 may be set to be turned on immediately when the user presses a water ejection button. In some implementations, the light source 212 may be set to be turned on immediately when the lifting cover 210 starts a descending operation from the initial position. In some implementations, the light source 212 may be set to be turned off when the lifting cover 210 ascends to reach the initial position, while maintained in an ON state.

Figure 25:
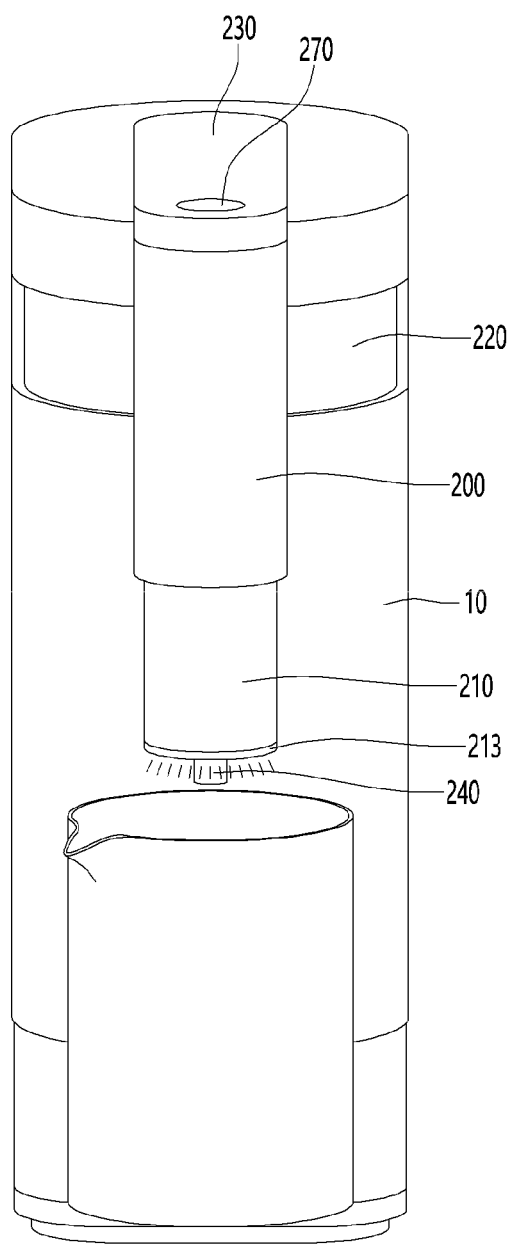
FIG. 25 is a front perspective view of a water purifier that outputs light.
Figure 26:
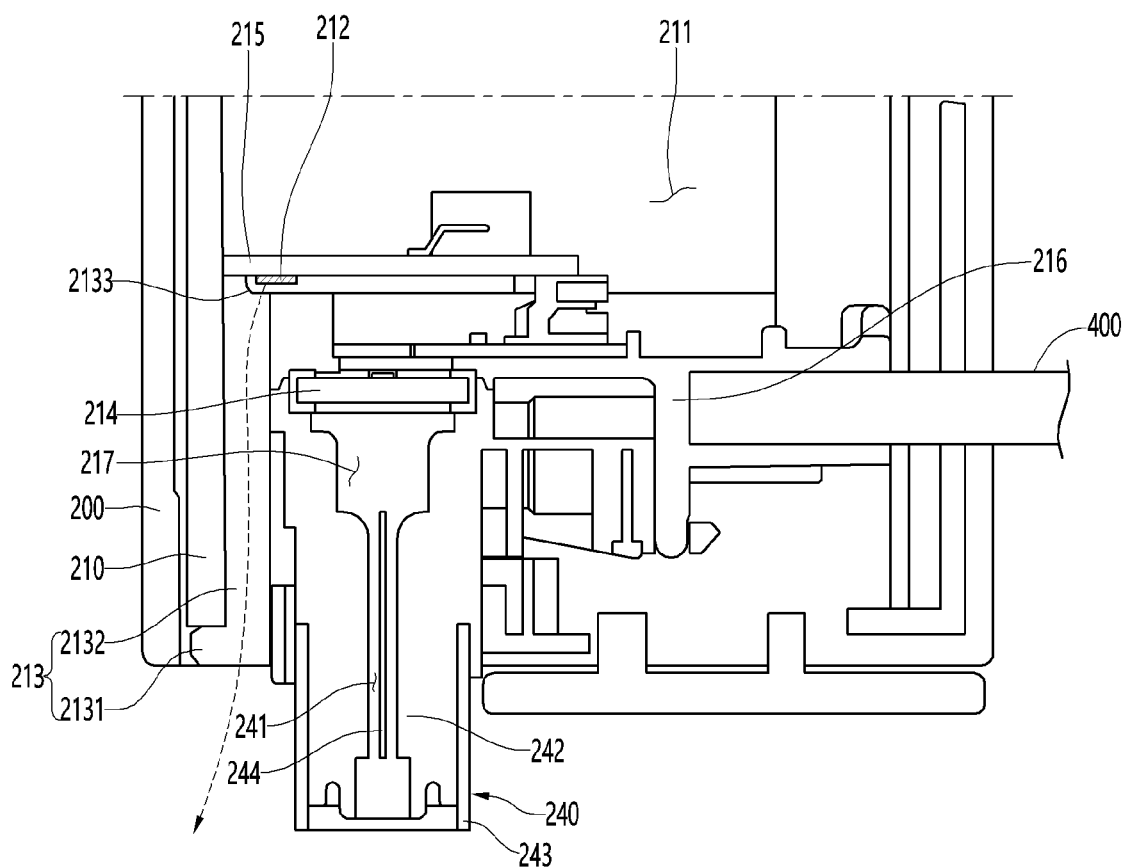
FIG. 26 is a longitudinal cross-sectional view of a water ejection unit having a lighting output function.
Figure 27:
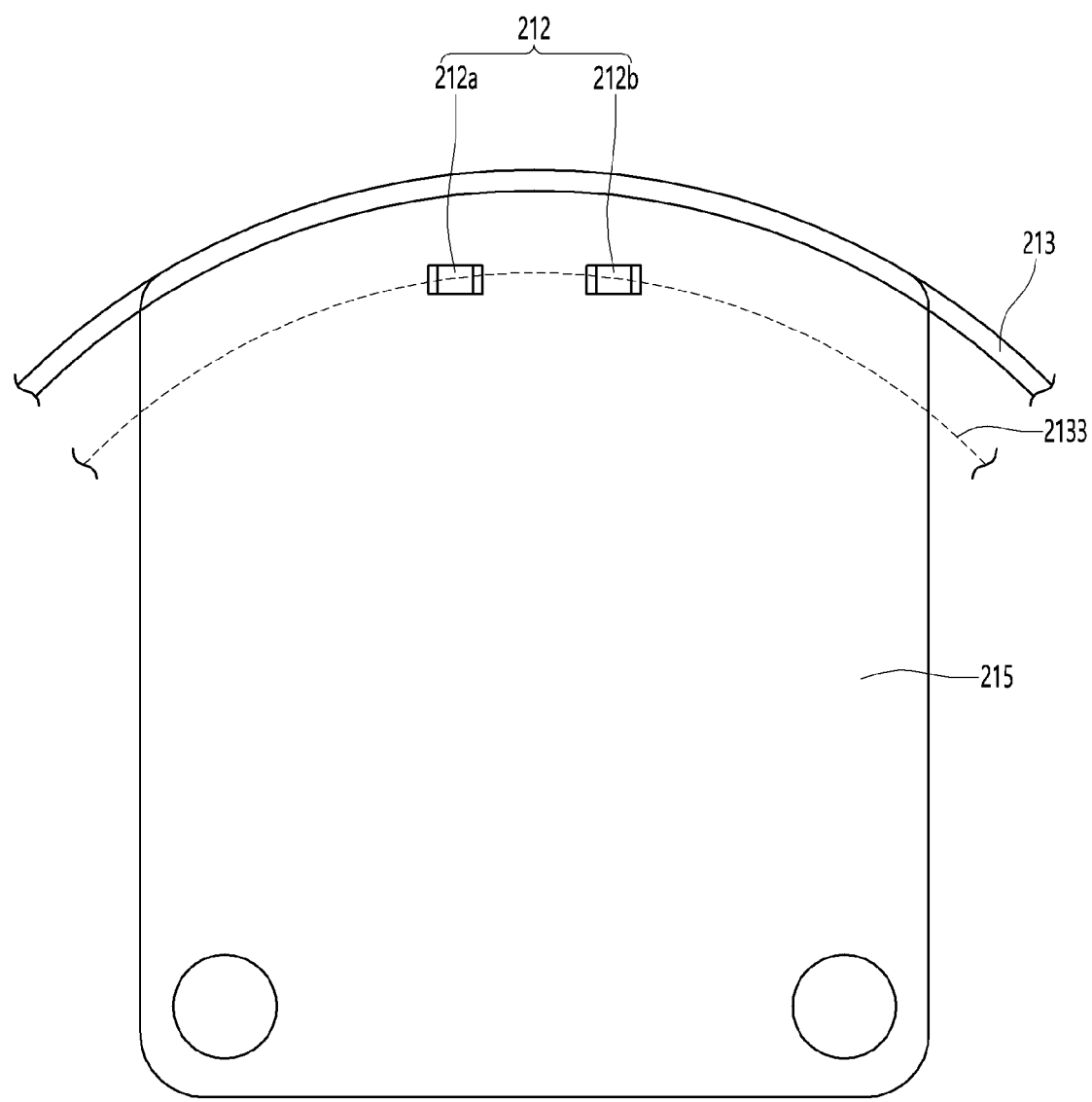
FIG. 27 is a bottom view of a light source printed circuit board (PCB).
Figure 28:
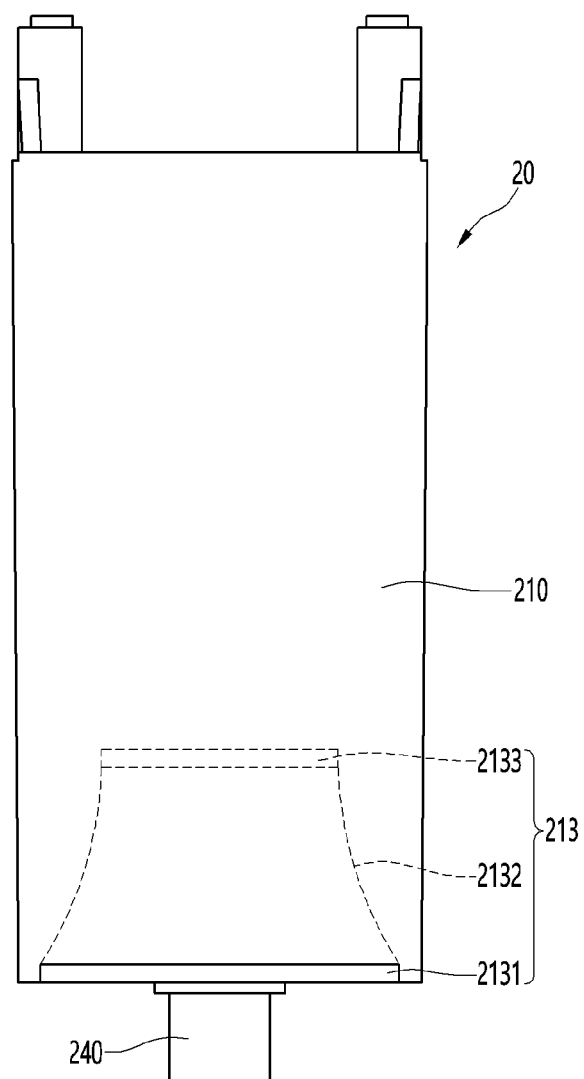
FIG. 28 is a perspective view of a lifting cover equipped with a diffusion member.

FIG. 25 is a front perspective view of the water ejecting apparatus with the lighting output. FIG. 26 is a longitudinal cross-sectional view of a water ejection unit having a lighting output function. FIG. 27 is a bottom view of a light source PCB. FIG. 28 is a perspective view of a lifting cover equipped with a diffusion member. Referring to FIGS. 25 to 28, the water ejection unit 20 includes a light source 212 provided inside the lifting cover 210 and provided above the water ejection nozzle 240 to output light downward and a protective plate 214 provided below the light source 212 and protecting the light source 212 from water flowing to the water ejection nozzle 240.

In some implementations, the light source 212 may output light of one color. In some implementations, the light source 212 may be provided in plurality. In some implementations, the light source 212 may output at least two colors of light.

In some implementations, the light source 212 may be provided as an LED. For example, the light source 212 may include a first LED 212a outputting blue and a second LED 212b outputting white.

When a plurality of light sources 212 are provided as described above, different colors of light may be output to inform the user according to situations. For example, when water is ejected to the water ejection nozzle 240, the first LED 212a may be turned on and blue light may be output to the vicinity of the water ejection nozzle 240. Therefore, the user may see blue light from the outside of the water ejecting apparatus and recognize that water is ejected from the water ejection nozzle 240.

As a modification, the first LEDs 212a may be provided in plurality and the plurality of LEDs 212a may output blue and red. Also, the first LED 212a may output different colors according to types of ejected water.

In some implementations, the second LED 212b may be turned on when the water ejection lifting covers 200 and 210 are rotated or when the lifting cover 210 performs an elevating operation in order to output white light to the vicinity of the water ejection nozzle 240. Accordingly, the user may see the white light from the outside of the water ejecting apparatus and recognize that the water ejection lifting covers 200 and 210 are moving.

In some implementations, the light source 212 may be used as mood lighting. In some implementations, the lifting cover 210 may be provided with a diffusion member 213 formed of a light-transmissive material at a lower end thereof, and light output from the light source 212 is exposed to the vicinity of the water ejection nozzle 240 through the diffusion member 213. At least a portion of the diffusion member 213 may be accommodated inside the lifting cover 210, and the other portion may be exposed to the outside of the lifting cover 210. The diffusion member 213 may be provided near the water ejection nozzle 240. In some implementations, at least a portion of the diffusion member 213 may be exposed to a bottom surface of the lifting cover 210. In addition or alternatively, at least a portion of the diffusion member 213 may be exposed to a side surface of the lifting cover 210. In some implementations, the diffusion member 213 may be made of a material obtained by mixing transparent plastic and a diffusion pigment.

In this case, the diffusion member 213 may simply allow light output from the light source 212 to pass therethrough and diffuse the light so that diffused light may pass therethrough. That is, the diffusion member 213 may function as a diffuser for LED lighting.

At least a portion of the lower end of the lifting cover 210 may form a clearance with the water ejection nozzle 240, and the diffusion member 213 may be fitted into the clearance.

The diffusion member 213 may include a diffusion plate 2132 having a convex shape forward (left side in FIG. 26) so as to be in contact with an inner surface of the lifting cover 210 and a diffusion projection 2131 extending outward along a circumference of a lower end of the diffusion plate 2132.

The circumference of the lower end of the diffusion plate 2132 can have a convex shape in the front (refer to the left side of FIG. 26) to contact the inner surface of the lifting cover 210. It may include a diffusion protrusion 2131 extending outward. For example, the diffusion projection 2131 may be exposed to the outside of the lifting cover 210. Therefore, light output from the light source 212 mounted on the bottom surface of the light source PCB 215 disposed inside the lifting cover 210 may be exposed to the outside of the lifting cover 210 through the diffusion plate 2132 and the diffusion projection 2131.

In some implementations, a step portion 2133 formed to be concave as a curved surface at an inner corner portion and extending along an inner circumference of the diffusion plate 2132 may be provided at an upper end of the diffusion plate 2132. For example, at least a portion of the light source 212 may be disposed to overlap the step portion 2133. Specifically, at least a portion of the light source 212 may be arranged to overlap the step portion 2133 in the up-down direction and may be arranged to overlap the step portion 2133 in the left-right direction. Accordingly, light output from the light source 212 may be more reliably transferred to the diffusion plate 2132 and the diffusion projection 2131 through the step portion 2133.

In some implementations, the light source PCB 215 may be disposed inside the lifting cover 210. In some implementations, the light source 212 may be mounted on a bottom surface of the light source PCB 215. An upper frame 216 on which the light source PCB 215 is seated may be provided at an upper portion of the water ejection nozzle 240.

In some implementations, light output from the light source 212 may be output through the diffusion member 213 to the lower end of the lifting cover 210. For example, the light source 212 may be set to be turned on only when water is ejected through the water ejection nozzle 240. As another example, the light source 212 may be set to be turned on only when the water ejection lifting covers 200 and 210 and the water ejection nozzle 240 rotate or move. Accordingly, when water ejection is performed or when the water ejection lifting covers 200 and 210 and the water ejection nozzle 240 move, the user may easily recognize the corresponding state.

The purpose of providing the light source 212 is to inform the user of the water ejection state or whether the water ejection unit performs an elevating operation or a rotational operation. Accordingly, light output from the light source 212 must have a degree of brightness allowing the user to recognize the light when the light is exposed to the outside of the lifting cover 210 through the diffusion member 213 after being output from the light source 212.

Referring to FIG. 26, a chamber 217 may be further provided above the water ejection nozzle 240 and provided below the protective plate 214 to transfer water introduced through the water ejection pipe 400 to the water ejection nozzle 240. Accordingly, cold water, purified water, and hot water introduced through the water ejection pipe 400 may pass through the chamber 217 and may then be released to the outside of the water ejection nozzle 240.

In some implementations, the water ejection nozzle 240 may include an inner member 242 having a hollow 241 provided inside thereof to allow water to be discharged therethrough and an outer member 243 connected to an outer lower end of the inner member 242 and exposed to the outside of the lifting cover 210.

For example, a chamber 217 communicating with the hollow 241 may be provided above the inner member 242. The chamber 217 has a larger diameter than the hollow 241.

In some implementations, a plurality of ribs 244 protruding toward the center may be provided along a water ejection direction on an inner surface of the hollow 241. The ribs 244 maintains a shape of a stream of water and improves vortices.

In some implementations, the outer member 243 may be made of a stainless material. When the outer member 243 that is exposed to the outside of the lifting cover 210 is made of a stainless material, the outer member 243 does not rust so as to be hygiene and damage and deformation that occurs when frequently used may be prevented.

In some implementations, the inner member 242 and the outer member 243 may be integrally injection-molded. For example, the outer member 243 may be formed of a metal material, and the inner member 242 and the outer member 243 may be integrally formed by an insert injection molding method. Therefore, a coupling force between the inner member 242 and the outer member 243 is increased to prevent leakage. In addition, the inner member 242 and the outer member 243 may be easily manufactured as compared with an existing assembling method.

<Touch Bar Structure>

Figure 29:
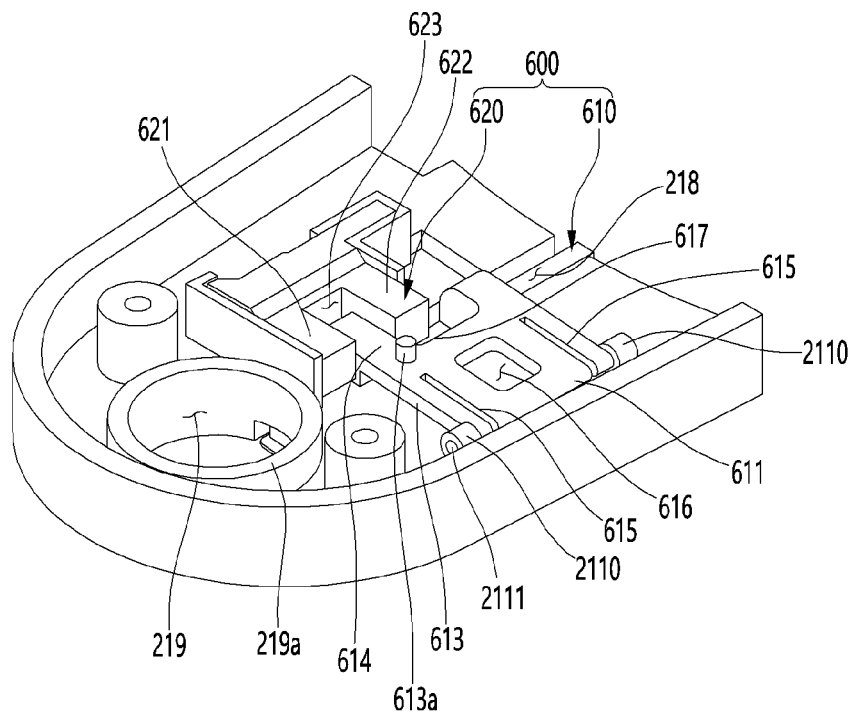
FIG. 29 is a partially cut-away perspective view of a lifting cover.
Figure 30:
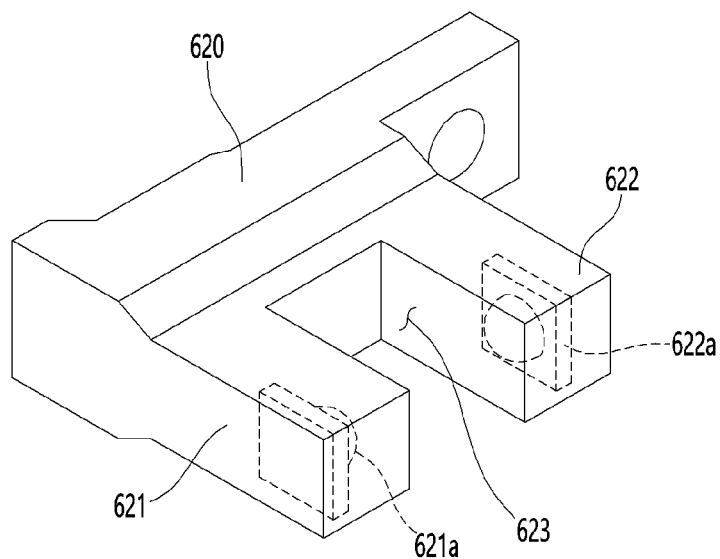
FIG. 30 is a perspective view of a detection sensor.
Figure 31:
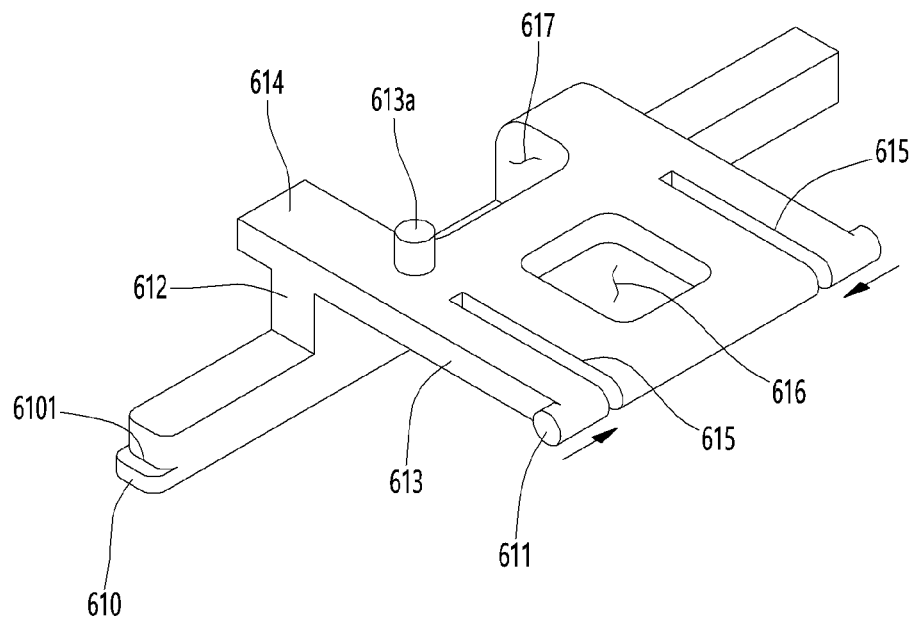
FIG. 31 is a perspective view of a touch bar.
Figure 32:
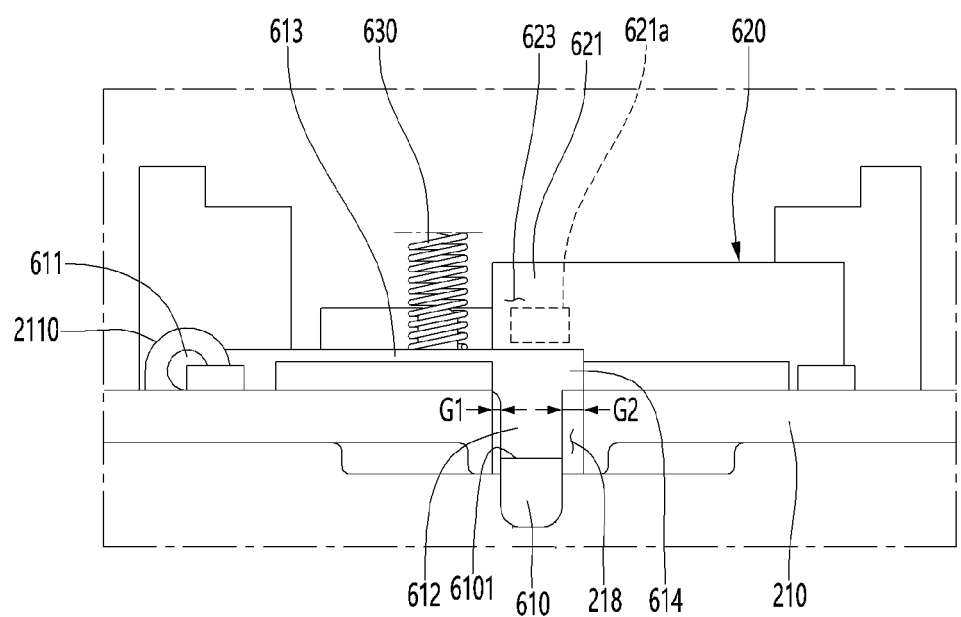
FIG. 32 is a vertical cross-sectional view of a lifting cover showing a state where a touch bar descends.
Figure 33:
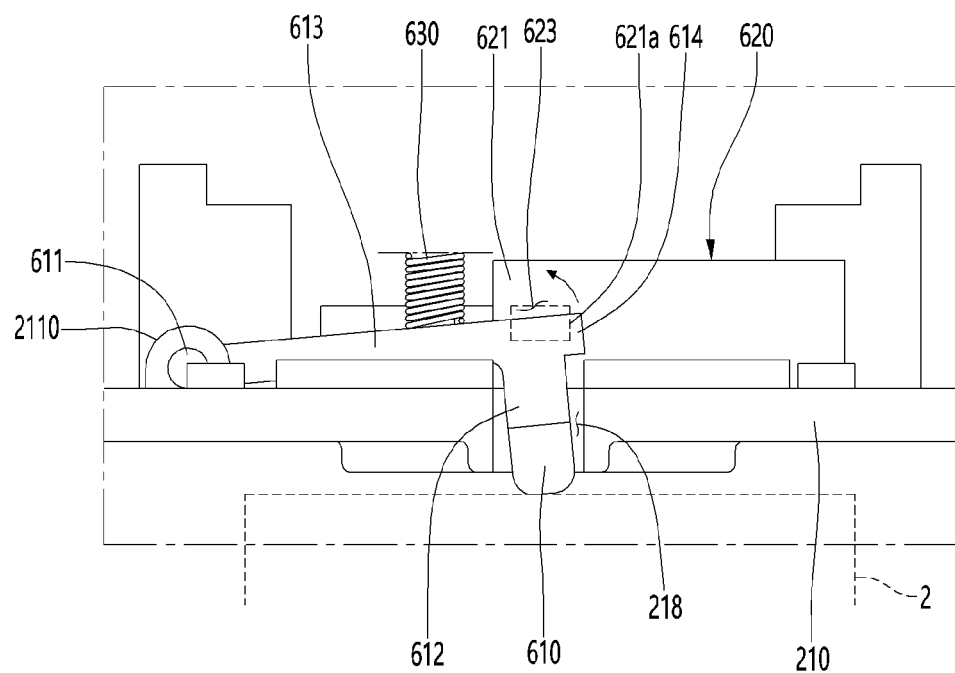
FIG. 33 is a vertical cross-sectional view of a lifting cover showing a state where a touch bar ascends.
Figure 34:
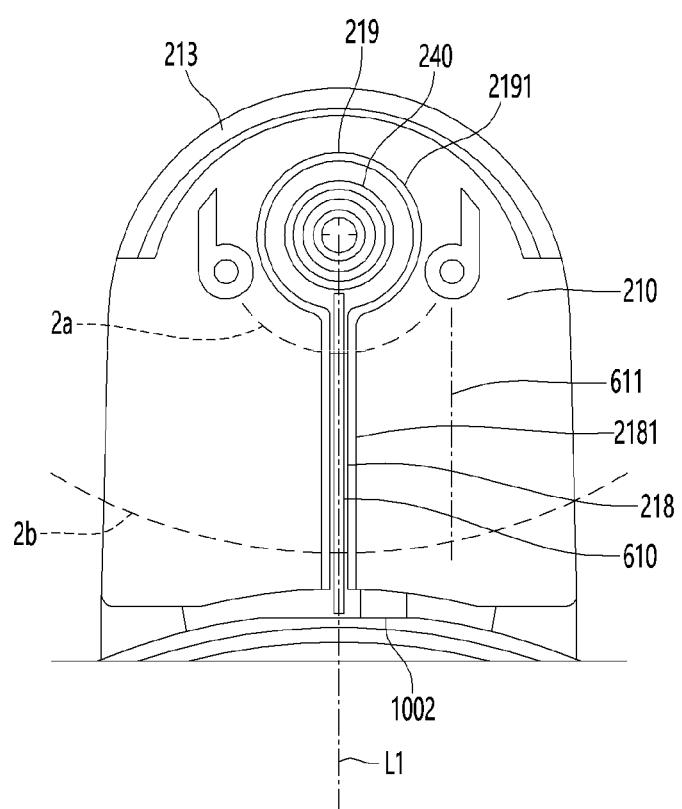
FIG. 34 is a bottom view of a lifting cover.

FIG. 29 is a partially cut perspective view of a lifting cover. FIG. 30 is a perspective view of a detection sensor. FIG. 31 is a perspective view of a touch bar. FIG. 32 is a longitudinal cross-sectional view of the lifting cover when the touch bar is in a descended position. FIG. 33 is a longitudinal cross-sectional view of the lifting cover when the touch bar is in an ascended position. FIG. 34 is a bottom view of the lifting cover.

In the water ejecting apparatus according to the present disclosure, the lifting cover 210 has a function of being automatically elevated. For example, when the user places a water receiving container under the water ejection nozzle 240 and presses the water ejection button, the lifting cover 210 descends and detects a height of the water receiving container, before water ejection is performed. Then, water is ejected in a state where the lifting cover 210 descends adjacent to the height of the water receiving container.

In some implementations, the lifting cover 210 includes a detection unit 600. For example, the detection unit 600 may detect the water receiving container in a contact manner. As another example, the detection unit 600 may detect the height of the water receiving container in a non-contact manner.

Hereinafter, an embodiment in which the detection unit 600 detects the height of the water receiving container in a contact manner will be described.

The detection unit 600 may include a touch bar 610 exposed to a lower surface of the lifting cover 210 and disposed on the virtual line L1 connecting the center of the case 10 of the water ejection nozzle 240. The touch bar 610 may be provided in the front-rear direction, with the water ejection unit 20 positioned at the center.

In some implementations, the touch bar 610 may be provided to be movable in the up-down direction. The touch bar 610 may be installed to appear or disappear downward from the lifting cover 210, while elevating vertically inside the lifting cover 210. For example, the touch bar 610 may be disposed on the virtual line L1 connecting the center of the water ejection nozzle 240 and the center of the rotator 220 and may be exposed in a straight shape on the bottom surface of the lifting cover 210.

In some implementations, the touch bar 610 may be provided in the entire section between the water ejection nozzle 240 and the lower front cover 1000.

A slit hole 218 is provided to be open on a lower surface of the lifting cover 210 and at least a portion of the touch bar 610 may be exposed through the slit hole 218.

In some implementations, a through hole 219 may be provided on the lower surface of the lifting cover 210 to allow the water ejection nozzle 240 to pass therethrough. For example, one side of the slit hole 218 may communicate with the through hole 219. Further, the other side of the slit hole 218 may extend to the other end of the lower surface of the lifting cover 210. The other end of the slit hole 218 has an open shape.

In some implementations, a length of the touch bar 610 exposed through the slit hole 218 may be greater than a length of the slit hole 218.

As described above, as the touch bar 610 is elongated, the touch bar 610 may detect a height of any water receiving container placed between the water ejection nozzle 240 and the flat portion 1002 of the front cover 100.

In some implementations, the lifting cover 210 may include a side wall 219*a* extending upward along the periphery of the through hole 219. With the configuration of the side wall 219*a*, the periphery of the water ejection nozzle 240 may be surrounded and the water ejection nozzle 240 may be fixed more reliably.

In some implementations, reinforcing protrusions 2121 and 2191 (see FIG. 34) extending downward may be provided in the vicinity of the through holes 219 and the slit hole 218 on the bottom surface of the lifting cover 210.

When the lifting cover 210 descends, the reinforcing protrusions 2181 and 2191 (see FIG. 34) first comes into contact with the water receiving container 2 before the bottom surface of the lifting cover 210. And, as a contact area between the water receiving container 2 and the lifting cover 210 is significantly reduced by the reinforcing protrusions 2181, 2191, a risk of bacterial infection or the like decreases, and as a result, hygiene may be improved.

In some implementations, the touch bar 610 may be mounted to be rotatable or elevated on the lifting cover 210. For example, the touch bar 610 may move up and down, while rotating with respect to the lifting cover 210.

The touch bar 610 may include a rotating shaft 611 rotatably coupled to the lifting cover 210. Further, a pair of rotating shaft coupling parts 2110 may be spaced apart from each other in the front-rear direction on the bottom surface of the lifting cover 210 and protruding upward so that the rotating shaft 611 may be rotatably fitted thereto. The rotating shaft coupling part 2110 may have a rotating shaft coupling hole 2111 into which the rotating shaft 611 is inserted. Therefore, the rotating shaft 611 may be inserted into the rotating shaft coupling hole 2111 and rotated.

In some implementations, the rotating shaft 611 may be formed in parallel to the touch bar 610. The touch bar 610 may be connected to the rotating shaft 611 by connection portions 612 and 613. The connection portions 612 and 613 may include a vertical connection portion 612 extending upward from an upper side of the touch bar 610 and a horizontal connection portion 613 extending in a horizontal direction to connect the upper side of the vertical connection portion 612 to the rotating shaft 611.

The horizontal connection portion 613 may have a plurality of slits 615 concavely cut in a direction perpendicular to the rotating shaft 611 so that the rotating shaft 611 may be more easily inserted into the rotating shaft coupling hole 2111. With the configuration of the slit 615, an interval between both ends of the rotating shaft 611 is narrowed and then expanded so as to be more easily inserted into the rotating shaft coupling hole 2111.

In some implementations, the touch bar 610 may have a flat end portion facing the flat portion 1002. In some implementations, the touch bar 610 may include a step portion 6101 disposed at an end facing the water ejection nozzle 240. The step portion 6101 is provided in the form of a staircase. With the configuration of the step portion 6101, an area in which the end of the touch bar 610 and the water ejection nozzle 240 are located and face each other may be minimized, and when the touch bar 610 performs a rotation and elevating operation, a situation where the end of the touch bar 610 is in contact with the water ejection nozzle 240 so as to be interfered may be prevented in advance. Further, the length of the touch bar 610 exposed to the outside may elongate as much as possible to detect the height of any water receiving container disposed between the water ejection nozzle 240 and the flat portion 1002.

Referring to FIG. 32, the touch bar 610 can descend by self-weight. In this state, the horizontal connection portion 613 and the vertical connection portion 612 form an 'L' shape.

When the lifting cover 210 descends and the touch bar 610 comes into contact with the upper end of the water receiving container 2, the touch bar 610 ascends. For example, as shown in FIG. 33, the touch bar 610 rotates about the rotating shaft 611 and ascends by a predetermined height.

In some implementations, the touch bar 610 needs to be reduced in weight so as to react more sensitively when coming into contact with the upper end of the water receiving container 2. Accordingly, at least one lightweight hole 616 for weight reduction may be provided at the horizontal connection portion 613 of the touch bar 610.

As described above, when the touch bar 610 comes into contact with the upper end of the water receiving container 2 and ascends, it is necessary to detect the rise of the touch bar and to stop a descending operation of the lifting cover 210.

In some implementations, a detection sensor 620 that includes a transmitting portion 621 and a receiving portion 622 may be mounted above the touch bar 610. The detection sensor 620 may provide a space 623 between the transmitting portion 621 and the receiving portion 622. In some implementations, the transmitting portion 621 and the receiving portion 622 are arranged to face each other in order to exchange signals. For example, the transmitting portion 621 and the receiving portion 622 may exchange optical signals. As another example, the transmitting portion 621 and the receiving portion 622 may exchange infrared (IR) signals. As another example, the detection sensor 620 may be provided as a photo interrupt sensor. Here, the detection sensor 620 may detect the touch bar 610 in a contact manner or a non-contact manner.

In some implementations, at least a portion of the detection sensor 620 may be made of a material allowing infrared rays to be transmitted therethrough. For example, a cover of the detection sensor 620 may be made of a PC material having high permeability. Further, a blocking portion 614 disposed between the transmitting portion 621 and the receiving portion 622 may be made of an opaque ABS material having low light transmittance.

In some implementations, the touch bar 610 may be provided with the blocking portion 614 which ascends when the touch bar 610 ascends and is accommodated in the space 623 provided between the transmitting portion 621 and the receiving portion 622 to prevent a signal from the transmitting portion 621 from being received by the receiving portion 622.

When the touch bar 610 descends, the blocking portion 614 may descend to escape from the space 623 formed between the transmitting portion 621 and the receiving portion 622. Here, the signal of the transmitting portion 621 may be received by the receiving portion 622.

In some implementations, the connection portions 612 and 613 of the touch bar 610 may have a shelter portion 617 formed to be concave to accommodate either the transmitting portion 621 or the receiving portion 622. The shelter portion 617 may be configured to be concave in a direction of the rotating shaft 611. The shelter portion 617 may be shaped to be concave downward.

When a signal transmitted from the transmitting portion 621 is received by the receiving portion 622, the controller 90 may determine that the touch bar 610 does not ascend, and as a result, the controller 90 may determine that the touch bar 610 is not in contact with the upper end of the water receiving container. That is, when the lifting cover 210 descends, the controller 90 may determine that the lifting cover 210 has not yet approached the water receiving container and maintain descending operation of the lifting cover 210.

If the signal transmitted from the transmitting portion 621 is not received by the receiving portion 622, the controller 90 may determine that the touch bar 610 ascends and the blocking portion 614 ascends to be accommodated in the space 623 provided between the transmitting portion 621 and the receiving portion 622. That is, the controller 90 may determine that the touch bar 610 is in contact with the upper end of the water receiving container 2. Furthermore, the controller 90 may determine that, when the lifting cover 210 descends, the lifting cover 210 approaches to be in contact with the water receiving container, and stop the descending operation of the lifting cover 210.

For example, a force can be generated and applied to the water receiving container as the lifting cover 210 is in contact with the water receiving container. Therefore, in order to prevent damage and deformation of the lifting cover 210 and the water receiving container and to protect the water ejection nozzle 240, the lifting cover 210 ascends by a predetermined height before water ejection. Thereafter, water is ejected.

As described above, when the lifting cover 210 ascends, the touch bar 610 is spaced apart from the upper end of the water receiving container and may descend to the original position (state of FIG. 32) by the touch bar 610.

For example, the touch bar 610 may be provided with a force pushed downward by the elastic member 630 provided above the touch bar 610. The lower end of the elastic member 630 is in contact with and supported by the upper end of the touch bar 610. For example, the elastic member 630 is provided as a coil spring, a lower end thereof is inserted into the insertion protrusion 613a provided above the horizontal connection portion 613 so as to be supported in contact therewith.

In some implementations, an upper side of the elastic member 630 may be supported in contact with one side of the upper frame 216. For example, the upper frame 216 may include a bottom surface and an insertion protrusion inserted into an upper side of the elastic member 630 may extend downward.

With the configuration of the elastic member 630, the touch bar 610 may be provided with a force pushed downward, and when the touch bar 610 is not in contact with the water receiving container, the touch bar 610 may be maintained in a state of being exposed to a lower side of the lifting cover 210.

Also, when the touch bar 610 comes into contact with the water receiving container, the elastic member 630 is compressed and the touch bar 610 ascends. Then, when the touch bar 610 is separated from the water receiving container, the elastic member 630 is restored by its own elasticity, and accordingly the touch bar 610 descends and returns to the original position.

As described above, in a state where the water ejection unit 20 is positioned at the center (the state of FIG. 1), the touch bar 610 extends in the front-rear direction, and when the rotating shaft 611 of the touch bar 610 is formed in parallel with the touch bar 610, water receiving containers 2a and 2b having various sizes may be detected.

According to the present disclosure, a reaction speed of the detection sensor 620 may be adjusted by adjusting tension of the elastic member 630 or by adjusting a space between the detection sensor 620 and the touch bar 610.

For example, when the tension of the elastic member 630 is decreased, the touch bar 610 may react sensitively when coming into contact with the water receiving container, and as a result, the reaction speed of the detection sensor 620 may be increased. When the tension of the elastic member 630 is increased, the touch bar 610 reacts insensitively when coming into contact with the water receiving container, and as a result, the reaction speed of the detection sensor 620 may be decreased.

As another example, if the space between the detection sensor 620 and the touch bar 610 is reduced, even when the touch bar 610 slightly ascends when coming into contact with the water receiving container, the detection sensor 620 may detect the touch bar 610, and as a result, the reaction speed of the detection sensor 620 may be increased. If the space between the detection sensor 620 and the touch bar 610 is increased, the detection sensor 620 cannot detect the touch bar 610 until it ascends by a predetermined distance or when in contact with the water receiving container. As a result, the reaction speed of the detection sensor 620 may be decreased.

In some implementations, the water receiving containers 2a and 2b may be detected with the same sensitivity in all the sections, regardless of size of the water receiving containers 2a and 2b.

In some implementations, the touch bar 610 may have a cross-section convex downward so as to be in line contact with the upper end of the water receiving container disposed below the water ejection nozzle 240.

As described above, when the touch bar 610 and the water receiving container are in line contact with each other, the water receiving container may be more sensitively detected.

In some implementations, the touch bar 610 is rotated when in contact with the upper end of the water receiving container disposed below the water ejection nozzle 240. In addition, during the rotation operation of the touch bar 610, a curved portion may be provided at a lower end of the touch bar 610, so that a state where the lower end of the touch bar 610 is in contact with the upper end of the water receiving container 2 is maintained smoothly.

In some implementations, when the touch bar 610 rotates, the touch bar 610 may maintain a line-contact state with the water receiving container.

In some implementations, a gap G2 between the other end (right side in FIG. 32) of the slit hole 218 and the touch bar 610 may be greater than a gap G1 between one end (left side in FIG. 32) of the slit hole 218 and the touch bar 610.

In some implementations, the rotating shaft 611 is provided on one side of the slit hole 218. When the lower end of the touch bar 610 is in contact with the upper end of the water receiving container, the touch bar 610 rotates about the rotating shaft 611.

In some implementations, as shown in FIG. 33, the touch bar 610 is adjacent to the other end of the slit hole 218 (the right side in FIG. 32). Therefore, the gap G2 between the other end (right side in FIG. 32) of the slit hole 218 and the touch bar 610 is greater than the gap G1 between one end (left side in FIG. 32) of the slit hole 128 and the touch bar 610 so that the other end (right side in FIG. 32) of the slit hole 218 may not be in contact with the touch bar 610 when the touch bar 610 rotates.

In some implementations, the blocking portion 614 of the touch bar 610 may be maintained in a state of being accommodated in the space 623 provided between the transmitting portion 621 and the receiving portion 622. That is, even when the touch bar 610 does not detect the water receiving container, that is, even in the descending state, the upper end of the blocking portion 614 may be accommodated in the space 623 formed between the transmitting portion 621 and the receiving portion 622.

As such, when the blocking portion 614 is maintained at the state of being accommodated in the space 623 formed between the transmitting portion 621 and the receiving portion 622 even in the descending state, the detection sensor 620 may detect the touch bar although the touch bar 610 merely slightly ascends when in contact with the water receiving container, and thus, the controller may more quickly control the operation of the lifting motor.

Referring to FIG. 34, according to the present disclosure, the touch bar 610 may extend in the front-rear direction (up-down direction in FIG. 34) to detect both the water receiving container 2a having a relatively small inlet size and the water receiving container 2b having a relatively large inlet size.

In some implementations, according to the present disclosure, the rotating shaft 611 of the touch bar 610 is provided in the front-rear direction (up-down direction in FIG. 34) similar to the touch bar 610, so that an ascended height when the water receiving container 2a having a relatively small inlet size is detected and an ascended height when the water receiving container 2b having a relatively large inlet size is detected are equal, and since the touch bar 610 ascends to the same height at any position, the water receiving containers 2a and 2b may be detected in every section, regardless of size of the water receiving containers 2a and 2b.

According to the present disclosure, it is possible to detect the water receiving container in all areas, without an unavailable detection region of the water receiving container, and a minimum ascending height of the touch bar 610 required for detecting the water receiving container, i.e., the detection height, may be equal regardless of size or position of the water receiving container.

Referring to FIG. 34, the touch bar 610 of the present disclosure is configured to be longer than the slit hole 218 to detect a height of the water receiving container of any size placed between the water ejection nozzle 240 and the flat portion 1002 of the front cover 100.

Figure 35:
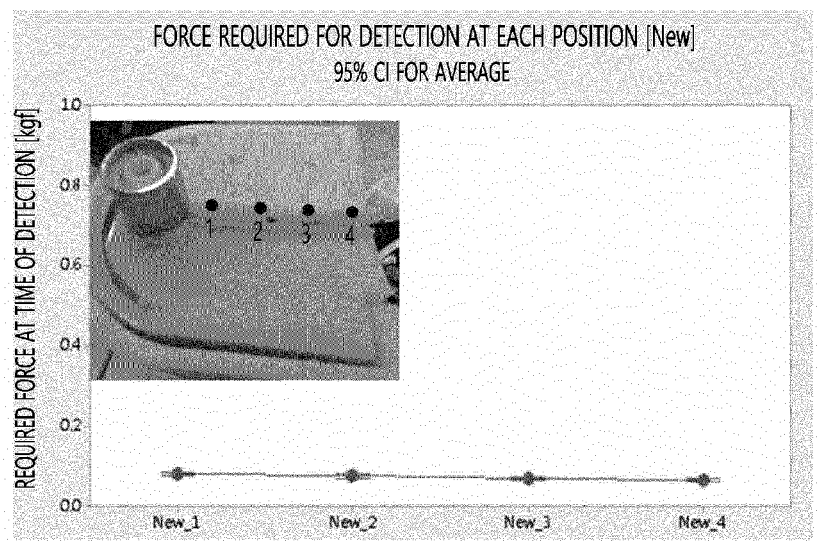
FIG. 35 is a graph showing an example result of measuring force required for detecting a container at each position in a structure according to the present disclosure.

FIG. 35 is a graph showing an example result of measuring a force required to detect a container at each position in the structure according to the present disclosure. Referring to FIG. 35, in the present disclosure, it can be seen that a force to be applied to the touch bar 610 to detect a container at each position of the touch bar 610 is uniform at all sections. That is, in the case of the present disclosure, it was confirmed that a force of 0.06 to 0.08 kgf at the same or similar distance of 5 mm, 15 mm, 25 mm, and 35 mm from the water ejection nozzle was required to detect a container.

Water may be ejected at a position adjacent to the water receiving container by the elevating of the water ejection nozzle. Accordingly, ejected water may be prevented from being scattered. In particular, since water scattering is prevented during ejection of water at a very high temperature, user safety may be ensured.

<Motor Signal Detection>

Figure 36:
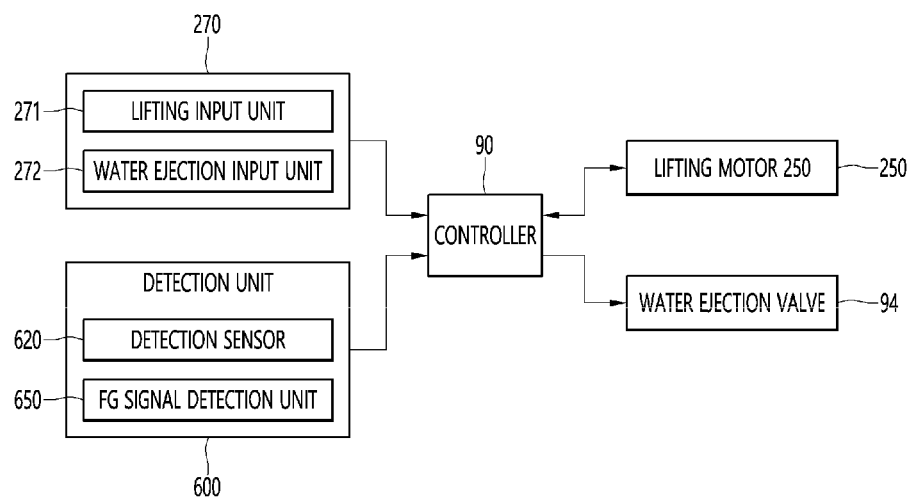
FIG. 36 is a block diagram showing major components for an elevating operation of a water ejection nozzle.
Figure 37:
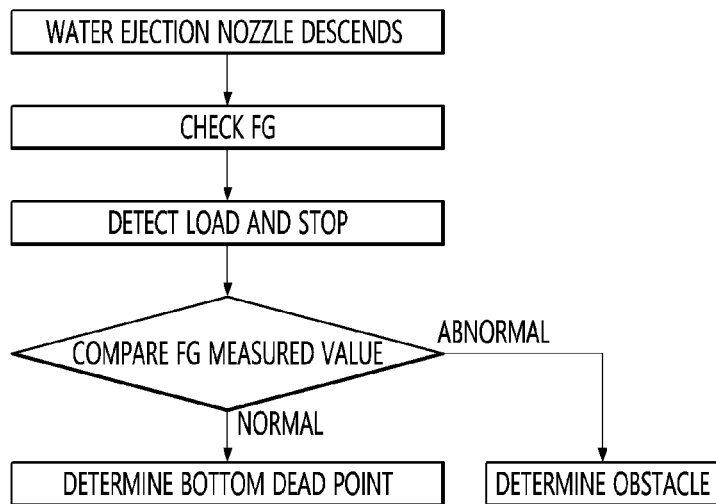
FIG. 37 is a control flow chart when a water ejection nozzle descends.
Figure 38:
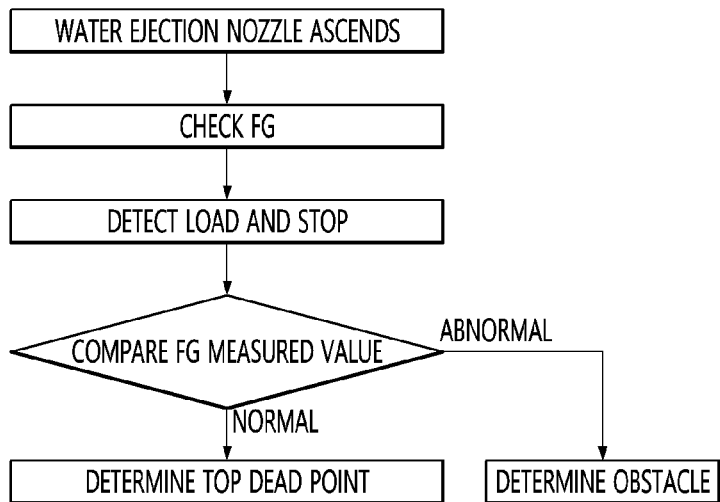
FIG. 38 is a control flow chart of when a water ejection nozzle ascends.

FIG. 36 is a block diagram showing example main components for the elevating operation of the water ejection nozzle. FIG. 37 is a control flowchart of an example descending operation of the water ejection nozzle. FIG. 38 is a control flowchart of an example ascending operation of the water ejection nozzle.

The water ejecting apparatus according to the present disclosure has a function of automatically elevating the lifting cover 210. For example, when the user places a water receiving container under the water ejection nozzle 240 and presses the water ejection button, the lifting cover 210 descends and detects a height of the water receiving container before water is ejected. Then, water ejection is performed in a state where the lifting cover 210 descends adjacent to the height of the water receiving container.

In some implementations, the lifting cover 210 includes the detection unit 600. The detection unit 600 may include a signal detection unit 650 that receives a "frequency generation" signal (hereinafter, an FG signal) generated by the lifting motor 250.

Referring to FIG. 37, when the user requests water ejection, the lifting motor 250 operates and the fixed cover 210 and the water ejection nozzle 240 descend. As described above, when the lifting motor 250 operates, an FG signal is generated by the lifting motor 250 and the signal detecting unit 650 receives the FG signal. The signal detected by the signal detection unit 650 is input to the controller 90, and the controller 90 recognizes the amount of rotation, rotation speed, and other suitable parameters of the lifting motor 250 through the FG signal of the lifting motor 250 and predicts a descending distance of the lifting cover 210 and the water ejection nozzle 240. Also, the controller 90 may measure a driving time of the lifting motor 250 to predict the descending distance of the lifting cover 210 and the water ejection nozzle 240.

In some implementations, the controller 90 may determine whether a sudden change in a load applied to the lifting motor 250 through the FG signal from the lifting motor 250. In general, when the elevating operation of the lifting cover 210 is forcibly stopped during the operation of the lifting motor 250, a large load equal to or greater than a predetermined reference value is applied to the lifting motor 250. For example, if the lower end of the lifting cover 210 or the water ejection nozzle 240 comes into contact with an obstacle such as a water receiving container or the like while the lifting cover 210 descends, a large load is applied to the lifting motor 250.

As another example, as the lifting cover 210 descends, the lifting cover 210 reaches a bottom dead point (lowest descending height) and comes into contact with the lower stopper, and here, as a restraint is physically applied to the descending operation of the lifting cover 210, a large load is applied to the lifting motor 250.

As another example, as the lifting cover 210 ascends, the lifting cover 210 reaches a top dead point (highest elevation height) and comes into contact with the upper stopper, and here, as a restraint is physically applied to the ascending operation of the lifting cover 210, a large load is applied to the lifting motor 250.

The controller 90 may determine whether a large load equal to or greater than the preset reference value is applied to the lifting motor 250 through an FG signal from the lifting motor 250. Further, when it is determined that a large load equal to or greater than the preset reference value is applied to the lifting motor 250, the controller 90 recognizes a cause thereof.

When the lifting cover 210 moves from the top dead point to the bottom dead point, the controller 90 may store a rotation direction or rotation amount information (hereinafter, stored information) of the lifting motor 250.

Also, when a load equal to or greater than the predetermined reference value is applied to the lifting motor 250 during the descending operation of the lifting cover 210, the controller 90 recognizes the rotation direction or rotation amount information (hereinafter, received information) of the lifting motor 250 in real time through the FG signal from the lifting motor 250.

Thereafter, the controller 90 compares the received information recognized in real time with the stored information. As a result of the comparison, if the received information is the same as the stored information, the controller 90 may determine that the lifting cover 210 reaches the bottom dead point, and stop driving of the lifting motor 250. That is, if the motor rotation amount of the storage information is the same as the motor rotation amount of the received information, the controller 90 may determine that the lifting cover 210 has reached the bottom dead point, and stop driving of the lifting motor 250. Then, the controller 90 may perform water ejection.

If the stored information and the received information are not the same as a result of comparison, the controller 90 may determine that the lifting cover 210 is in contact with an obstacle such as a water receiving container before reaching the bottom dead point, and may stop driving of the lifting motor 250. That is, when the motor rotation amount of the received information is lower than the motor rotation amount of the stored information, the controller 90 may determine that the lifting cover 210 is in contact with an obstacle such as the water receiving container before reaching the bottom dead point, and stop driving of the lifting motor 250.

When the driving of the lifting motor 250 is stopped as described above, the controller 90 may inform the user of the obstacle detection situation.

In some implementations, when the driving of the lifting motor 250 is stopped, the controller 90 may perform water ejection. In some implementations, when the driving of the lifting motor 250 is stopped, the controller 90 controls the lifting motor 250 such that the lifting cover 210 ascends by a predetermined height, and when the lifting cover 210 is completed, the controller 90 may perform water ejection. In some implementations, when water ejection terminates, the lifting cover 210 ascends.

When the lifting cover 210 moves from the bottom dead point to the top dead point, the controller 90 may store rotation direction or rotation amount information (hereinafter, second storage information) of the lifting motor 250.

If a load equal to or greater than a predetermined reference value is applied to the lifting motor 250 during the ascending operation of the lifting cover 210, the controller 90 recognizes rotation direction or rotation amount information (hereinafter, second received information) of the lifting motor 250 in real time through the FG signal from the lifting motor 250. Then, the controller 90 compares second received information recognized in real time with the second storage information. When the second received information is the same as the second storage information as a result of comparison, the controller 90 may determine that the lifting cover 210 has reached the top dead point, and stop driving of the lifting motor 250. That is, when the motor rotation amount of the second storage information is equal to the motor rotation amount of the second received information, the controller 90 may determine that the lifting cover 210 has reached the top dead point, and stop driving of the lifting motor 250.

In some implementations, when the lifting cover 210 and the water ejection nozzle 240 descend, the controller 90 may predict a distance by which the lifting cover 210 and the water ejection nozzle descend, and control the operation of the lifting motor 250 so that the lifting cover 210 and the water ejection nozzle 240 may ascend by the corresponding distance.

As another example, when the lifting cover 210 and the water ejection nozzle 240 ascend, the controller 90 may control the lifting motor 250 to operate by time corresponding to a driving time of the lifting motor 250 measured when the lifting cover 210 and the water ejection nozzle 240 descend.

If the second received information is not the same as the second storage information a result of comparison, the controller 90 may determine that the lifting cover 210 is in contact with an obstacle before reaching the top dead point, and stop driving of the lifting motor 250. That is, when the motor rotation amount of the second received information is lower than the motor rotation amount of the second storage information, the controller 90 may determine that the lifting cover 210 is in contact with an obstacle before reaching the top dead point, and stop driving of the lifting motor 250.

When the driving of the lifting motor 250 is stopped as described above, the controller 90 may inform the user of the obstacle detection situation. In some implementations, when the driving of the lifting motor 250 is stopped, the controller 90 may control the lifting motor 250 such that the lifting cover 210 descends by a predetermined height.

<Motor Speed Control>

Figure 39:
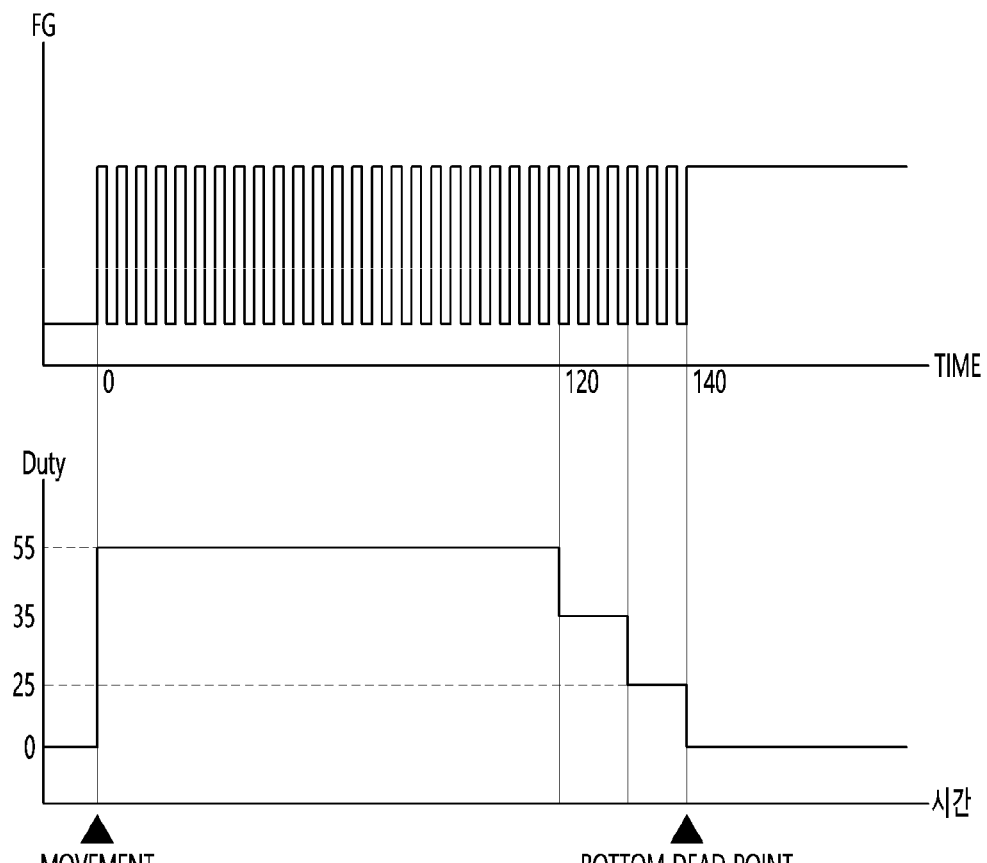
FIG. 39 is a graph showing a change in speed of a motor when the water ejection nozzle descends.
Figure 40:
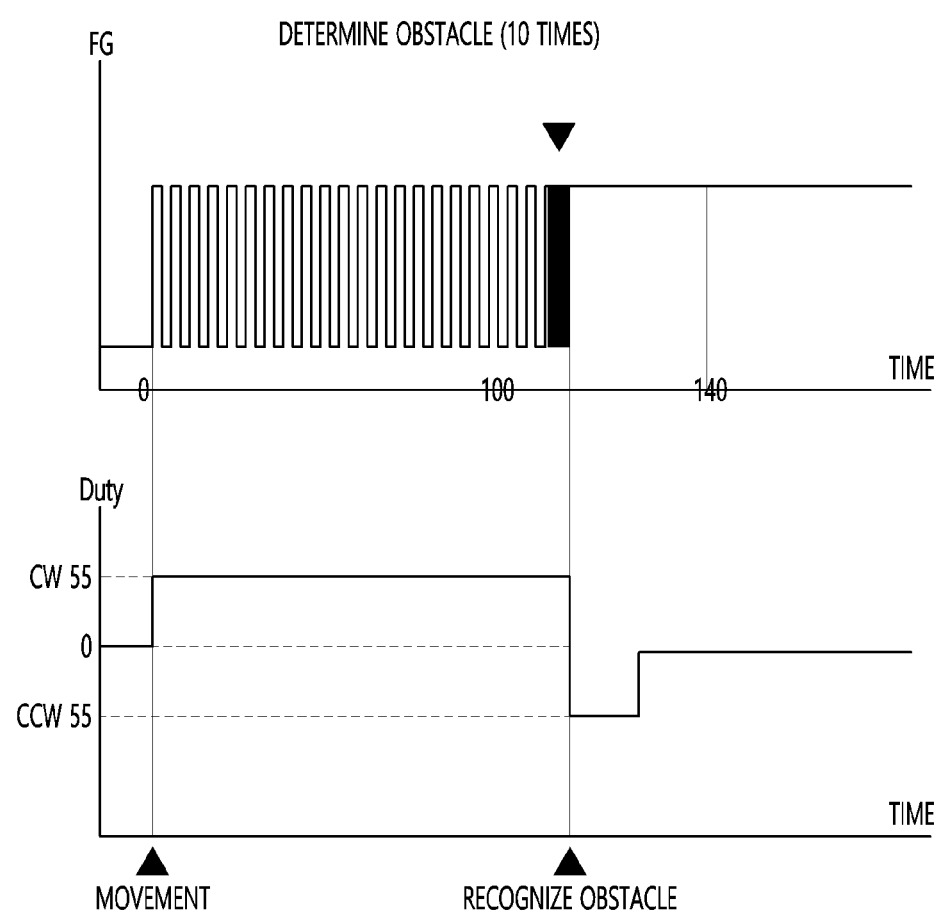
FIG. 40 is a graph showing a change in speed of a motor when an obstacle is detected as a water ejection nozzle descends.

FIG. 39 is a graph showing a change in speed of a motor when a water ejection nozzle descends. FIG. 40 is a graph showing a change in speed of a motor when an obstacle is detected in a state where the water ejection nozzle descends. Referring to FIG. 39, during the elevating operation of the water ejection unit 20, a rotation speed of the lifting motor 250 may be set to be different for each section. For reference, a rotation speed of the lifting motor 250 may be adjusted through duty control of the lifting motor 250.

The lifting motor 250 may be set to gradually decrease in speed in some sections where the lifting cover 210 descends. For example, when the lifting cover 210 descends, the lifting motor 250 may be lowered in duty to reduce a rotation speed of the lifting motor 250. In some examples, when the lifting cover 210 descends, the lifting motor 250 rotates at a first speed, and when the lifting cover 210 approaches the bottom dead point (maximum descending height), the lifting motor 250 may rotate at a second speed lower than the first speed.

In some implementations, when the lifting cover 210 is closer to the bottom dead point (maximum descending height), the lifting motor 250 may rotate at a third speed lower than the second speed. In some implementations, when the lifting cover 210 reaches the bottom dead point (maximum descending height), the lifting motor 250 may stop. For example, when the rotation speed of the lifting motor 250 decreases, a descending speed of the lifting cover 210 decreases.

As described above, when the lifting cover 210 descends, if the descending speed of the lifting cover 210 decreases toward the bottom dead point (maximum descending height), the lifting cover 210 may more easily stops at the bottom dead point (maximum descending height). In some implementations, an impact applied to the water receiving container and the detection unit may be reduced when a height of the water receiving container having a height similar to the bottom dead point (maximum drop height) is detected.

As another example, the lifting motor 250 may be set to be gradually lowered in speed in some sections where the lifting cover 210 ascends. For example, when the lifting cover 210 ascends, the lifting motor 250 rotates at a fourth speed, and when the lifting cover 210 approaches the top dead point (maximum ascending height), the lifting motor 250 may rotate at a fifth speed lower than the fourth speed.

In some implementations, when the lifting cover 210 is closer to the top dead point (maximum ascending height), the lifting motor 250 may rotate at a sixth speed lower than the fifth speed. In some implementations, when the lifting cover 210 reaches the top dead point (maximum ascending height), the lifting motor 250 may stop. For example, when the rotation speed of the lifting motor 250 decreases, the ascending speed of the lifting cover 210 decreases.

As described above, when the lifting cover 210 ascends, if the ascending speed of the lifting cover 210 decreases toward the top dead point (maximum ascending height), the lifting cover 210 may be more easily stopped at the top dead point (maximum ascending height).

In some implementations, the rotation speed of the lifting motor 250 and the ascending speed of the lifting cover 210 may be controlled to gradually decrease in several steps.

Referring to FIG. 40, the lifting motor 250 may rotate in a first direction CW, and when an obstacle such as a water receiving container is detected, the lifting motor 250 may rotate in a second direction CCW opposite to the first direction CW. The lifting motor 250 may then stop from rotating.

For example, the lifting motor 250 may recognize the water receiving container or the obstacle itself, without a separate sensor. In some examples, when the lifting cover 210 descends and comes into contact with an obstacle or a water receiving container in a state of descending according to an operation of the lifting motor 250, a large load may be applied to the lifting motor 250, and the controller 90 connected to the lifting motor 250 may recognize that the lifting cover 210 is in contact with an obstacle or the water receiving container based on a counter electromotive force generated here.

In some implementations, when it is determined that the lifting cover 210 is in contact with the water receiving container or an obstacle based on the counter electromotive force, the controller 90 changes a rotation direction of the lifting motor 250 to ascend the lifting cover 210 by a predetermined height. Then, when the lifting cover 210 ascends by a set height, the lifting motor 250 is stopped.

In some instances, various objects, such as spoons, ice, etc. can be used together with the container or included in the container. According to the present disclosure, it may be set such that an obstacle is recognized if the FG signal from the motor is not generated 10 times before reaching the bottom dead point in the special situation as described above. In addition, an avoidance algorithm of increasing a certain interval when an obstacle is determined is configured.

In some implementations, according to the present disclosure, the top dead point and the bottom dead point may be detected without the motor and/or without a sensor. For example, an algorithm for recognizing three types of information is implemented using a feedback signal from the motor.

In some implementations, the motor used in the driving module for elevating the water ejection nozzle is a BLDC motor. The BLDC motor requires a controller, and it is necessary to select a controller when developing the motor. In some implementations, the motor of the driving module applied to the present disclosure may be controlled using an IC called A4931. Features of the module are specialized in auto-elevation.

Some implementations of the present disclosure do not require a structure for detection of the top dead point and may implement the bottom dead point and obstacle detection function.

In some implementations of the present disclosure, the BLDC motor in use generates an FG signal. Then, in the normal mode, the controller 90 may determine whether the BLDC motor suddenly changes in load by using the FG signal generated when the BLDC motor rotates, and when the load suddenly changes, the normal mode may be switched to an emergency stop mode, and in the case of the sudden change in the load, the normal mode may be switched to an emergency stop mode, the BLDC motor is stopped in the emergency stop mode. According to the present disclosure, it is possible to detect the top dead point, the bottom dead point, an obstacle may be detected without a separate sensor by detecting only the FG signal.

For reference, when the BLDC motor operates, a moving length of the lifting cover may be calculated through the generated FG signal. Also, through a rotation amount or a rotation direction of the BLDC motor, a moving distance of the lifting cover may be determined by the FG signal and the positions of the top and bottom dead points may be detected.

An example detection method of the top dead point, bottom dead point, and obstacle is as follows. A normal state is determined through an initial module operation, and a driving distance to the top dead point and the bottom dead point is moved by measuring the FG signal. If a target FG value is not reached despite sufficient movement time, it is determined as interference of an obstacle. According to the present disclosure, a structure for detection is not required, obtaining an effect of simplifying the structure and reducing cost.

In some implementations, two positions may be additionally detected. In some implementations, it is possible to detect three situations (top dead point, bottom dead point, obstacle) without using a detection sensor.

Referring back to FIG. 36, the water ejecting apparatus 1 according to the present disclosure includes the controller 90 for controlling various components. The controller 90 may be installed in the case 10 as described above. In some implementations, the controller 90 may be provided separately from the water ejecting apparatus 1.

The controller 90 may control the operation of the lifting motor 250. Also, the lifting cover 210 and the water ejection nozzle 240 are elevated by the operation of the lifting motor 250. That is, the controller 90 may control the elevation of the water ejection nozzle 240.

In some implementations, the controller 90 is installed on the water ejection pipe 400 to control the operation of the water ejection valve 94 to control a flow of water. The water ejection valve 94 may be understood as a component that intermittently regulates a flow of water being ejected to the water ejection nozzle 240 and resultantly opens and closes the water ejection nozzle 240. That is, the controller 90 may control the water ejection and stopping of water ejection.

The controller 90 may be connected to the input unit 270 or the detection unit 600 to receive a signal and control an operation of the lifting motor 250 and the water ejection valve 94. The input unit 270 may include an elevation input unit 271 for inputting an elevation command of the lifting cover 210 and a water ejection input unit 272 for inputting an opening and closing command of the water ejection valve 94.

For example, the detection unit 600 may be disposed below the lifting cover 210. As another example, the detection unit 600 may be mounted on the front cover 100. In particular, the detection unit 600 may be provided in plurality and the plurality of detection units 600 may be installed in a line and spaced apart from each other in the up-down direction on the flat portion 1002. As another example, the detection unit 600 may be mounted on the water ejection nozzle 240 or may be mounted near the water ejection nozzle 240. The detection unit 600 is mounted to detect a height of a cup or the like placed under the water ejection nozzle 240.

<Elevating Operation Control>

Figure 41:
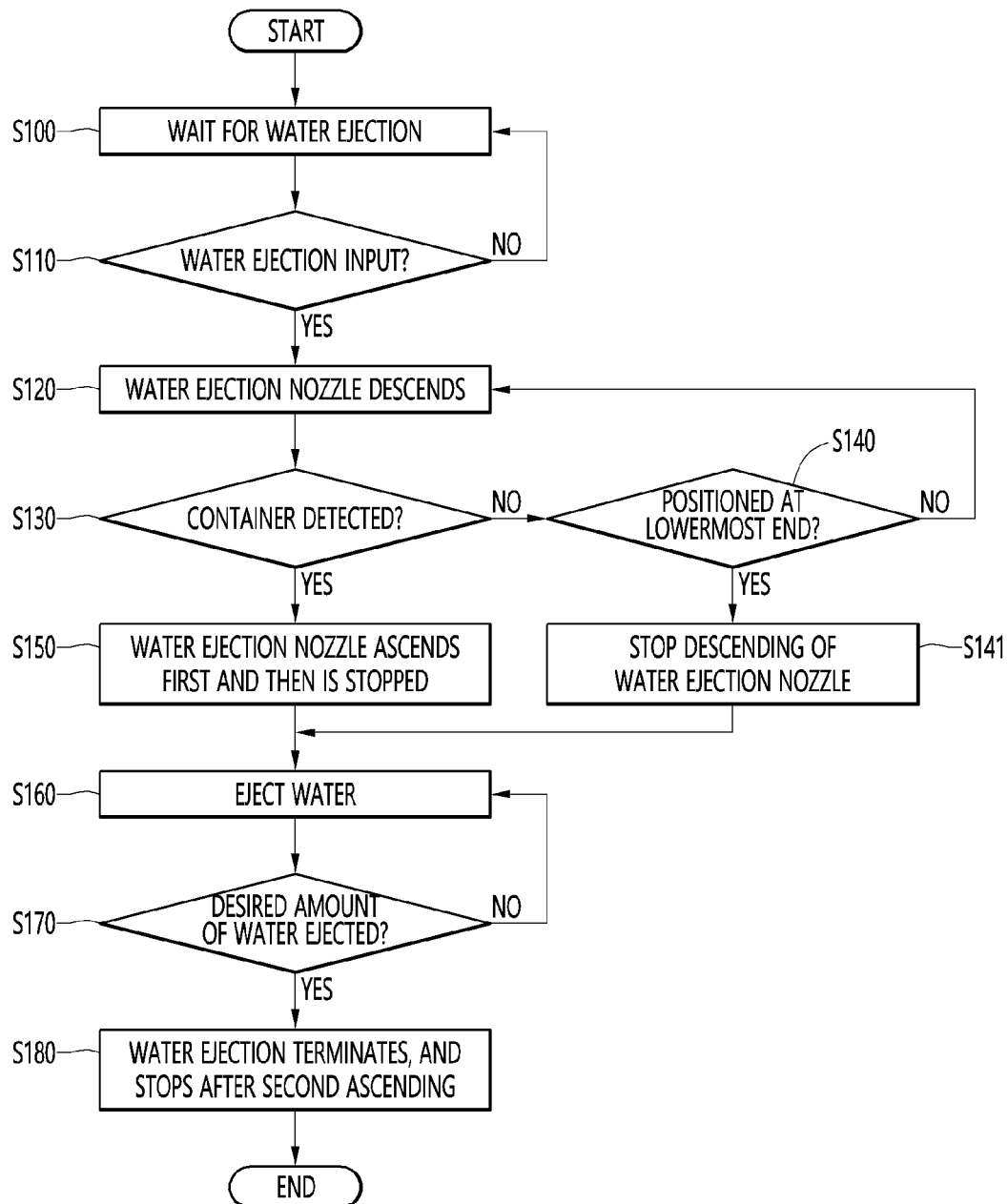
FIG. 41 is a view showing a control flow of a water purifier according to a first embodiment of the present disclosure.

FIG. 41 is a flowchart of an example control method of a water ejecting apparatus according to a first embodiment of the present disclosure. Referring to FIG. 41 with reference to FIG. 36, the water ejecting apparatus 1 is provided in a water ejection standby state (S100). Here, the water ejection standby state may be understood as a state where power is connected to the water ejecting apparatus 1. In addition, the lifting cover 210 and the water ejection nozzle 240 are in an elevated state.

In the standby state, it is determined whether there is an input of the water ejection input unit 272 from the user (S110). Then, when a water ejection command is detected, the lifting cover 210 and the water ejection nozzle 240 descend (S120). For example, the controller 90 drives the lifting motor 250 according to a signal from the water ejection input unit 272. Accordingly, the motor shaft 2500 is rotated, and power is transferred to the gear module 260. In addition, the fourth gear 2609 may be rotated and lowered along the lifting gear 2006.

Then, the detection unit 600 detects whether it is in contact with an upper end of the container (S130). For example, the lifting cover 210 and the water ejection nozzle 240 continue to descend, and then, as at least a portion of the detection unit 600 comes into contact with the upper end of the container placed under the water ejection nozzle 240, an upper end of the container is detected. As described above, when the detection unit 600 detects the upper end of the container, the controller 90 stops driving of the lifting motor 250. That is, the lifting cover 210 and the water ejection nozzle 240 are lowered until the detection unit 600 detects the upper end of the container.

If the upper end of the container is not detected by the detection unit 600, the lifting cover 210 and the water ejection nozzle 240 descend to the lowermost end. (S140). For example, when the lifting cover 210 and the water ejection nozzle 240 continue to descend, the lifting cover 210 and the water ejection nozzle 240 reach the bottom dead point and a large load is temporarily applied to the lifting motor 250.

Then, when such a load is input, the controller 90 determines that the lifting cover 210 and the water ejection nozzle 240 descend to the lowermost end, and stops driving of the lifting motor 250 so that the descending operation of the lifting cover 210 and the water ejection nozzle 240 is stopped (S141).

For example, as described above, when the lifting cover 210 and the water ejection nozzle 240 reach the lowermost end or when the detection unit 600 is in contact with the upper end of the container and detects the container, water ejection is performed immediately (S160). As another example, when the lifting cover 210 and the water ejection nozzle 240 descend, if the detection unit 600 comes into contact with the upper end of the container to detect the container, water ejection may not be performed immediately and the lifting cover 210 and the water ejection nozzle 240 may ascend by a set height (S150). In some implementations, the lifting cover 210 and the water ejection nozzle 240 may ascend by about 15 mm.

Thereafter, water ejection is performed (S160). For example, as the water ejection valve 94 is opened, water from the water ejection pipe 400 is discharged to the water ejection nozzle 240. The dispensed water may be purified water, cold water or hot water depending on a user selection or settings.

Also, it is determined whether the amount of ejected water has reached a target flow rate (S170). For example, a water ejection flow rate may be detected by a flow sensor. The flow sensor may be installed on a pipe connected to the rear end of the filter 40 based on a flow direction of water to detect a flow rate of water flowing after passing through the filter 40.

When the water ejection flow rate reaches the target flow rate, water ejection terminates and the lifting cover 210 and the water ejection nozzle 240 ascend to the original position again and are then stopped (S180). Here, the original position may refer to the positions of the lifting cover 210 and the water ejection nozzle 240 in a standby state (S100).

The ascending of the lifting cover 210 and the water ejection nozzle 240 may be performed when a predetermined time has elapsed after water dispensing terminated. For example, when water ejection terminates, the controller 90 drives the lifting motor 250 reversely after a set time. Accordingly, the motor shaft 2500 is rotated in reverse and power is transferred to the gear module 260. In addition, when the fourth gear 2609 is reversely rotated, it may be rotated and lifted along the lifting gear 2006.

Continuing to ascend, the lifting cover 210 and the water ejection nozzle 240 reach the top dead point, and accordingly, the lifting motor 250 is temporarily subjected to a large load. When such a load is input, the controller 90 determines that the ascending is completed and stops driving of the lifting motor 250.

Alternatively, when water ejection is finished, the lifting cover 210 and the water ejection nozzle 240 may not immediately ascend but maintain the lowered state until there is a separate instruction, or maintain the lowered state for a predetermined time and return to the initial position (standby position).

By the lifting of the lifting cover 210 and the water ejection nozzle 240, water may be ejected from a position adjacent to the water receiving container. Accordingly, the ejected water may be prevented from being scattered. In particular, when water at a very high temperature is ejected, preventing of scattering of ejected water guarantees user stability.

Figure 42:
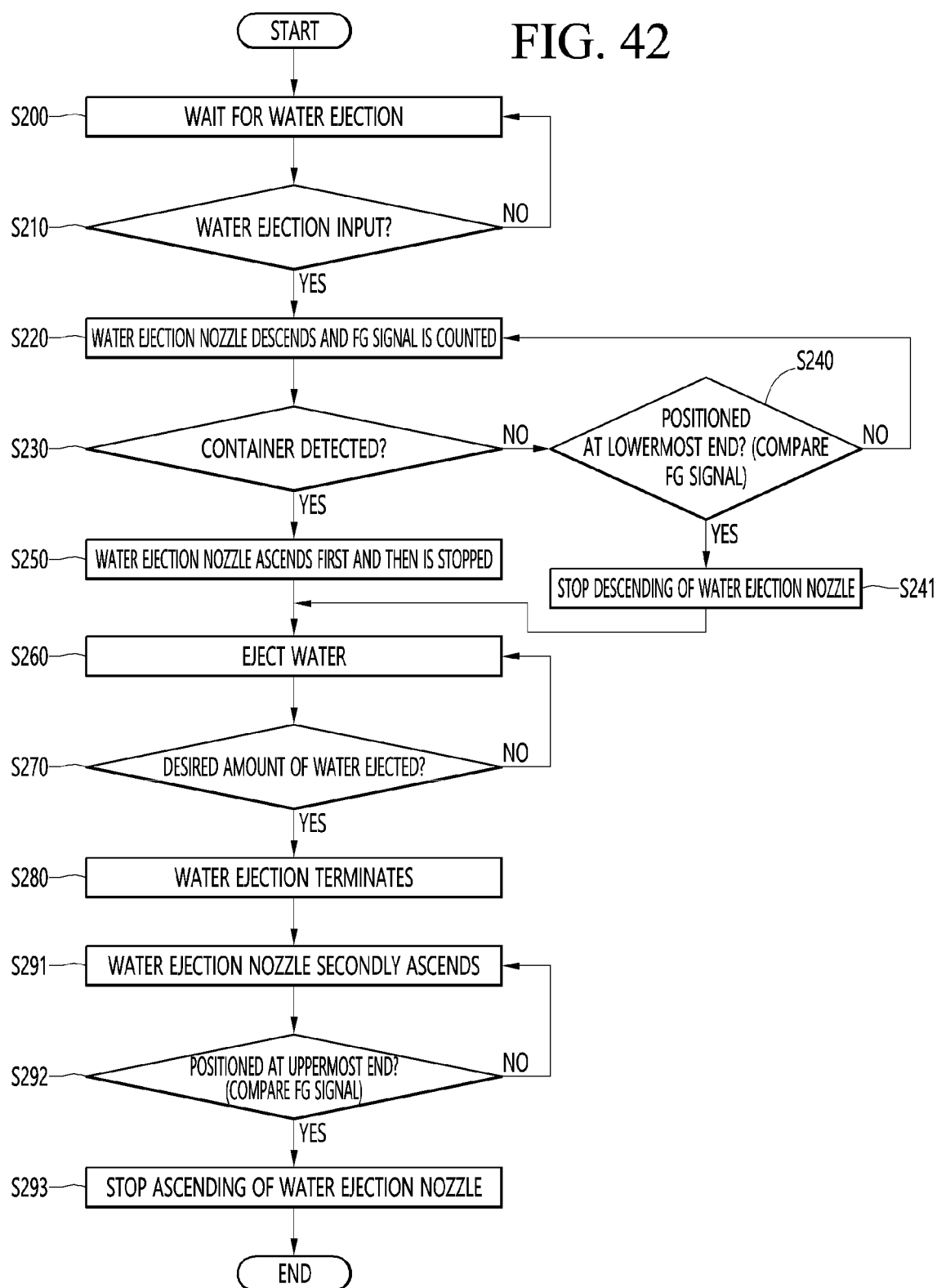
FIG. 42 is a view showing a control flow of a water purifier according to a second embodiment of the present disclosure.
Figure 43:
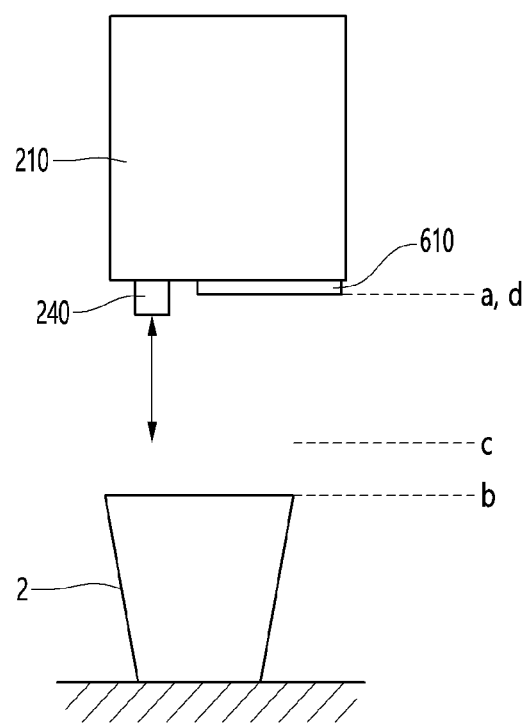
FIG. 43 is a view showing a change in height of a touch bar during an elevating operation of a water ejection nozzle.

FIG. 42 is a flowchart of an example control method of a water ejecting apparatus according to a second embodiment of the present disclosure, and FIG. 43 is a reference view for explaining the control method of FIG. 42. Referring to FIGS. 42 and 43, the water ejecting apparatus 1 is provided in a water ejection standby state (S200). For example, the water ejection standby state may be understood as a state where power is connected to the water ejecting apparatus 1. In addition, the lifting cover 210 and the water ejection nozzle 240 are in an elevated state. Here, the lower end of the touch bar 610 is located at a height of 'a' in FIG. 43.

In the standby state as described above, it is determined whether the water ejection input unit 272 is input from the user (S210). Also, when a water ejection command is detected, the lifting cover 210 and the water ejection nozzle 240 are lowered (S220). For example, the controller 90 drives the lifting motor 250 according to a signal from the water ejection input unit 272. Accordingly, the motor shaft 2500 is rotated and power is transferred to the gear module 260. In addition, the fourth gear 2609 may be rotated and lowered along the lifting gear 2006. For example, the signal detection unit 650 detects an FG signal from the lifting motor 250.

In step S220, the light source 212 may be turned on. After step S220, the detection sensor 620 detects whether the touch bar 610 is in contact with the water receiving container (S230). For example, while the lifting cover 210 and the water ejection nozzle 240 continue to descend, the touch bar 610 comes into contact with and detects the upper end of the water receiving container placed below the water ejection nozzle 240. Here, the lower end of the touch bar 610 is located at a height of 'b' in FIG. 43. Then, the touch bar 610 rotates and the lower end of the touch bar 610 ascends by a predetermined height from the height of 'b' in FIG. 43.

That is, the lifting cover 210 and the water ejection nozzle 240 descend until the touch bar 610 and the detection sensor 620 detect the upper end of the container. If the upper end of the container is not detected by the detection unit 600, the lifting cover 210 and the water ejection nozzle 240 descend to the lowermost end (S240). For example, if the lifting cover 210 and the water ejection nozzle 240 continue to descend, the lifting cover 210 and the water ejection nozzle 240 reach the bottom dead point and the lifting motor 250 is temporarily subjected to a large load. Then, when such a load is input, the controller 90 may determine that the descending to the lowermost end is completed and stop the driving of the lifting motor 250, so that the descending operation of the lifting cover 210 and the water ejection nozzle 240 may be stopped (S241).

As another example, when the lifting cover 210 and the water ejection nozzle 240 continue to descend, the lifting cover 210 and the water ejection nozzle 240 may reach the bottom dead point and the controller may determine that the lifting cover 210 and the water ejection nozzle 240 have reached the bottom dead point through an FG signal detected by the signal detection unit 650. Specifically, when moving from the standby position to the bottom dead point, the FG signal may be stored and the controller 90 may determine whether the lifting cover 210 and the water ejection nozzle 240 reach the bottom dead point by comparing the detected FG signal with the stored FG signal.

When it is determined that the lifting cover 210 and the water ejection nozzle 240 have reached the bottom dead point in this manner, the controller 90 may stop the driving of the lifting motor 250 to stop the descending operation of the lifting cover 210 and the water ejection nozzle 240 (S241).

For example, when the lifting cover 210 and the water ejection nozzle 240 reach the lowermost end or when the touch bar 610 comes into contact with the upper end of the water receiving container to detect the water receiving container, water ejection may be performed immediately (S260).

As another example, when the lifting cover 210 and the water ejection nozzle 240 descend, if the touch bar 610 comes into contact with the upper end of the water receiving container and the detection sensor 620 detects the water receiving container, water ejection may not be performed immediately and the lifting cover 210 and the water ejection nozzle 240 may be lifted by a set height (S250). Here, the lower end of the touch bar 610 is located at a height of 'c' in FIG. 43. For example, the lifting cover 210 and the water ejection nozzle 240 may ascend by about 15 mm.

Thereafter, water ejection is performed (S260). Specifically, as the water ejection valve 94 is opened, water from the water ejection pipe 400 is discharged to the water ejection nozzle 240. The dispensed water may be purified water, cold water or hot water depending on a user selection or settings.

Also, it is determined whether the amount of ejected water has reached a target flow rate (S270). For example, a water ejection flow rate may be detected by a flow sensor. The flow sensor may be installed on a pipe connected to the rear end of the filter 40 based on a flow direction of water to detect a flow rate of water flowing after passing through the filter 40. When the water ejection flow rate reaches the target flow rate, water ejection terminates (S280).

Also, the controller operates the lifting motor 250 to lift the lifting cover 210 and the water ejection nozzle 240 ascend to the original position (S291). Here, the original position may refer to the positions of the lifting cover 210 and the water ejection nozzle 240 in the standby state (S100).

In some implementations, the ascending of the lifting cover 210 and the water ejection nozzle 240 may be performed when a predetermined time has elapsed after water dispensing terminated. For example, when water ejection terminates, the lifting cover 210 and the water ejection nozzle 240 may ascend after waiting for 6 seconds. When the water ejection terminates, the controller 90 drives the lifting motor 250 reversely after a set time. Accordingly, the motor shaft 2500 is rotated reversely and power is transferred to the gear module 260. In addition, when the fourth gear 2609 is reversely rotated, the fourth gear 2609 may be rotated and lifted along the lifting gear 2006.

Also, when the lifting cover 210 and the water ejection nozzle 240 reach the top dead point, the operation of the lifting motor 250 is stopped and the elevating operation of the lifting cover 210 and the water ejection nozzle 240 is stopped. For example, while the lifting cover 210 is ascending, the lifting cover 210 and the water ejection nozzle 240 reach the top dead point, and accordingly, the lifting motor 250 is temporarily subjected to a large load. When such a load is input, the controller 90 may determine that the ascending is completed, and stop the driving of the lifting motor 250.

As another example, when the lifting cover 210 and the water ejection nozzle 240 continue to ascend, the lifting cover 210 and the water ejection nozzle 240 may reach the top dead point and the controller may determine that the lifting cover 210 and the water ejection nozzle 240 have reached through an FG signal detected by the signal detection unit 650.

For example, the controller 90 may store the FG signal when movement from the bottom dead point to the top dead point and the FG signal when movement from the position where water ejection is performed to the top dead point in step S260, and compare the FG signal detected by the signal detection unit 650 and the stored FG signal to determine whether the lifting cover 210 and the water ejection nozzle 240 have reached the top dead point (S292).

Also, when it is determined that the lifting cover 210 and the water ejection nozzle 240 have reached the top dead point through the FG signal, the controller stops driving of the lifting motor 250 (S293). Here, the lower end of the touch bar 610 is located at a height of 'd' in FIG. 43. Also, in step S293, the light source 212 may be turned off.

Alternatively, when water ejection terminates, the lifting cover 210 and the water ejection nozzle 240 may not immediately ascend but maintain the lowered state until a separate instruction is made, or maintain the lowered state for a predetermined time and return to the initial position (standby position).

As the lifting cover 210 and the water ejection nozzle 240 ascend, water may be ejected from a position adjacent to the water receiving container. Accordingly, ejected water may be prevented from being scattered. In particular, since water scattering is prevented during ejection of water at a very high temperature, user safety may be ensured.

As described above, some implementations of the present disclosure have a structure that rotates the water ejection unit 20 relative to the case 10. In some implementations, the lifting cover 210 accommodated inside the fixed cover 200 configuring the water ejection unit 20 has a structure to move up and down. In some implementations, the lifting motor 250, the gear module 260, and the water ejection pipe 400 are accommodated and the detection unit 600 is mounted in the lifting cover 210. The detection unit 600 may be disposed such that at least a portion thereof is exposed to the outside of the lifting cover 210.

When the user presses the water ejection button, the water ejection nozzle descends but the water receiving container having a certain height (e.g., 120 mm) or greater is detected by the detection unit 600 so that the lifting cover 210 stops at the height of the water receiving container and water ejection may be performed immediately, or after the lifting cover 210 ascends by a certain height (e.g., 15 mm), water ejection is performed.

In some implementations, although a water receiving container having a height lower than the certain height (e.g., 120 mm) is detected, water is ejected when the lifting cover 210 reaches as much close to the bottom dead point as possible, thereby reducing water splash due to head drop.

In some implementations, in the lowered state, repeated water ejection may be performed after water ejection, and when water ejection terminates, the lifting cover 210 may automatically ascend to return to the initial position.

Figure 44:
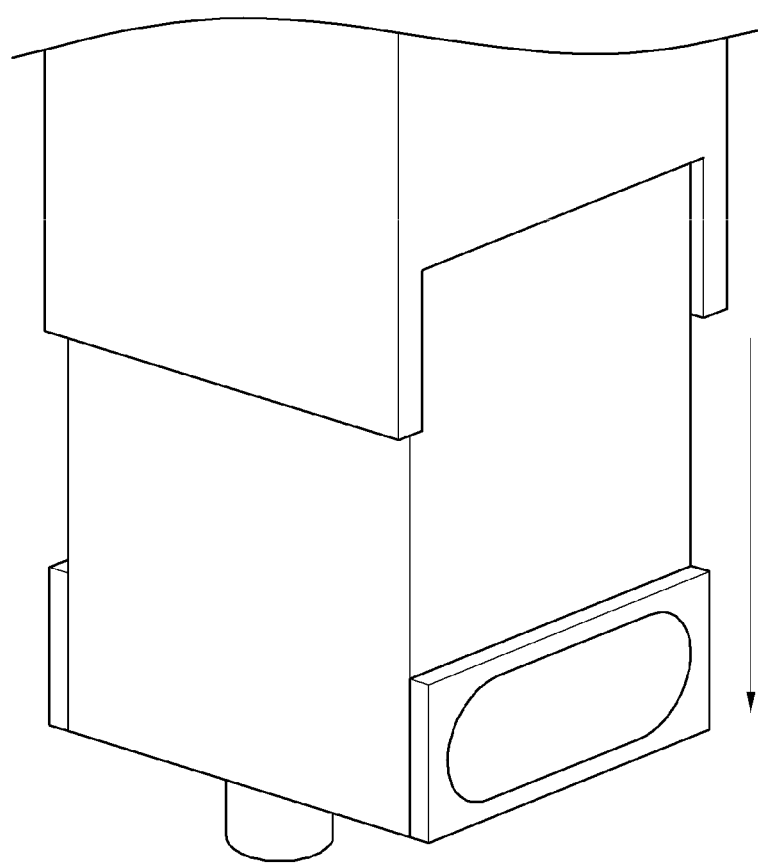
FIG. 44 is a view showing a state where a lifting cover and a water ejection nozzle are manually descended.

FIG. 44 illustrates that the lifting cover and the water ejection nozzle descend in a manual manner. Referring to FIG. 44, in the case of the manual method, the user may adjust the position of the water ejection nozzle by holding the lifting cover by hand and lowering it or raising it. However, due to this, the water ejection nozzle and its surroundings may come into contact with the user's hand, having a possibility that a microorganism is contacted and causing a problem of contamination as the microorganism grows.

FIG. 45 illustrates that the lifting cover and the water ejection nozzle are elevated in an automatic manner according to the present disclosure. FIG. 45(*a*) illustrates that the lifting cover and the water ejection nozzle ascend to the maximum so as to be located at the top dead point. FIG. 45(*b*) illustrates that lifting cover and the water ejection nozzle descend to the maximum so as to be located at the bottom dead point.

Referring to FIG. 45, in the case of the present disclosure, as the lifting cover 210 is accommodated inside the fixed cover 200, an elevating distance of the water ejection nozzle 240 may be lengthened and the water ejection nozzle 240 may descend by a minimum height and may ascend by a maximum height. Therefore, water may be ejected to water receiving containers having various heights. Also, when water is ejected to a relatively low water receiving container, water splashes to the outside of the water receiving container may be reduced. Also, since there is no need for the user to touch the water ejection nozzle or the surroundings by hand, it is possible to significantly reduce the possibility of microbial growth in the water ejection nozzle and the surroundings.

In some implementations, the automatic elevating mode as described above may be turned on or off by a user selection. For example, the user may turn on the automatic elevating mode by pressing an automatic elevating button provided in the input unit 270. Here, the lifting motor 250 may be switched to an active state. Also, when the user presses the water ejection button, the lifting cover 210 and the water ejection nozzle 240 automatically descend and are positioned near the water receiving container, and thereafter, water ejection may be performed. Also, when water ejection terminates, the lifting cover 210 and the water ejection nozzle 240 may return to the original position.

For example, the user may turn off the automatic elevating mode by pressing the automatic elevating button provided in the input unit 270. Here, the lifting motor 250 may be switched to an inactive state. Also, when the user pulls the lifting cover 210 to place the water ejection nozzle 240 near the water receiving container and presses the water ejection button, water ejection may be performed. After water ejection terminates, the lifting cover 210 and the water ejection nozzle 240 are fixed to the position where the water ejection was performed. The user may push up the lifting cover 210 to return the lifting cover 210 and the water ejection nozzle 240 to the original position.

If the lifting motor 250 is activated and the user manually pulls the lifting cover 210, the lifting motor 250 or the PCB may be damaged by a counter electromotive force. Therefore, a counter electromotive force blocking circuit may be implemented on the circuit controlling the lifting motor 250.

As described above, when both automatic elevation and manual elevation are available, user's convenience is increased, and since the rotation operation and the elevating operation of the water ejection unit 20 are selectively performed, a size of a minimum space required for installation of the water ejecting apparatus may be reduced. That is, the water ejecting apparatus may be installed at various positions without space restrictions.

It will be apparent to those skilled in the art that various modifications and variations may be made in the present disclosure without departing from the spirit or scope of the disclosure. Thus, it is intended that the present disclosure covers modifications and variations that come within the scope of the appended claims and their equivalents.

What is claimed is:

1. A liquid ejecting apparatus comprising:
a case; and
a liquid ejector at least partially protruding from the case and comprising:
   a lifting gear connected to the case;
   a lifting cover connected to the case and movable with respect to the case;
   a gear assembly including a lifting motor that is coupled to the lifting cover, wherein the gear assembly is configured to engage with the lifting motor and the lifting gear;
   a liquid ejection nozzle disposed at an end of the lifting cover and configured to eject liquid;
   a signal detecting unit configured to detect a frequency generation (FG) signal generated by the lifting motor based on operation of the lifting motor;
   a touch bar at least partially received in the lifting cover and configured to move based on contact with a liquid receiving container that is placed below the liquid ejection nozzle;
   a detection sensor received in the lifting cover and configured to detect movement of the touch bar; and
   a controller connected to the signal detecting unit and the detection sensor and configured to control the lifting motor.

2. The liquid ejecting apparatus of claim 1, wherein the liquid ejector further comprises:
   a fixed cover connected to the case and including the lifting gear,
   wherein the lifting cover is at least partially received in the fixed cover and configured to move relative to the fixed cover.

3. The liquid ejecting apparatus of claim 2, wherein the first cover includes the top dead point and the bottom dead point, and
   wherein the lifting gear is disposed between the top dead point and the bottom dead point.

4. The liquid ejecting apparatus of claim 1, wherein the controller is configured to:
   determine that the detection sensor does not detect the movement of the touch bar;
   determine that the lifting cover reaches the bottom dead point based on the FG signal detected by the lifting motor; and
   based on a determination that the detection sensor does not detect the movement of the touch bar and a determination that the lifting cover reaches the bottom dead point, stop the lifting motor.

5. The liquid ejecting apparatus of claim 1, wherein the controller is configured to:
   determine that the detection sensor detects the movement of the touch bar;
   based on a determination that the detection sensor detects the movement of the touch bar, determine that an end of the touch bar becomes to contact with a liquid receiving container;
   based on a determination that the end of the touch bar contacts with the liquid receiving container, stop the lifting motor; and
   based on a determination that the end of the touch bar contacts with the liquid receiving container, control the lifting motor to move the lifting cover away from the liquid receiving container by a preset height and subsequently stop the lifting motor,
   wherein the controller is configured to store information of an $n^{th}$ rotation amount of the lifting motor after moving toward the liquid receiving container n times, and
   wherein the information of the $n^{th}$ rotation amount is used to predict a distance to the top dead point when the lifting cover moves.

6. The liquid ejecting apparatus of claim 1, wherein the controller is configured to store at least one of information of a first rotation amount of the lifting motor that causes the lifting cover to move from the top dead point to the bottom dead point or information of a second rotation amount of the lifting motor that causes the lifting cover to move from the bottom dead point to the top dead point.

7. The liquid ejecting apparatus of claim 6, wherein the controller is configured to:
   receive a rotation amount of the lifting motor based on the FG signal from the lifting motor;

compare the received rotation amount of the lifting motor with the first rotation amount or the second rotation amount, as the lifting motor operates to move the lifting cover toward the bottom dead point;

based on the received rotation amount being equal to the first rotation amount or the second rotation amount, determine that the lifting cover reaches the bottom dead point; and based on a determination that the lifting cover reaches the bottom dead point, stop the lifting motor, wherein the controller is configured to, based on the lifting cover approaching the bottom dead point, lower a rotation speed of the lifting motor.

8. The liquid ejecting apparatus of claim 6, wherein the controller is configured to, based on the lifting motor being stopped, open a liquid ejection valve to deliver liquid to the liquid ejection nozzle.

9. The liquid ejecting apparatus of claim 6, wherein the controller is configured to:

receive a rotation amount of the lifting motor based on the FG signal from the lifting motor;

compare the received rotation amount of the lifting motor with the first rotation amount or the second rotation amount, as the lifting motor operates to move the lifting cover toward the top dead point; and based on the received rotation amount being equal to the first rotation amount or the second rotation amount, determine that the lifting cover reaches the top dead point.

10. The liquid ejecting apparatus of claim 1, wherein the lifting motor includes a brushless direct current (BLDC) motor, and wherein the controller is configured to adjust a speed of the lifting motor through duty control.

* * * * *